United States Patent
Yoshida et al.

(10) Patent No.: US 12,277,165 B2
(45) Date of Patent: Apr. 15, 2025

(54) IMAGE PROCESSING APPARATUS, AND IMAGE PROCESSING METHOD

(71) Applicant: NEC Corporation, Tokyo (JP)

(72) Inventors: Noboru Yoshida, Tokyo (JP); Jianquan Liu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/275,765

(22) PCT Filed: May 26, 2021

(86) PCT No.: PCT/JP2021/019993
§ 371 (c)(1),
(2) Date: Aug. 3, 2023

(87) PCT Pub. No.: WO2022/249331
PCT Pub. Date: Dec. 1, 2022

(65) Prior Publication Data
US 2024/0126806 A1 Apr. 18, 2024

(51) Int. Cl.
*G06F 16/483* (2019.01)
*G06F 16/432* (2019.01)
(Continued)

(52) U.S. Cl.
CPC .......... *G06F 16/483* (2019.01); *G06F 16/434* (2019.01); *G06V 10/44* (2022.01); *G06V 10/806* (2022.01)

(58) Field of Classification Search
CPC ..... G06F 16/483; G06F 16/434; G06V 10/44; G06V 10/806
See application file for complete search history.

(56) References Cited

U.S. PATENT DOCUMENTS

2009/0304267 A1* 12/2009 Tapley ................ G06F 16/5854
382/156
2016/0284098 A1* 9/2016 Okumura .................. G06T 7/41
(Continued)

FOREIGN PATENT DOCUMENTS

CN 109308438 B 11/2020
JP 2006-260405 A 9/2006
(Continued)

OTHER PUBLICATIONS

International Search Report for PCT Application No. PCT/JP2021/019993, mailed on Aug. 24, 2021.
(Continued)

*Primary Examiner* — Huawen A Peng

(57) ABSTRACT

A query acquisition unit (109) acquires a first query moving image having a plurality of time-series first frame images and at least one second query moving image having a plurality of time-series second frame images. A feature value computing unit (103) computes a feature value of a keypoint detected from an object being included in each of the first frame images and the second frame images. A correspondence relationship determination unit (114) determines a second frame image associated with each of the plurality of first frame images. An integration unit (113) performs, for a plurality of combinations of the first frame image and the second frame image associated with each other, processing of integrating the feature values computed from each of the first frame image and the second frame image, and thereby generates an integrated query in which the integrated feature values are arranged in time series.

7 Claims, 58 Drawing Sheets

(51) Int. Cl.
*G06V 10/44* (2022.01)
*G06V 10/80* (2022.01)

(56) References Cited

U.S. PATENT DOCUMENTS

| | | | | |
|---|---|---|---|---|
| 2017/0337271 | A1* | 11/2017 | Lee | G06V 10/82 |
| 2018/0246910 | A1* | 8/2018 | Mitchell | G06F 18/22 |
| 2019/0005069 | A1* | 1/2019 | Filgueiras de Araujo | G06V 10/757 |
| 2020/0242402 | A1* | 7/2020 | Jung | G06V 10/10 |

FOREIGN PATENT DOCUMENTS

| | | |
|---|---|---|
| JP | 2014-522035 A | 8/2014 |
| JP | 2016-181743 A | 10/2016 |
| JP | 2020-035086 A | 3/2020 |
| JP | 2020-135747 A | 8/2020 |
| JP | 2021-006956 A | 1/2021 |
| WO | 2006/025272 A1 | 3/2006 |

OTHER PUBLICATIONS

Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, p. 7291-7299.
JP Office Communication for JP Application No. 2023-523804, mailed on Jan. 7, 2025 with English Translation.

* cited by examiner

IMAGE PROCESSING APPARATUS, AND IMAGE PROCESSING METHOD

This application is a National Stage Entry of PCT/JP2021/019993 filed on May 26, 2021, the contents of all of which are incorporated herein by reference, in their entirety.

TECHNICAL FIELD

The present invention relates to an image processing apparatus, an image processing method, and a program.

BACKGROUND ART

In recent years, in a surveillance system or the like, a technique of detecting or searching for a state such as a pose or an action of a person from an image by a surveillance camera has been used. As a related technique, for example, Patent Documents 1 and 2 are known. Patent Document 1 discloses a technique of searching for, based on key joints such as a head and limbs of a person being included in a depth video, a pose of a person similar thereto. Patent Document 2 discloses, although not related to a pose of a person, a technique of searching for a similar image by using pose information such as an inclination added to the image. In addition, as a technique related to skeleton estimation of a person, Non-Patent Document 1 is known.

On the other hand, in recent years, it has been studied to use a moving image as a query and search for a moving image similar to such a query. For example, Patent Document 3 describes that, when a reference video serving as a query is input, a similar video is searched for by using the number of faces of characters, and positions, sizes, and orientations of the faces of the characters.

In addition, Patent Document 4 describes computing an integrated scene feature value being an average of scene feature values of each of a plurality of query videos. Further, Patent Document 5 describes a technique of extracting an image that may be favorably received from a moving image including a plurality of frame images.

RELATED DOCUMENT

Patent Document

Patent Document 1: Published Japanese Translation of PCT International Publication for Patent Application No. 2014-522035

Patent Document 2: Japanese Patent Application Publication No. 2006-260405

Patent Document 3: International Patent Publication No. WO2006/025272

Patent Document 4: Japanese Patent Application Publication No. 2021-006956

Patent Document 5: Japanese Patent Application Publication No. 2020-035086

Non-Patent Document

Non-Patent Document 1: Zhe Cao, Tomas Simon, Shih-En Wei, Yaser Sheikh, "Realtime Multi-Person 2D Pose Estimation using Part Affinity Fields", The IEEE Conference on Computer Vision and Pattern Recognition (CVPR), 2017, pages 7291 to 7299

DISCLOSURE OF THE INVENTION

Technical Problem

Even in the same pose (e.g., sitting on a chair) or the same action (e.g., throwing an object), there is a difference due to a physical difference, an individual difference, and the like. Therefore, it is difficult to accurately search for an image indicating the same pose or action as a pose or an action indicated by a query (still image or moving image). One object of the present invention is to enable an image indicating the same pose or action as a pose or an action indicated by a query to be searched for with high accuracy.

Solution to Problem

One aspect of the present invention provides an image processing apparatus including:

a query acquisition unit that acquires a first query moving image having a plurality of time-series first frame images and at least one second query moving image having a plurality of time-series second frame images;

a feature value computing unit that computes a feature value of a keypoint detected from an object being included in each of the first frame images and the second frame images;

a correspondence relationship determination unit that determines the second frame image associated with each of a plurality of the first frame images; and an integration unit that performs, for a plurality of combinations of the first frame image and the second frame image associated with each other, processing of integrating the feature values computed from each of the first frame image and the second frame image, and thereby generates an integrated query in which the integrated feature values are arranged in time series.

One aspect of the present invention provides an image processing method including, by a computer:

a query acquisition step of acquiring a first query moving image having a plurality of time-series first frame images and at least one second query moving image having a plurality of time-series second frame images;

a feature value computing step of computing a feature value of a keypoint detected from an object being included in each of the first frame images and the second frame images;

a correspondence relationship determination step of determining the second frame image associated with each of a plurality of the first frame images; and an integration step of performing, for a plurality of combinations of the first frame image and the second frame image associated with each other, processing of integrating the feature values computed from each of the first frame image and the second frame image, and thereby generating an integrated query in which the integrated feature values are arranged in time series.

One aspect of the present invention provides a program causing a computer to function as:

a query acquisition unit that acquires a first query moving image having a plurality of time-series first frame images and at least one second query moving image having a plurality of time-series second frame images;

a feature value computing unit that computes a feature value of a keypoint detected from an object being included in each of the first frame images and the second frame images;
a correspondence relationship determination unit that determines the second frame image associated with each of a plurality of the first frame images; and
an integration unit that performs, for a plurality of combinations of the first frame image and the second frame image associated with each other, processing of integrating the feature values computed from each of the first frame image and the second frame image, and thereby generates an integrated query in which the integrated feature values are arranged in time series.

One aspect of the present invention provides an image processing apparatus including:
a query acquisition unit that acquires a first query still image and at least one second query still image;
a feature value computing unit that computes a feature value of a keypoint detected from an object being included in each of the first query still image and the second query still image;
an integration unit that integrates the feature values computed from each of the first query still image and the second query still image, and thereby generates an integrated query; and
a search unit that searches for a still image by using the integrated query as a key,
wherein the search unit searches for a still image by using a weighting value for each of the feature values being set, based on a degree of similarity between each of a plurality of types of the feature values computed from the first query still image and each of a plurality of types of the feature values computed from the second query still image.

One aspect of the present invention provides an image processing method including,
by a computer:
a query acquisition step of acquiring a first query still image and at least one second query still image;
a feature value computing step of computing a feature value of a keypoint detected from an object being included in each of the first query still image and the second query still image;
an integration step of integrating the feature values computed from each of the first query still image and the second query still image, and thereby generating an integrated query; and
a search step of searching for a still image by using the integrated query as a key,
wherein, the search step includes searching for a still image by using a weighting value for each of the feature values being set, based on a degree of similarity between each of a plurality of types of the feature values computed from the first query still image and each of a plurality of types of the feature values computed from the second query still image.

One aspect of the present invention provides a program causing a computer to function as:
a query acquisition unit that acquires a first query still image and at least one second query still image;
a feature value computing unit that computes a feature value of a keypoint detected from an object being included in each of the first query still image and the second query still image;
an integration unit that integrates the feature values computed from each of the first query still image and the second query still image, and thereby generates an integrated query; and
a search unit that searches for a still image by using the integrated query as a key,
wherein the search unit searches for a still image by using a weighting value for each of the feature values being set, based on a degree of similarity between each of a plurality of types of the feature values computed from the first query still image and each of a plurality of types of the feature values computed from the second query still image.

Advantageous Effects of Invention

According to the present invention, it is possible to accurately search for an image indicating the same pose or action as a pose or an action indicated by a query.

BRIEF DESCRIPTION OF THE DRAWINGS

The above-described object and other objects, features and advantages will become more apparent from the following description of suitable example embodiments and the accompanying drawings thereof.

DESCRIPTION OF EMBODIMENTS

Hereinafter, example embodiments of the present invention will be described with reference to the drawings. Note that, in all the drawings, the same components are denoted by the same reference signs, and description thereof will be omitted as appropriate.

Consideration to the Example Embodiments

In recent years, image recognition technique using machine learning such as deep learning has been applied to various systems. For example, such technology is being applied to a surveillance system that performs surveillance by using an image captured by a surveillance camera. By utilizing machine learning in a surveillance system, recognizing, to some extent, a state such as a pose and an action of a person from an image is becoming possible.

However, in such a related art, a state of a person desired by a user may not always be recognized on demand. For example, in some cases, a state of a person to be searched for and recognized by a user may be determined in advance, and in other cases, a state may not be specifically determined such as an unknown state. Then, in some cases, it is not possible to specify the state of a person the user wants to search for in detail. In addition, in a case where a part of the body of a person is hidden, a search or the like cannot be performed. In the related art, since the state of a person can be searched only from a specific search condition, it is difficult to flexibly search for or classify the desired state of a person.

Therefore, the inventors have studied a method of using a skeleton estimation technique such as Non-Patent Document 1 in order to recognize a state of a person desired by a user from an image on demand. In a related skeleton estimation technique such as OpenPose disclosed in Non-Patent Document 1, a skeleton of a person is estimated by learning image data with correct answers of various patterns. In the following example embodiments, it is possible to flexibly recognize a state of a person by utilizing such a skeleton estimation technique.

Note that, the skeletal structure estimated by a skeleton estimation technique such as OpenPose is composed of [keypoints] which are feature points such as joints, and [bones (bone links)] which indicate links between the keypoints. Therefore, in the following example embodiments, the skeletal structure will be described using the terms [keypoint] and [bone], but unless otherwise limited, a [keypoint] corresponds to a [joint] of a person and a [bone] corresponds to a [bone] of a person.

Summary of Example Embodiments

Figure 1:
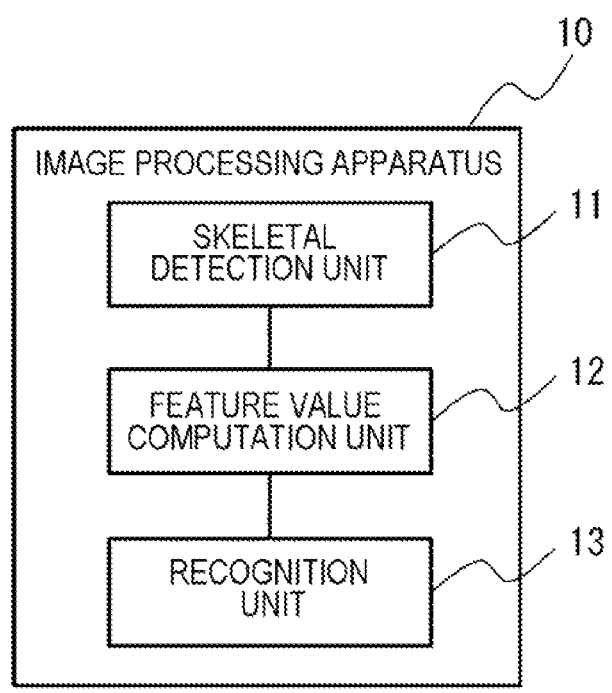
FIG. 1 is a configuration diagram illustrating an outline of an image processing apparatus according to the example embodiments.

FIG. 1 illustrates an outline of an image processing apparatus 10 according to the example embodiments. As illustrated in FIG. 1, the image processing apparatus 10 includes a skeleton detection unit 11, a feature value computing unit 12, and a recognition unit 13. The skeleton detection unit 11 detects two-dimensional skeletal structures of a plurality of persons, based on a two-dimensional image acquired from a camera or the like. The feature value computing unit 12 computes feature values of the plurality of two-dimensional skeletal structures detected by the skeleton detection unit 11. The recognition unit 13 performs processing of recognizing the states of the plurality of persons, based on a degree of similarity between the plurality of feature values computed by the feature value computing unit 12. The recognition processing is classification processing, search processing, or the like of a state of a person.

As described above, in the example embodiments, by detecting a two-dimensional skeletal structure of a person from a two-dimensional image and performing recognition processing such as classification and search of the state of the person, based on the feature value computed from the two-dimensional skeletal structure, it is possible to flexibly recognize the desired state of the person.

First Example Embodiment

Figure 2:
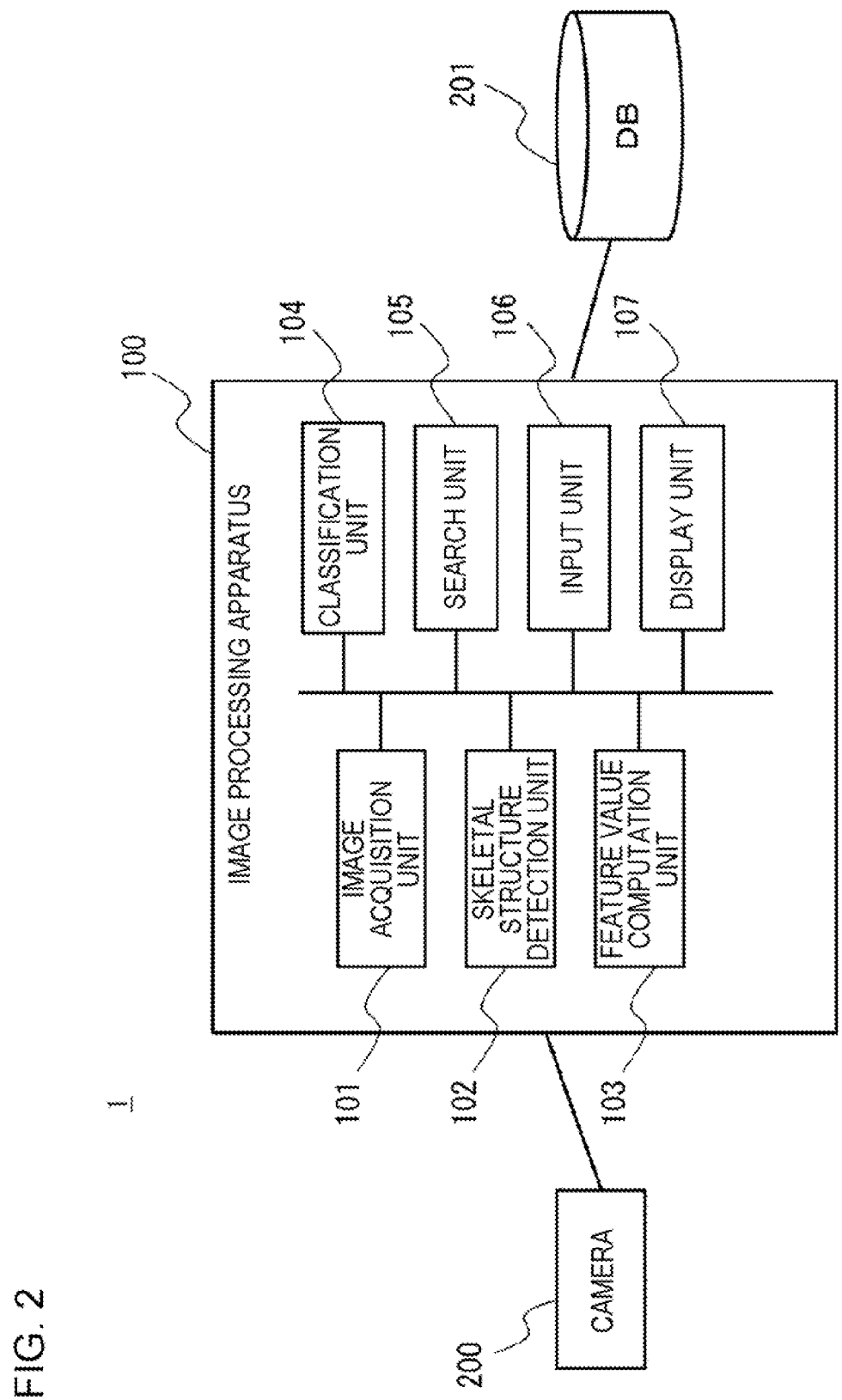
FIG. 2 is a configuration diagram illustrating a configuration of an image processing apparatus according to a first example embodiment.

Hereinafter, a first example embodiment will be described with reference to the drawings. FIG. 2 illustrates a configuration of an image processing apparatus 100 according to the present example embodiment. The image processing apparatus 100 constitutes an image processing system 1 together with a camera 200 and a database (DB) 201. The image processing system 1 including the image processing apparatus 100 is a system that classifies and searches for a state such as a pose and an action of a person, based on a skeletal structure of the person estimated from the image.

The camera 200 is an image-capturing unit such as a surveillance camera that generates a two-dimensional image. The camera 200 is installed at a predetermined location and captures an image of a person or the like in an image-capturing region from the installed location. The camera 200 is connected directly or via a network or the like to the image processing apparatus 100 in such a way that the captured image (video) can be output thereto. Note that the camera 200 may be provided inside the image processing apparatus 100.

The database 201 is a database that stores information (data) necessary for processing performed by the image processing apparatus 100, processing results, and the like. The database 201 stores an image acquired by an image acquisition unit 101, a detection result of a skeletal structure detection unit 102, data for machine learning, a feature value computed by a feature value computing unit 103, a classification result of a classification unit 104, a search result of a search unit 105, and the like. The database 201 is connected directly or via a network or the like to the image processing apparatus 100 in such a way that data can be input to and output from the image processing apparatus 100 as necessary. Note that, the database 201 may be provided inside the image processing apparatus 100 as a nonvolatile memory such as a flash memory, a hard disk device, or the like.

As illustrated in FIG. 2, the image processing apparatus 100 includes the image acquisition unit 101, the skeletal structure detection unit 102, the feature value computing unit 103, the classification unit 104, the search unit 105, an input unit 106, and a display unit 107. Note that, the configuration of each unit (block) is an example, and may be configured from other units as long as the method (operation) described later is possible. Further, the image processing apparatus 100 is achieved by, for example, a computer apparatus such as a personal computer or a server that executes a program, but may be achieved by a single device or may be achieved by a plurality of apparatuses on a network. For example, the input unit 106, the display unit 107, or the like may be an external device. Further, both the classification unit 104 and the search unit 105 may be provided, or only one of them may be provided. The classification unit 104 and/or the search unit 105 is a recognition unit that performs recognition processing of a state of a person.

The image acquisition unit 101 acquires a two-dimensional image including a person, captured by the camera 200. For example, the image acquisition unit 101 acquires an image (a video including a plurality of images) including a person, captured by the camera 200 during a predetermined surveillance period. Note that, not only acquisition from the camera 200, but also acquisition from the database 201 or the like of an image including a person prepared in advance may be performed.

The skeletal structure detection unit 102 detects a two-dimensional skeletal structure of a person in the image, based on the acquired two-dimensional image. The skeletal structure detection unit 102 detects a skeletal structure for all persons recognizable in the acquired image. The skeletal structure detection unit 102 detects a skeletal structure of a person, based on a feature such as a joint of the recognized person by using a skeleton estimation technique using machine learning. The skeletal structure detection unit 102 uses, for example, a skeleton estimation technique such as OpenPose of Non-Patent Document 1.

The feature value computing unit 103 computes the feature value of the detected two-dimensional skeletal structure, and stores the computed feature value in the database 201 in association with the image being processed. The feature value of the skeletal structure indicates the feature of the skeleton of the person, and serves as an element for classifying and searching for the state of the person, based on the skeleton of the person. Generally, such feature value includes a plurality of parameters (for example, a classification element to be described later). The feature value may be a feature value of the entire skeletal structure, a feature value of a part of the skeletal structure, or may include a plurality of feature values as in each part of the skeletal structure. A method of computing the feature value may be any method such as machine learning or normalization, and a minimum value or a maximum value may be acquired as a result of normalization. As one example, the feature value is a feature value acquired by performing machine learning on a skeletal structure, a size of the skeletal structure from a head part to a foot part in an image, or the like. The size of the skeletal structure is a height in the up-down direction, an area, or the like of a skeleton region including the skeletal structure on the image. The up-down direction (height direction or perpendicular direction) is a vertical direction (Y-axis direction) in the image, and is, for example, a direction perpendicular to the ground (reference surface). The lateral direction (horizontal direction) is a left-right direction (X-axis direction) in the image, and is, for example, a direction parallel to the ground.

In order to perform classification or a search desired by the user, it is preferable to use a feature value having robustness to the classification or search processing. For example, when the user desires for a classification or a search that does not depend on the orientation or body shape of a person, a feature value being robust to the orientation or body shape of the person may be used. By learning skeletons of persons in the same pose but facing various directions or skeletons of persons in the same pose but in various body shapes, or by extracting features only in the up-down direction of the skeleton, it is possible to acquire a feature value independent of the orientation or the body shape of the person.

The classification unit 104 classifies (clusters) a plurality of skeletal structures stored in the database 201, based on the degree of similarity of the feature values of the skeletal structures. It can be said that, as the processing of recognizing the state of the person, the classification unit 104 classifies the states of a plurality of persons, based on the feature value of the skeletal structure. The degree of similarity is a distance between feature values of the skeletal structures. The classification unit 104 may perform classification based on the degree of similarity of the feature value of the entire skeletal structure, may perform classification based on the degree of similarity of the feature value of a part of the skeletal structure, or may perform classification based on the degree of similarity of the feature values of a first portion (for example, both hands) and a second portion (for example, both feet) of the skeletal structure. Note that, the pose of the person may be classified based on the feature value of the skeletal structure of the person in each image, or the action of the person may be classified based on the change in the feature value of the skeletal structure of the person in a plurality of images consecutive in time series. That is, the classification unit 104 may classify the state of the person including the pose and the action of the person, based on the feature value of the skeletal structure. For example, the classification unit 104 classifies a plurality of skeletal structures in a plurality of images captured in a predetermined surveillance period. The classification unit 104 obtains the degree of similarity between the feature values to be classified, and classifies the skeletal structures having a high degree of similarity into the same cluster (a group having a similar pose). As in the search, the classification condition may be specified by the user. The classification unit 104 stores the classification result of the skeletal structure in the database 201 and displays the classification result on the display unit 107.

The search unit 105 searches for a skeletal structure having a high degree of similarity with a feature value of a search query (query state) from among a plurality of skeletal structures stored in the database 201. It can be said that, as the processing of recognizing the state of the person, the search unit 105 searches for a state of a person that meets a search condition (query state) from among states of a plurality of persons, based on a feature value of a skeletal structure. Similar to the classification, the degree of similarity is the distance between the feature values of the skeletal structures. The search unit 105 may perform searches based on the degree of similarity of the feature value of the entire skeletal structure, may perform searches based on the degree of similarity of the feature value of a part of the skeletal structure, or may perform searches based on the degree of similarity of the feature values of the first portion (for example, both hands) and the second portion (for example, both feet) of the skeletal structure. Note that, the pose of the person may be searched for based on the feature value of the skeletal structure of the person in each image, or the action of the person may be searched for based on the change in the feature value of the skeletal structure of the person in a plurality of images consecutive in time series. That is, the search unit 105 may search for the state of the person including the pose and the action of the person, based on the feature value of the skeletal structure. For example, similarly to the case of the classification target, the search unit 105 searches for feature values of a plurality of skeletal structures in a plurality of images captured in a predetermined surveillance period. Further, a skeletal structure (pose) specified by the user among the classification results displayed by the classification unit 104 is set as a search query (search key). Note that, the search query may be selected not only from the classification results but also from a plurality of non-classified skeletal structures, or a skeletal structure to be used as a search query may be input by the user. The search unit 105 searches for a feature value having a high degree of similarity with the feature value of the skeletal structure of the search query from among the feature values to be searched for. The search unit 105 stores the search result of the feature value in the database 201 and displays the search result on the display unit 107.

The input unit 106 is an input interface for acquiring information input by a user operating the image processing apparatus 100. For example, the user is an observer who surveils a person in a suspicious state from an image of the surveillance camera. The input unit 106 is, for example, a graphical user interface (GUI), and receives input of information in response to an operation made by the user from an input device such as a keyboard, a mouse, or a touch panel. For example, the input unit 106 receives, as a search query, a skeletal structure of a specified person from among the skeletal structures (poses) classified by the classification unit 104.

The display unit 107 is a display unit that displays a result of the operation (processing) and the like of the image processing apparatus 100, and is, for example, a display device such as a liquid crystal display or an organic electroluminescence (EL) display. The display unit 107 displays the classification result of the classification unit 104 and the search result of the search unit 105 in the GUI according to the degree of similarity or the like.

Figure 39:
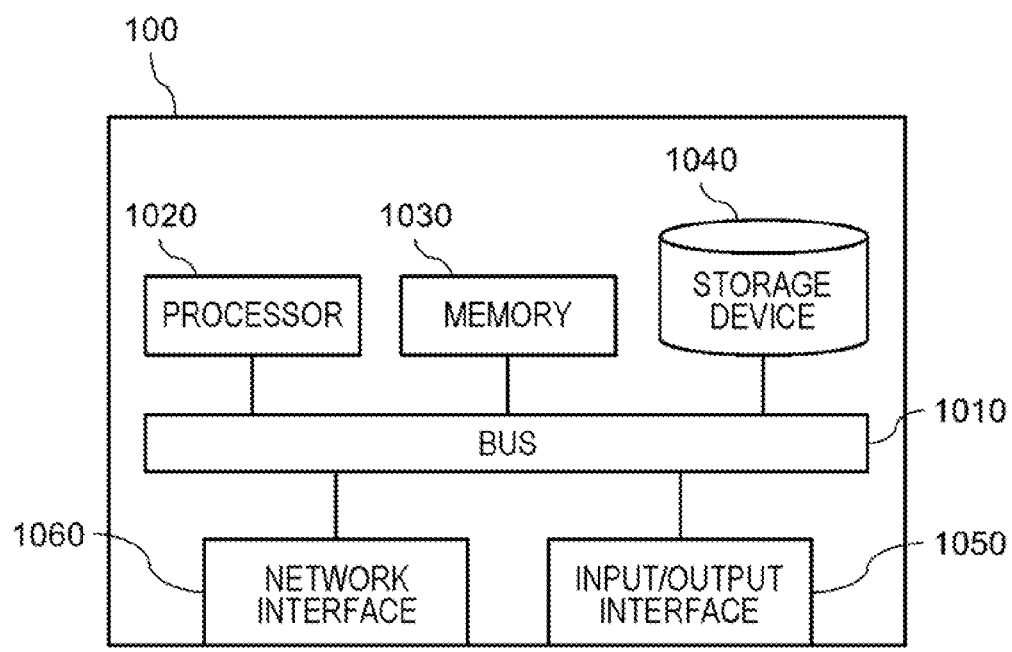
FIG. 39 is a diagram illustrating an example of a hardware configuration of an image processing apparatus.

FIG. 39 is a diagram illustrating an example of a hardware configuration of the image processing apparatus 100. The image processing apparatus 100 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit and receive data to and from one another. However, the method of connecting the processors 1020 and the like to one another is not limited to bus connection.

The processor 1020 is a processor implemented by a central processing unit (CPU), a graphics processing unit (GPU), or the like.

The memory 1030 is a main storage device implemented by a random access memory (RAM) or the like.

The storage device 1040 is an auxiliary storage device implemented by a hard disk drive (HDD), a solid state drive (SSD), a memory card, a read only memory (ROM), or the like. The storage device 1040 stores program modules which implement each of the functions (for example, the image acquisition unit 101, the skeletal structure detection unit 102, the feature value computing unit 103, the classification unit 104, the search unit 105, and the input unit 106) of the image processing apparatus 100. The processor 1020 reads and executes each of the program modules on the memory 1030, and thereby each function associated with the program modules are implemented. The storage device 1040 may also function as the database 201.

The input/output interface 1050 is an interface for connecting the image processing apparatus 100 and various input/output devices. When the database 201 is located outside the image processing apparatus 100, the image processing apparatus 100 may connect to the database 201 via the input/output interface 1050.

The network interface 1060 is an interface for connecting the image processing apparatus 100 to a network. The network is, for example, a local area network (LAN) or a wide area network (WAN). The method by which the network interface 1060 connects to the network may be a wireless connection or a wired connection. The image processing apparatus 100 may communicate with the camera 200 via the network interface 1060. When the database 201 is located outside the image processing apparatus 100, the image processing apparatus 100 may connect to the database 201 via the network interface 1060. Note that an example of the hardware configuration of the image processing apparatus 100 is the same in all the following example embodiments.

Figure 3:
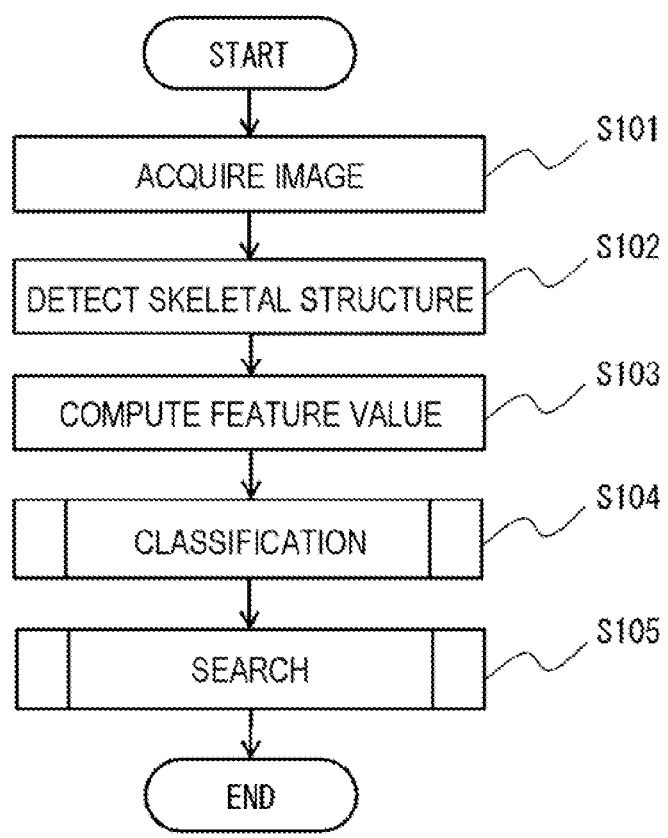
FIG. 3 is a flowchart illustrating an image processing method according to the first example embodiment.
Figure 4:
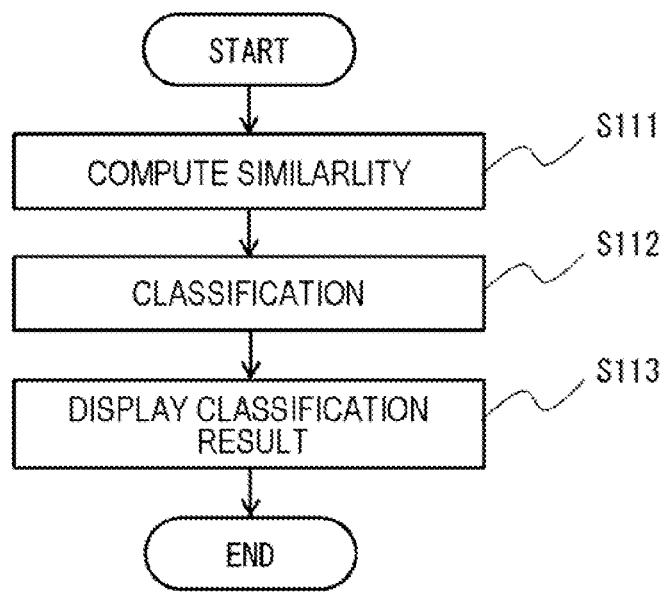
FIG. 4 is a flowchart illustrating a classification method according to the first example embodiment.
Figure 5:
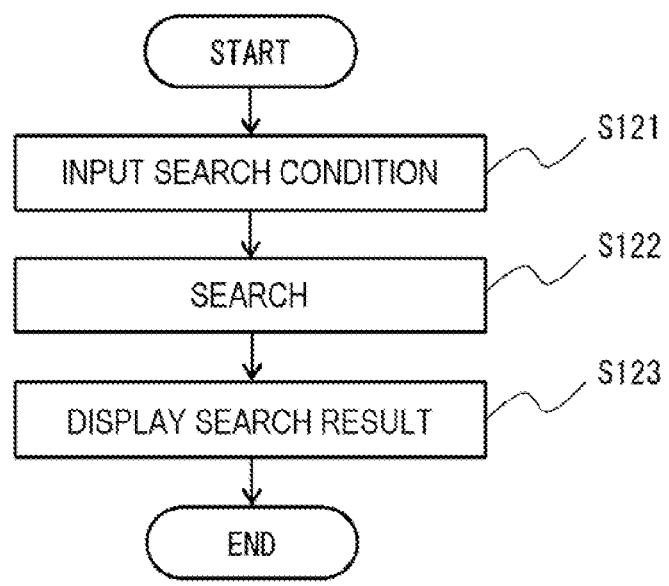
FIG. 5 is a flowchart illustrating a search method according to the first example embodiment.

FIGS. 3 to 5 illustrate operations of the image processing apparatus 100 according to the present example embodiment. FIG. 3 illustrates a flow from image acquisition to search processing in the image processing apparatus 100, FIG. 4 illustrates a flow of classification processing (S104) in FIG. 3, and FIG. 5 illustrates a flow of search processing (S105) in FIG. 3.

As illustrated in FIG. 3, the image processing apparatus 100 acquires an image from the camera 200 (S101). The image acquisition unit 101 acquires from the skeletal structure an image acquired by capturing a person in order to perform a classification or a search, and stores the acquired image in the database 201. For example, the image acquisition unit 101 acquires a plurality of images captured in a predetermined surveillance period, and performs subsequent processing on all persons included in the plurality of images.

Figure 6:
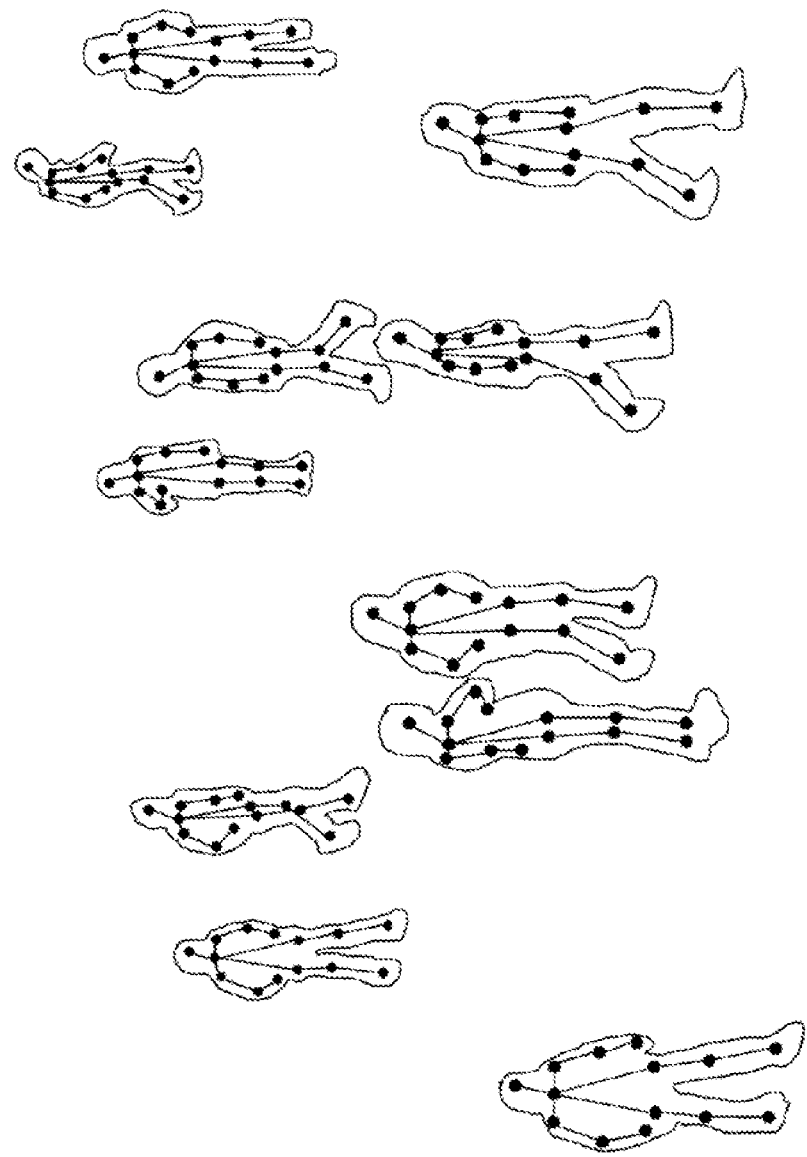
FIG. 6 is a diagram illustrating a detection example of a skeletal structure according to the first example embodiment.

Then, the image processing apparatus 100 detects the skeletal structure of a person, based on the acquired image of the person (S102). FIG. 6 illustrates a detection example of a skeletal structure. As illustrated in FIG. 6, an image acquired from a surveillance camera or the like includes a plurality of persons, and a skeletal structure is detected for each person included in the image.

Figure 7:
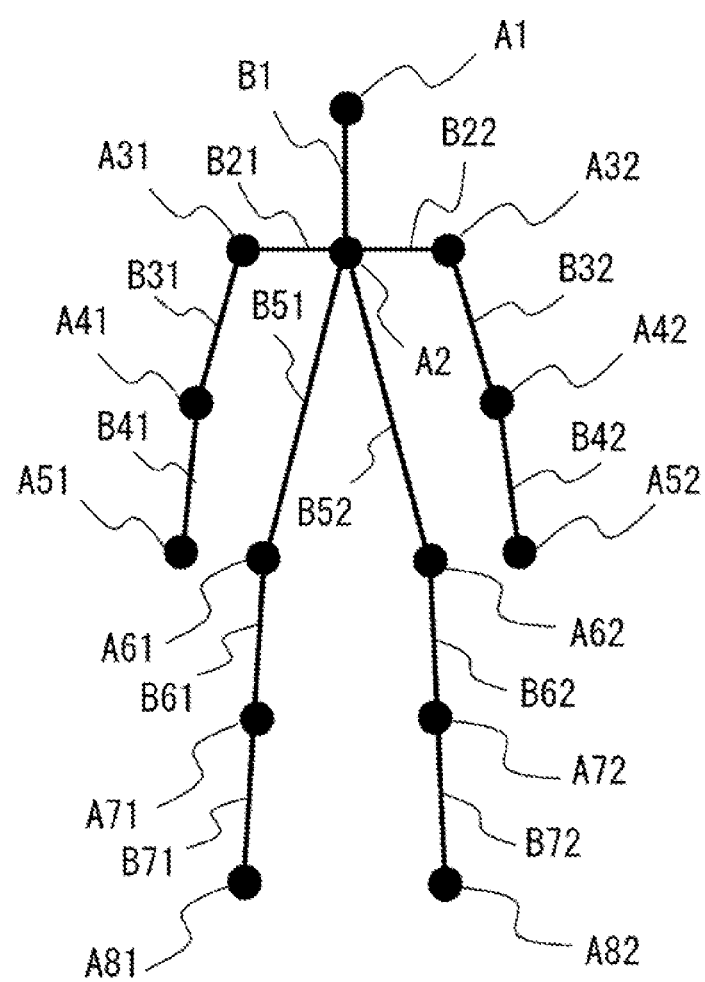
FIG. 7 is a diagram illustrating a human body model according to the first example embodiment.
Figure 8:
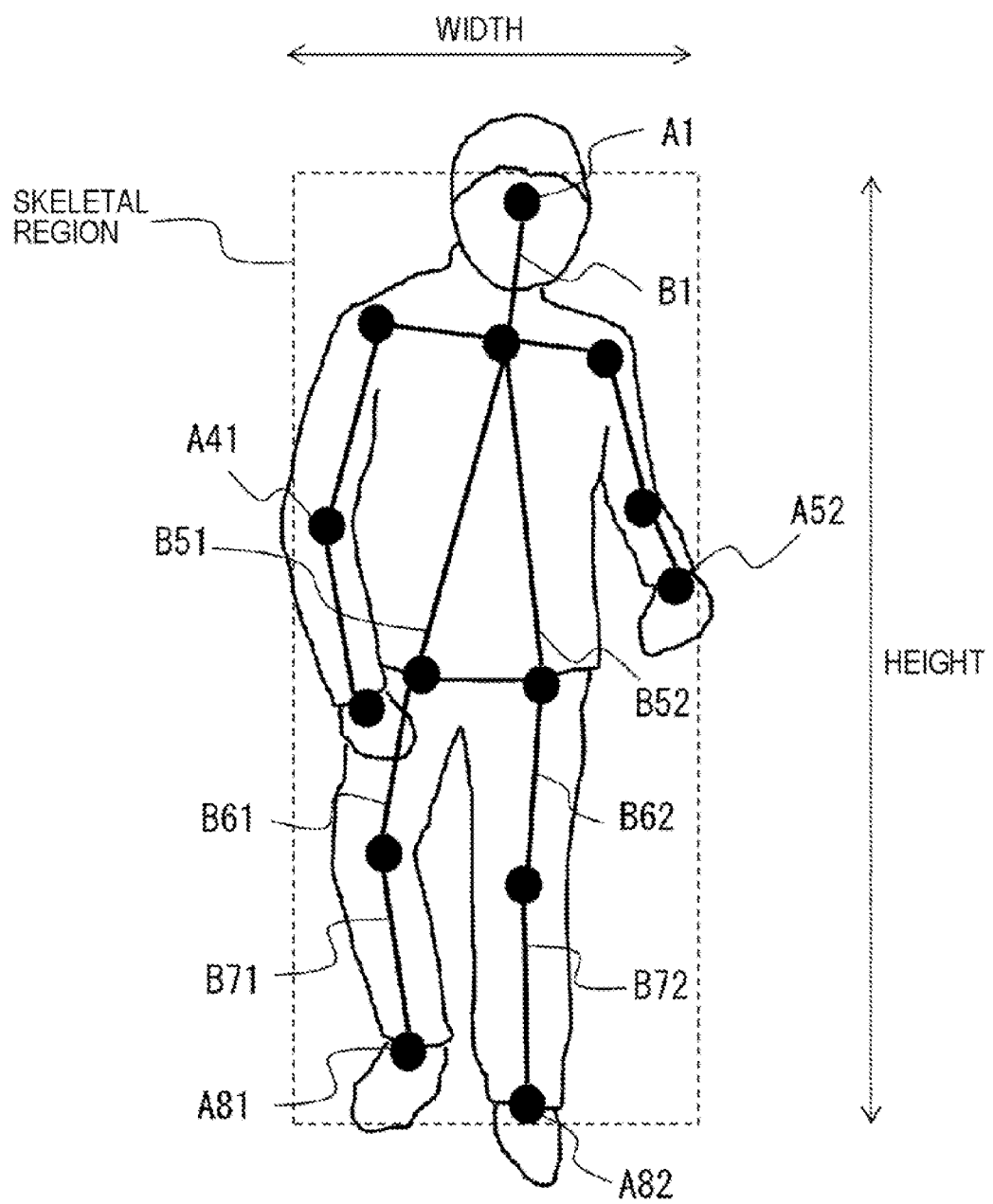
FIG. 8 is a diagram illustrating a detection example of a skeletal structure according to the first example embodiment.
Figure 9:
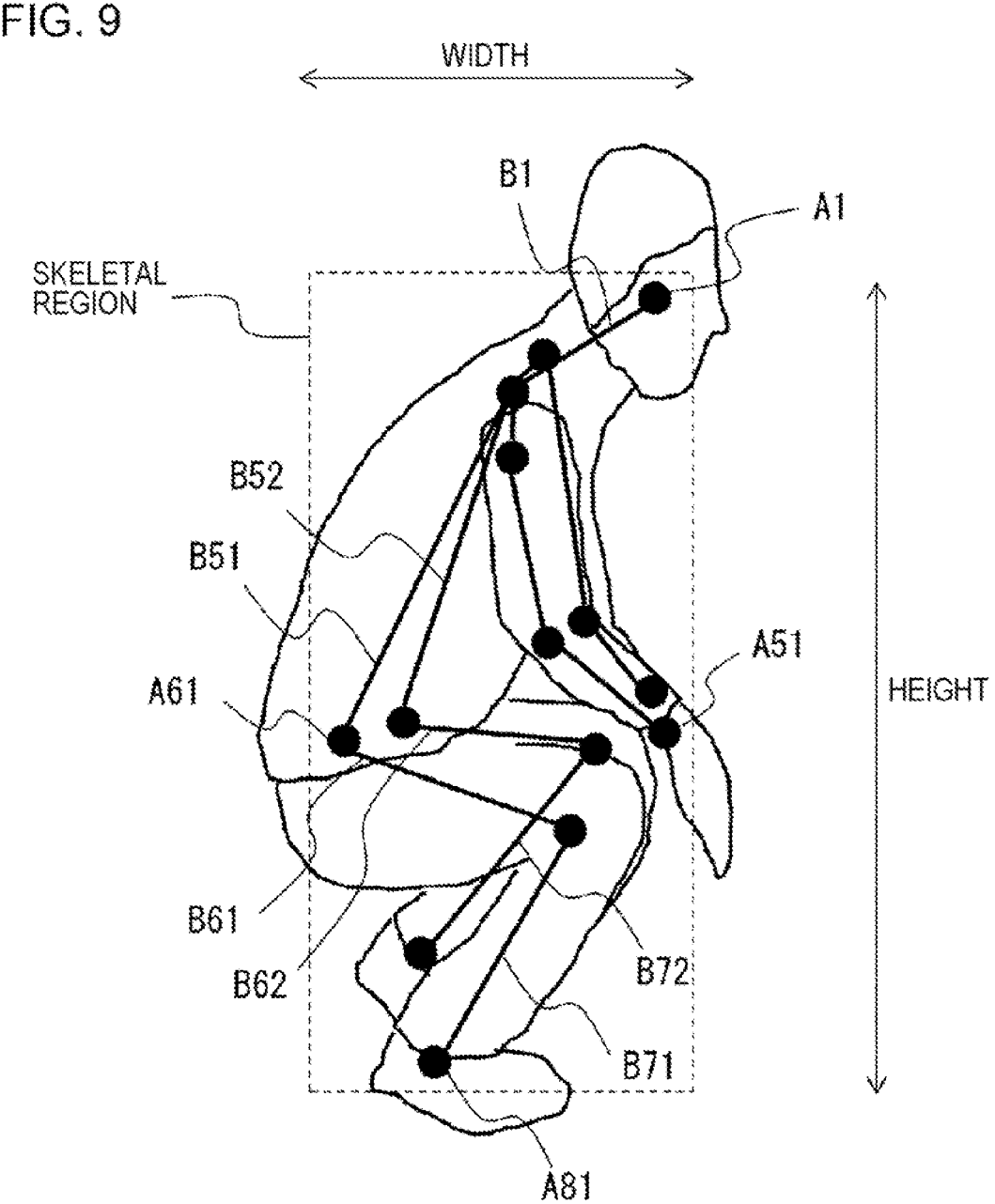
FIG. 9 is a diagram illustrating a detection example of a skeletal structure according to the first example embodiment.
Figure 10:
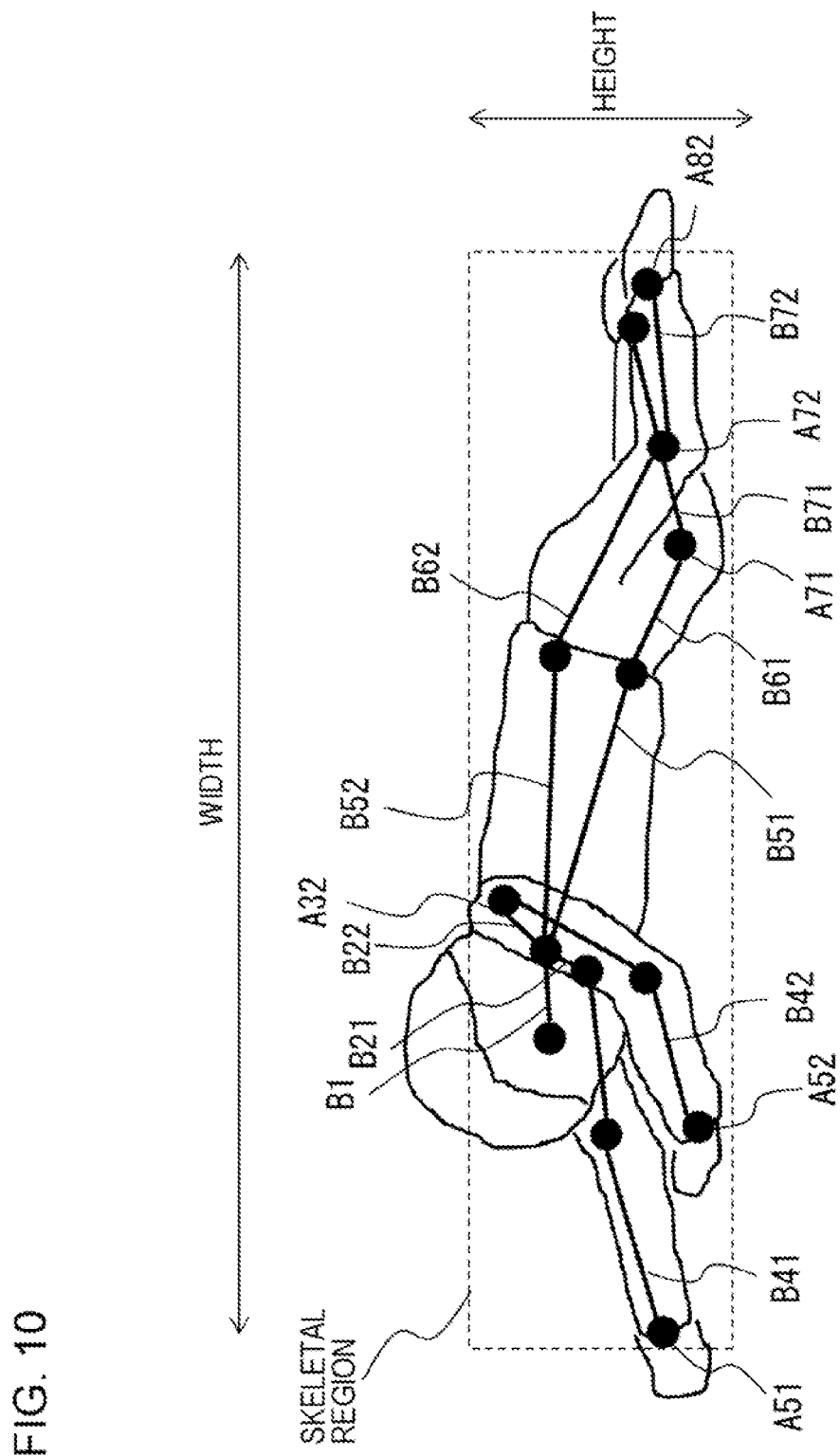
FIG. 10 is a diagram illustrating a detection example of a skeletal structure according to the first example embodiment.

FIG. 7 illustrates a skeletal structure of a human body model 300 to be detected at this time, and FIGS. 8 to 10 illustrate detection examples of the skeletal structure. The skeletal structure detection unit 102 detects the skeletal structure of the human body model (two-dimensional skeleton model) 300 as illustrated in FIG. 7 from the two-dimensional image by using a skeleton estimation technique such as OpenPose. The human body model 300 is a two-dimensional model composed of keypoints such as a joint of a person and bones connecting each of the keypoints.

For example, the skeletal structure detection unit 102 extracts feature points that may be keypoints from the image, and detects each keypoint of the person with reference to information acquired by machine learning the image of the keypoint. In the example of FIG. 7, the head A1, the neck A2, the right shoulder A31, the left shoulder A32, the right elbow A41, the left elbow A42, the right hand A51, the left hand A52, the right waist A61, the left waist A62, the right knee A71, the left knee A72, the right foot A81, and the left foot A82 are detected as keypoints of the person. Further, as bones of the person connecting each of the keypoints, a bone B1 connecting the head A1 and the neck A2, a bone B21 connecting the neck A2 and the right shoulder A31 and a bone B22 connecting the neck A2 and the left shoulder A32, a bone B31 connecting the right shoulder A31 and the right elbow A41 and a bone B32 connecting the left shoulder A32 and the left elbow A42, a bone B41 connecting the right elbow A41 and the right hand A51 and a bone B42 connecting the left elbow A42 and the left hand A52, a bone B51 connecting the neck A2 and the right waist A61, a bone B52 connecting the neck A2 and the left waist A62, a bone B61 connecting the right waist A61 and the right knee A71, a bone B62 connecting the left waist A62 and the left knee A72, and a bone B71 connecting the right knee A71 and the right foot A81 and a bone B72 connecting the left knee A72 and the left foot A82 are detected. The skeletal structure detection unit 102 stores the detected skeletal structure of the person in the database 201.

FIG. 8 is an example of detecting a person in an upright state. In FIG. 8, an image of a person standing upright is captured from the front, and each of the bone B1, the bones B51 and B52, the bones B61 and B62, and the bones B71 and B72 viewed from the front are detected without overlapping one another, wherein the bones B61 and B71 of the right leg are slightly bent more than the bones B62 and B72 of the left leg.

FIG. 9 is an example of detecting a person in a squatted state. In FIG. 9, an image of a person who is squatting is captured from the right side, and each of the bone B1, the bones B51 and B52, the bones B61 and B62, and the bones B71 and B72 viewed from the right side are detected, wherein the bones B61 and B71 of the right leg and the bones B62 and B72 of the left leg are greatly bent and overlap each other.

FIG. 10 is an example of detecting a person in a lying state. In FIG. 10, an image of a person who is lying down is captured from diagonally front left, and each of the bone B1, the bones B51 and B52, the bones B61 and B62, and the bones B71 and B72 viewed from diagonally front left are detected, wherein the bones B61 and B71 of the right leg and the bones B62 and B72 of the left leg are bent and overlap each other.

Subsequently, as illustrated in FIG. 3, the image processing apparatus 100 computes the feature value of the detected skeletal structure (S103). For example, in a case where the height and the area of the skeleton region are set as feature values, the feature value computing unit 103 extracts a region including the skeletal structure and acquires the height (the number of pixels) and the area (pixel area) of such region. The height and the area of the skeleton region are acquired from coordinates of an end portion of the skeleton region to be extracted and coordinates of the keypoint of the end portion. The feature value computing unit 103 stores the acquired feature value of the skeletal structure in the database 201.

In the example of FIG. 8, a skeleton region including all bones is extracted from a skeletal structure of the person standing upright. In such a case, the upper end of the skeleton region is the keypoint A1 of the head part, the lower end of the skeleton region is the keypoint A82 of the left foot, the left end of the skeleton region is the keypoint A41 of the right elbow, and the right end of the skeleton region is the keypoint A52 of the left hand. Therefore, the height of the skeleton region is acquired from the difference between the Y-coordinates of the keypoint A1 and the keypoint A82. Further, the width of the skeleton region is acquired from the difference between the X-coordinates of the keypoint A41 and the keypoint A52, and the area of the skeleton region is acquired from the height and the width thereof.

In the example of FIG. 9, a skeleton region including all bones is extracted from a skeletal structure of the squatted person. In such a case, the upper end of the skeleton region is the keypoint A1 of the head part, the lower end of the skeleton region is the keypoint A81 of the right foot, the left end of the skeleton region is the keypoint A61 of the right waist, and the right end of the skeleton region is the keypoint A51 of the right hand. Therefore, the height of the skeleton region is acquired from the difference between the Y-coordinates of the keypoint A1 and the keypoint A81. Further, the width of the skeleton region is acquired from the difference between the X-coordinates of the keypoint A61 and the keypoint A51, and the area of the skeleton region is acquired from the height and the width thereof.

In the example of FIG. 10, a skeleton region including all bones is extracted from a skeletal structure of the person lying in the left-right direction of an image. In such a case, the upper end of the skeleton region is the keypoint A32 of the left shoulder, the lower end of the skeleton region is the keypoint A52 of the left hand, the left end of the skeleton region is the keypoint A51 of the right hand, and the right end of the skeleton region is the keypoint A82 of the left foot. Therefore, the height of the skeleton region is acquired from the difference between the Y-coordinates of the keypoint A32 and the keypoint A52. Further, the width of the skeleton region is acquired from the difference between the X-coordinates of the keypoint A51 and the keypoint A82, and the area of the skeleton region is acquired from the height and the width thereof.

Figure 11:
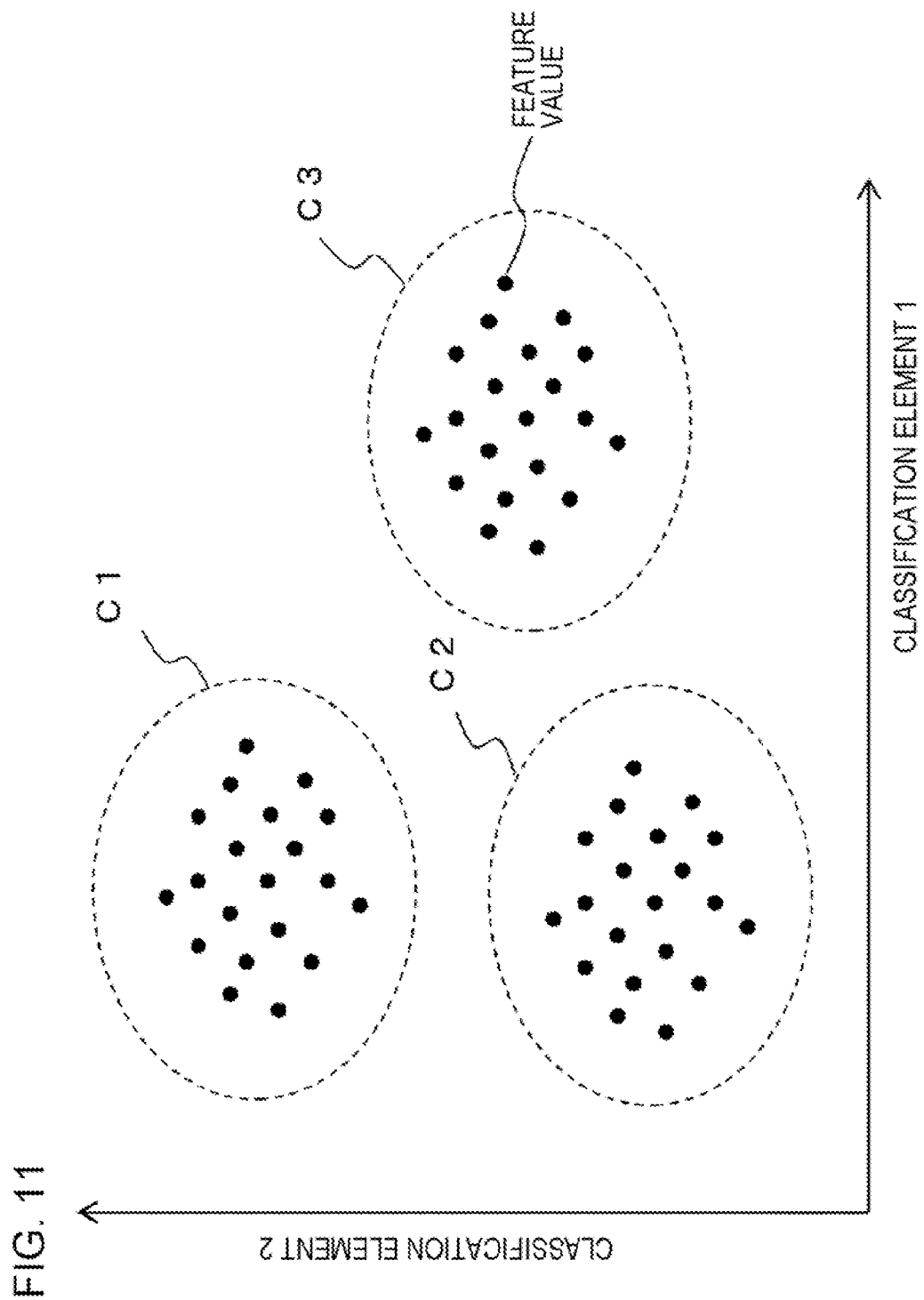
FIG. 11 is a graph illustrating a specific example of the classification method according to the first example embodiment.

Subsequently, as illustrated in FIG. 3, the image processing apparatus 100 performs classification processing (S104). In the classification processing, as illustrated in FIG. 4, the classification unit 104 computes the degree of similarity of the computed feature value of the skeletal structure (S111), and classifies the skeletal structure, based on the computed feature value (S112). The classification unit 104 acquires the degree of similarity of the feature values among all the skeletal structures stored in the database 201 as the classification target, and classifies (clusters) the skeletal structures (poses) having the highest degree of similarity into the same cluster. Further, the degree of similarity between the classified clusters is determined and classified, and the classification is repeated until a predetermined number of clusters are reached. FIG. 11 illustrates an image of the classification result of the feature values of the skeletal structure. FIG. 11 is an image of cluster analysis by a two-dimensional classification element, where the two classification elements are, for example, the height of the skeleton region, the area of the skeleton region, and the like. In FIG. 11, as a result of the classification, the feature values of the plurality of skeletal structures are classified into three clusters C1 to C3. The clusters C1 to C3 correspond to the respective poses such as, for example, a standing pose, a sitting pose, and a lying pose, and the skeletal structure (person) is classified for each similar pose.

In the present example embodiment, various classification methods can be used by classifying based on the feature value of the skeletal structure of the person. The classification method may be set in advance or may be set freely by the user. Further, the classification may be performed by the same method as the search method described later. That is, the classification may be performed according to a classification condition similar to the search condition. For example, the classification unit 104 performs classification by the following classification method. Any classification method may be used, or any selected classification methods may be combined with each other.

(Classification Method 1)

Classification based on multiple hierarchy: classification is performed by hierarchically combining classification by the skeletal structure of the whole body, classification by the skeletal structure of the upper body and the lower body, classification by the skeletal structure of the arm and the leg, etc. That is, the classification may be performed by classifying based on the feature value of a first portion or a second portion of the skeletal structure, and further classifying by weighting the feature value of the first portion or the second portion.

(Classification Method 2)

Classification based on a plurality of time-series images: classification is performed based on a feature value of a skeletal structure in a plurality of images that are consecutive in time series. For example, the feature values may be stacked in the time-series direction and classified based on cumulative values. Further, classification may be performed based on a change (change amount) in the feature value of the skeletal structure in the plurality of consecutive images.

(Classification Method 3)

Classification ignoring the left and right of a skeletal structure: classification is performed by classifying skeletal structures in which the right side and the left side of the person are opposite to each other as the same skeletal structure.

Figure 12:
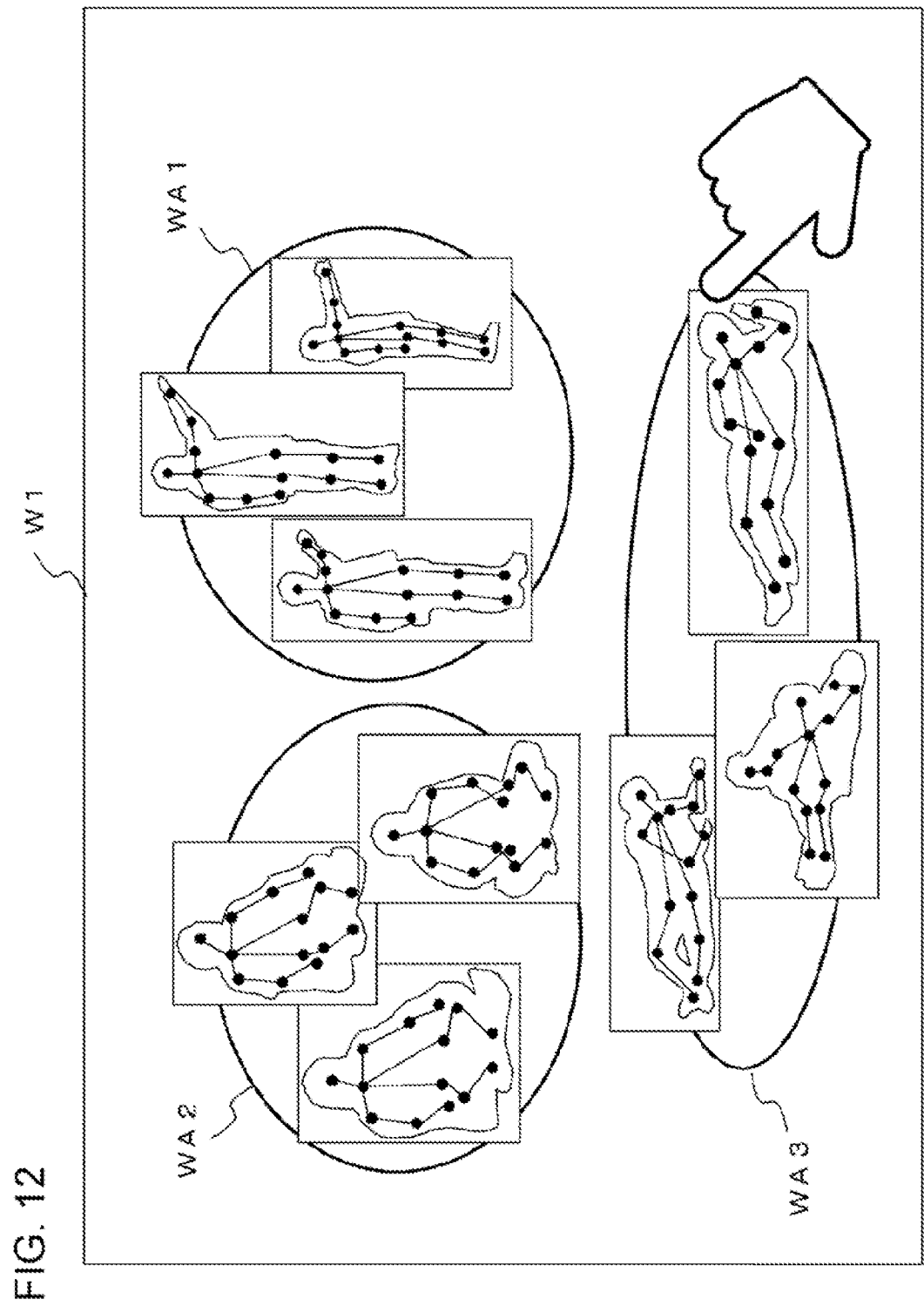
FIG. 12 is a diagram illustrating a display example of a classification result according to the first example embodiment.

Further, the classification unit 104 displays the classification result of the skeletal structure (S113). The classification unit 104 acquires a necessary image of a skeletal structure or a person from the database 201, and displays the skeletal structure and the person on the display unit 107 for each similar pose (cluster) as a classification result. FIG. 12 illustrates a display example when the pose is classified into three groups. For example, as illustrated in FIG. 12, pose regions WA1 to WA3 for each pose are displayed in a display window W1, and the skeletal structure and the person (image) of the pose corresponding to each of the pose regions WA1 to WA3 are displayed. The pose region WA1 is, for example, a display region of a standing pose, and displays a skeletal structure and a person similar to the standing pose and classified in the cluster C1. The pose region WA2 is, for example, a display region of a sitting pose, and displays a skeletal structure and a person similar to the sitting pose and classified in the cluster C2. The pose region WA3 is, for example, a display region of a lying pose, and displays a skeletal structure and a person similar to the lying pose and classified in the cluster C3.

Subsequently, as illustrated in FIG. 3, the image processing apparatus 100 performs search processing (S105). In the search processing, as illustrated in FIG. 5, the search unit 105 receives an input of a search condition (S121), and searches for a skeletal structure, according to the search condition (S122). The search unit 105 receives, from the input unit 106, an input of a search query being a search condition according to an operation by the user. When the search query is input from the classification result, for example, in the display example of FIG. 12, the user specifies (selects) the skeletal structure of the pose to be searched for from among the pose regions WA1 to WA3 displayed in the display window W1. Then, the search unit 105 searches for a skeletal structure having a high degree of similarity of feature values from all the skeletal structures stored in the database 201 being searched, by using the skeletal structure specified by the user as a search query. The search unit 105 computes the degree of similarity between the feature value of the skeletal structure of the search query and the feature value of the skeletal structure of the search target, and extracts the skeletal structure which has the computed degree of similarity higher than a predetermined threshold. As the feature value of the skeletal structure of the search query, a feature value computed in advance may be used, or a feature value acquired at the time of search may be used. Note that, the search query may be input by moving each part of the skeletal structure according to an operation of the user, or a pose performed by the user in front of the camera may be used as a search query.

In the present example embodiment, similarly to the classification method, various search methods may be used by searching based on the feature value of the skeletal structure of the person. The search method may be set in advance or may be set freely by the user. For example, the search unit 105 performs a search by the following search method. Any search method may be used, or any selected search methods may be combined with each other. The search may be performed by combining a plurality of search methods (search conditions) by using a logical expression (for example, AND (logical conjunction), OR (logical disjunction), or NOT (negative)). For example, search may be performed by using [(a pose in which the right hand is raised) AND (a pose in which the left foot is raised)] as the search condition.

(Search Method 1)

Figure 13:
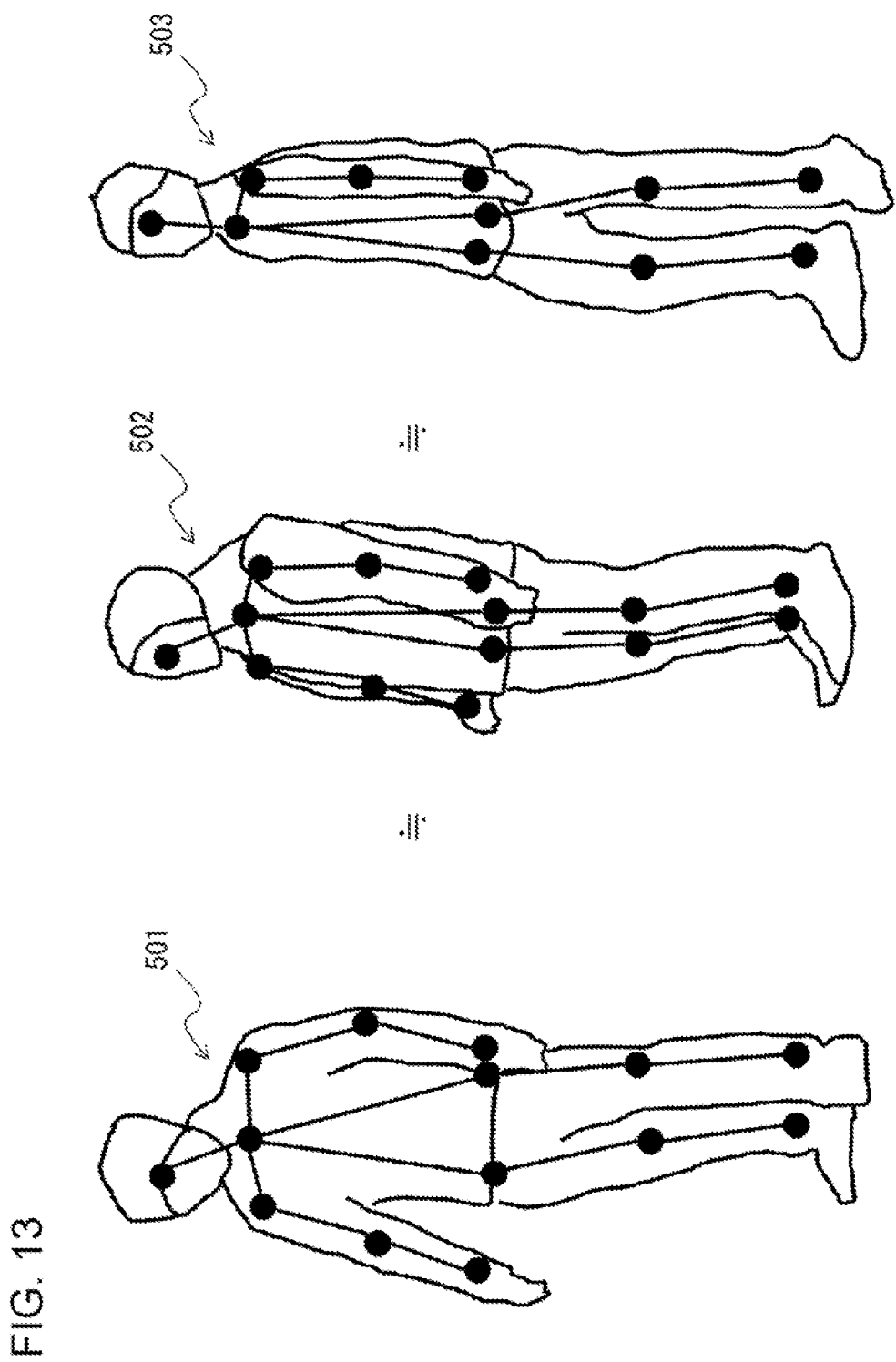
FIG. 13 is a diagram for describing the search method according to the first example embodiment.

Search based on only a feature value in the height direction: a search is performed by using only the feature value in the height direction of a person, thereby the influence of a change in the lateral direction of the person can be suppressed, and the robustness against changes in the orientation of the person and the body shape of the person is improved. For example, as in the skeletal structures 501 to 503 of FIG. 13, even when the orientation and the body shape of the person are different, the feature value in the height direction does not change greatly. Therefore, it can be determined that the skeletal structures 501 to 503 are in the same pose at the time of search (at the time of classification).

(Search Method 2)

Figure 14:
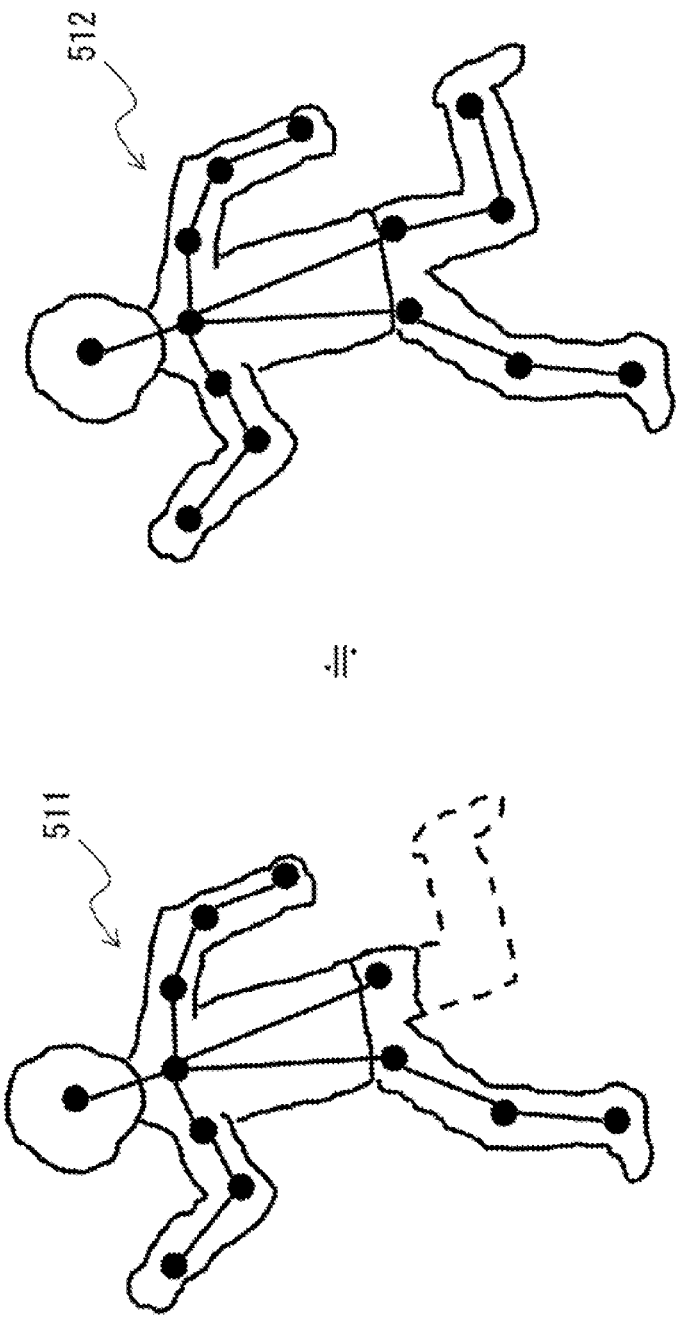
FIG. 14 is a diagram for describing the search method according to the first example embodiment.
Figure 15:
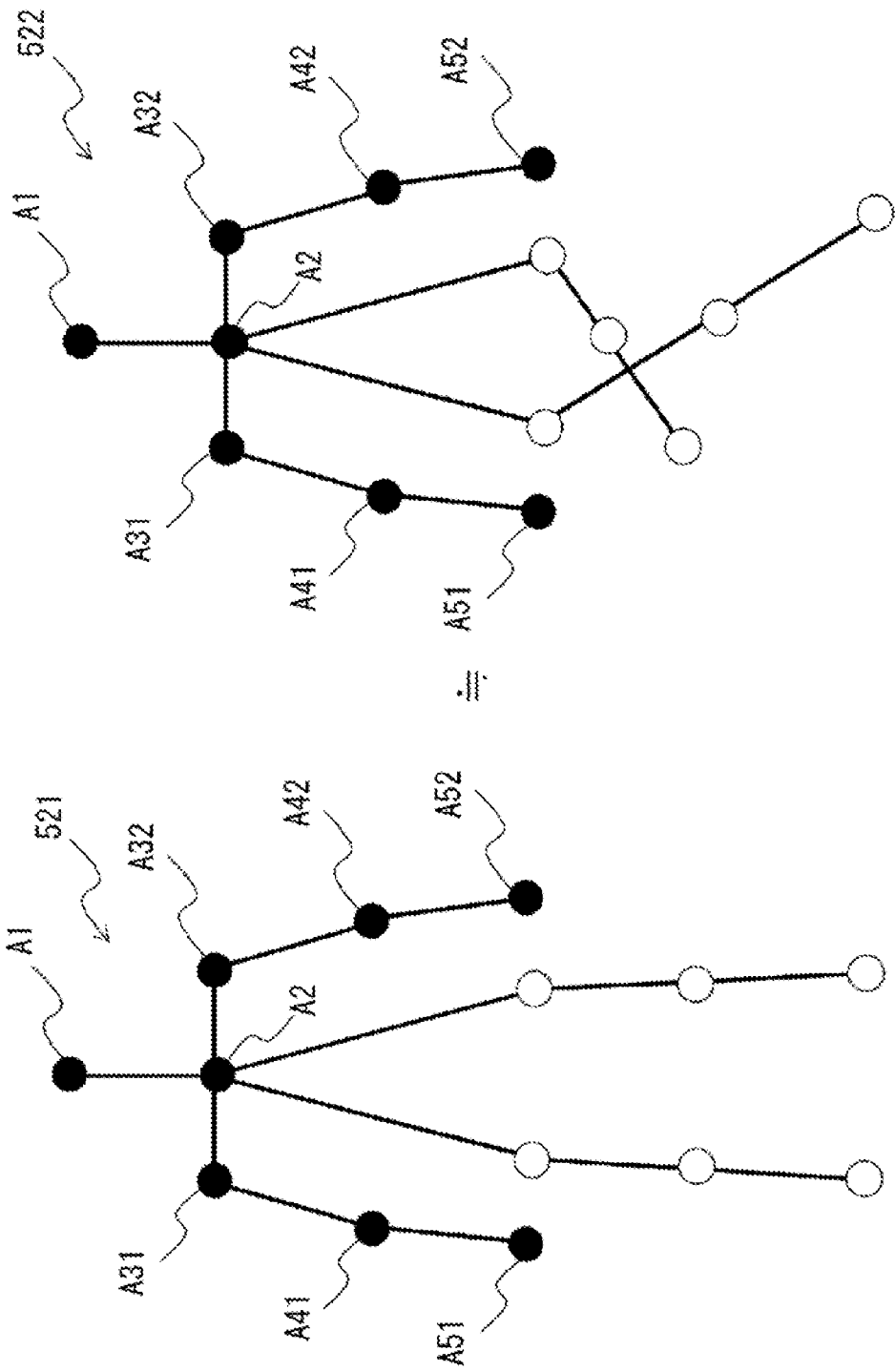
FIG. 15 is a diagram for describing the search method according to the first example embodiment.

Search based on portions: when a part of a body of a person is hidden in the image, a search is performed by using only information of recognizable portions. For example, as in the skeletal structures 511 and 512 of FIG. 14, even when the keypoint of the left foot cannot be detected due to the left foot being hidden, it is possible to perform the search by using feature values of other keypoints being detected. Therefore, it can be determined that the skeletal structures 511 and 512 are in the same pose at the time of search (at the time of classification). That is, classification and search may be performed by using feature values of some of the keypoints instead of all the keypoints. In the example of the skeletal structures 521 and 522 of FIG. 15, although the orientations of both feet are different from each other, it is possible to determine that the poses are the same by using the feature values of the keypoints (A1, A2, A31, A32, A41, A42, A51, A52) of the upper body as a search query. Further, a search may be performed by weighting a portion (feature point) to be searched for, or the threshold value for the determination of the degree of similarity may be changed. When a part of the body is hidden, the search may be performed by ignoring the hidden portion, or the search may be performed by taking the hidden portion into consideration. By searching including a hidden portion, it is possible to search for a pose in which the same portion may be hidden.

(Search Method 3)

Figure 16:
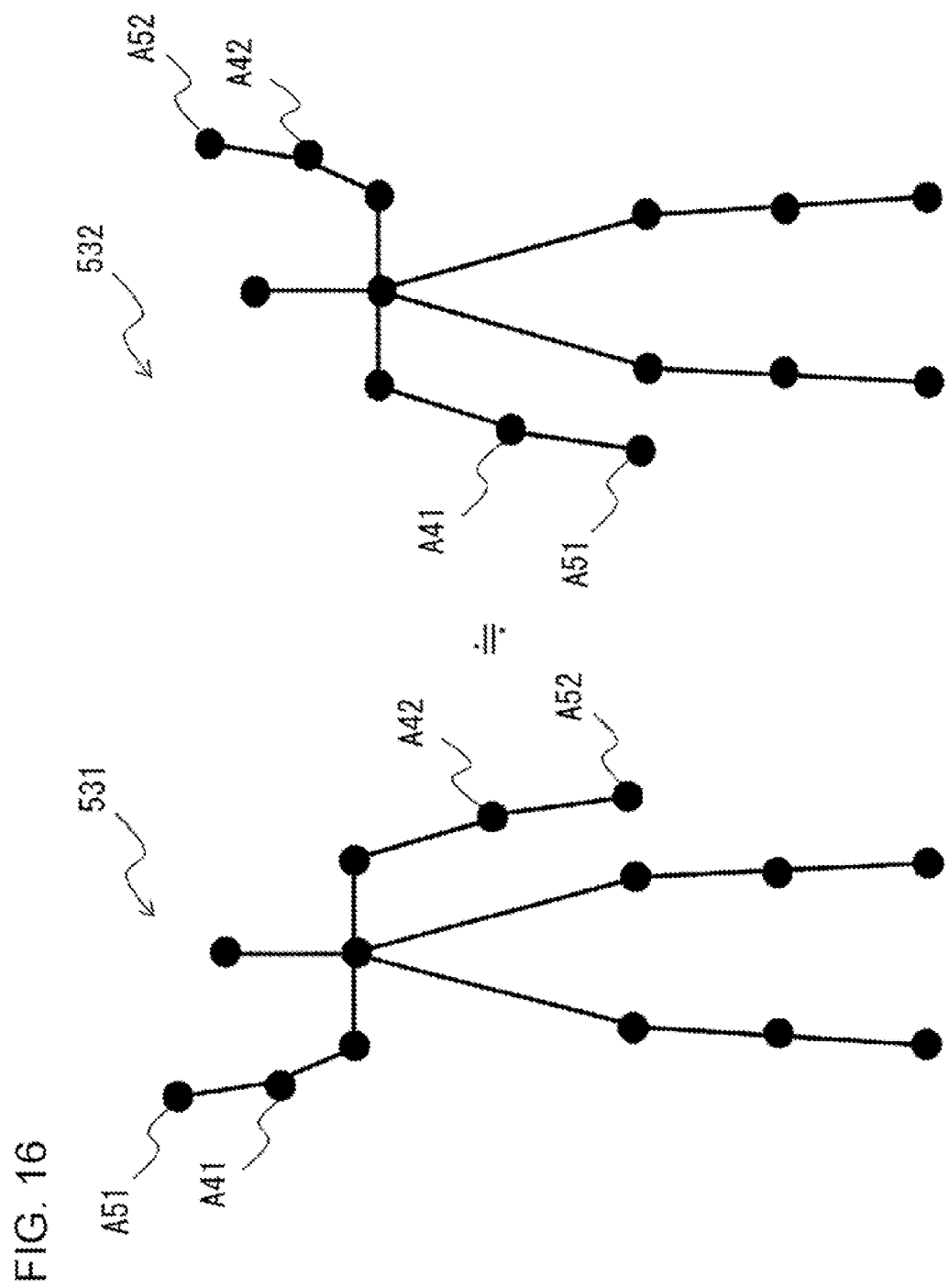
FIG. 16 is a diagram for describing the search method according to the first example embodiment.

Search ignoring the left and right of a skeletal structure: a search is performed by assuming that skeletal structures in which the right side and the left side of the person are opposite to each other as the same skeletal structure. For example, as in the skeletal structures 531 and 532 of FIG. 16, a pose in which the right hand is raised and a pose in which the left hand is raised can be searched (classified) as the same pose. In the example of FIG. 16, the skeletal structure 531 and the skeletal structure 532 have different positions of the keypoint A51 of the right hand, the keypoint A41 of the right elbow, the keypoint A52 of the left hand, and the keypoint A42 of the left elbow, but the other keypoints are in the same positions. When keypoints of one of the skeletal structures between the keypoint A51 of the right hand and the keypoint A41 of the right elbow of the skeletal structure 531 and the keypoint A52 of the left hand and the keypoint A42 of the left elbow of the skeletal structure 532 are left-right inverted, the keypoints thereof becomes the same positions as the keypoints of the other skeletal structure, and when the keypoints of one of the skeletal structures between the keypoint A52 of the left hand and the keypoint A42 of the left elbow of the skeletal structure 531 and the keypoint A51 of the right hand and the keypoint A41 of the right elbow of the skeletal structure 532 are left-right inverted, the keypoints thereof becomes the same positions as the keypoints of the other skeletal structure, thus the skeletal structures are determined to have the same pose.

(Search Method 4)

Search based on feature values in the vertical direction and the lateral direction: a search is performed based on only the feature value in the vertical direction (Y-axis direction) of the person, thereafter the acquired result is further searched by using the feature value in the lateral direction (X-axis direction) of the person.

(Search Method 5)

Search based on a plurality of time-series images: a search is performed based on a feature value of a skeletal structure in a plurality of images consecutive in time series. For example, the feature values may be accumulated in time series direction and searched based on the accumulated values. Further, the search may be performed based on a change (change amount) in the feature value of the skeletal structure in a plurality of consecutive images.

Figure 17:
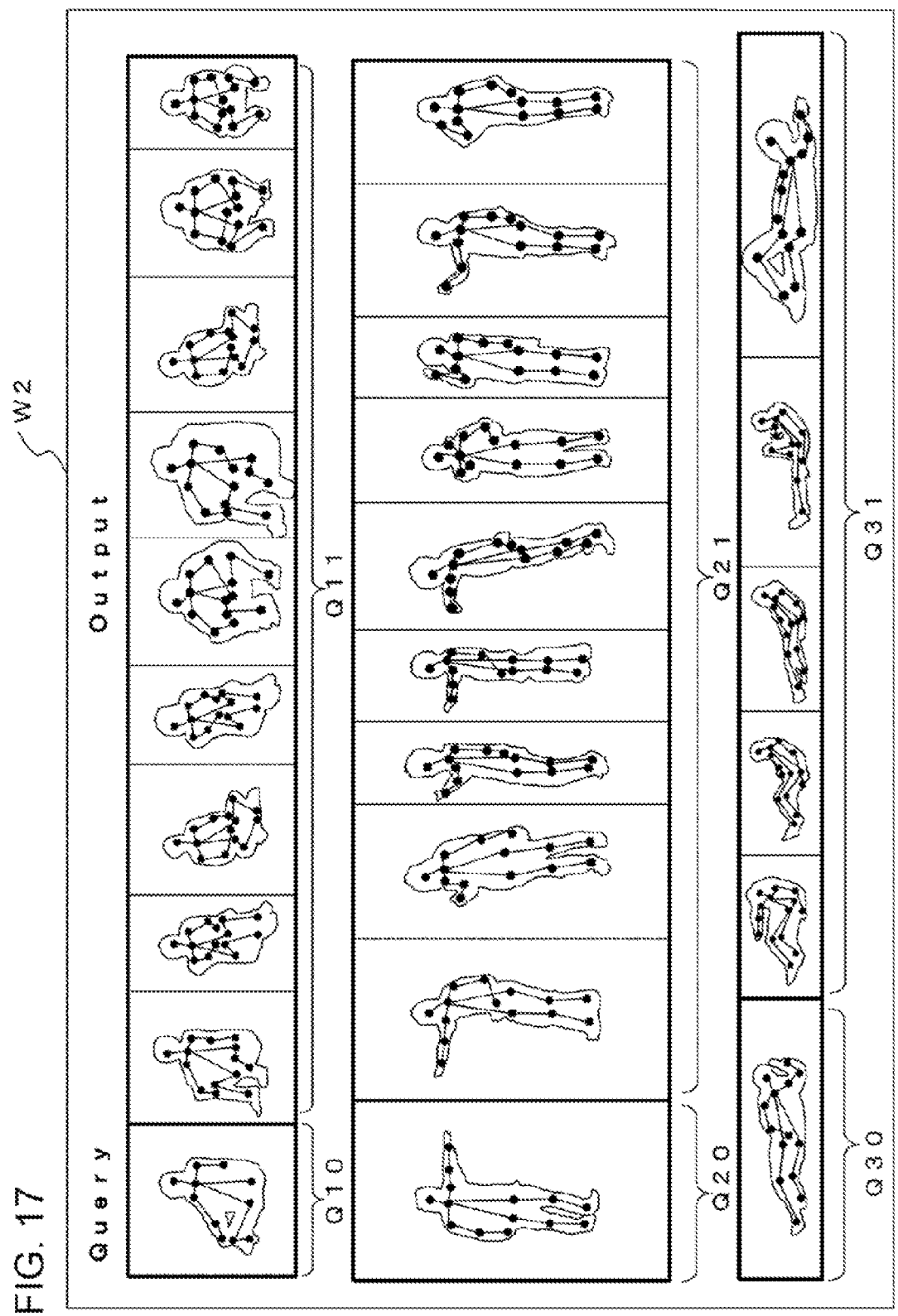
FIG. 17 is a diagram illustrating a display example of a search result according to the first example embodiment.

Further, the search unit 105 displays the search result of the skeletal structure (S123). The search unit 105 acquires a necessary image of a skeletal structure and a person from the database 201, and displays the skeletal structure and the person acquired as a search result on the display unit 107. For example, when a plurality of search queries (search conditions) are specified, the search results are displayed for each search query. FIG. 17 illustrates a display example in a case of searching by three search queries (poses). For example, as illustrated in FIG. 17, in a display window W2, the skeletal structures and the persons of the specified search queries Q10, Q20, Q30 are displayed at the left end portion, and the skeletal structures and the persons of the search results Q11, Q21, Q31 of each of the search queries are displayed in line on the right side of the search queries Q10, Q20, Q30.

The order in which the search results are displayed in line from next to the search query may be the order in which the corresponding skeletal structures were found, or may be the order in which the degree of similarity is high. In a case where a search is performed by weighting a portion (feature point) for the partial search, the search results may be displayed in the order of the degree of similarity computed by weighting. The search results may be displayed in the order of the degree of similarity computed from only a portion (feature point) selected by a user. Further, the images (frames) for a certain period before and after the image (frame) of the search result in time series may be cut out and displayed.

As described above, in the present example embodiment, the skeletal structure of a person can be detected from a two-dimensional image, and classification and search may be performed based on the feature value of the detected skeletal structure. As a result, it is possible to classify each similar pose having a high degree of similarity, and it is also possible to search for a similar pose having a high degree of similarity to a search query (search key). By classifying and displaying a similar pose from the image, the user can recognize the pose of the person in the image without specifying the pose or the like. Since the user can specify the pose of the search query from the classification results, a desired pose can be searched for even when the pose that the user desires to search for is not recognized in detail in advance. For example, it is possible to perform a classification or a search with the whole or a part of the skeletal structure of a person as a condition, and thus it is possible to perform a flexible classification or search.

Second Example Embodiment

Hereinafter, a second example embodiment will be described with reference to the drawings. In the present example embodiment, a specific example of feature value computation in the first example embodiment will be described. In the present example embodiment, the feature value is acquired by normalization by using the height of the person. Other configurations are the same as those in the first example embodiment.

Figure 18:
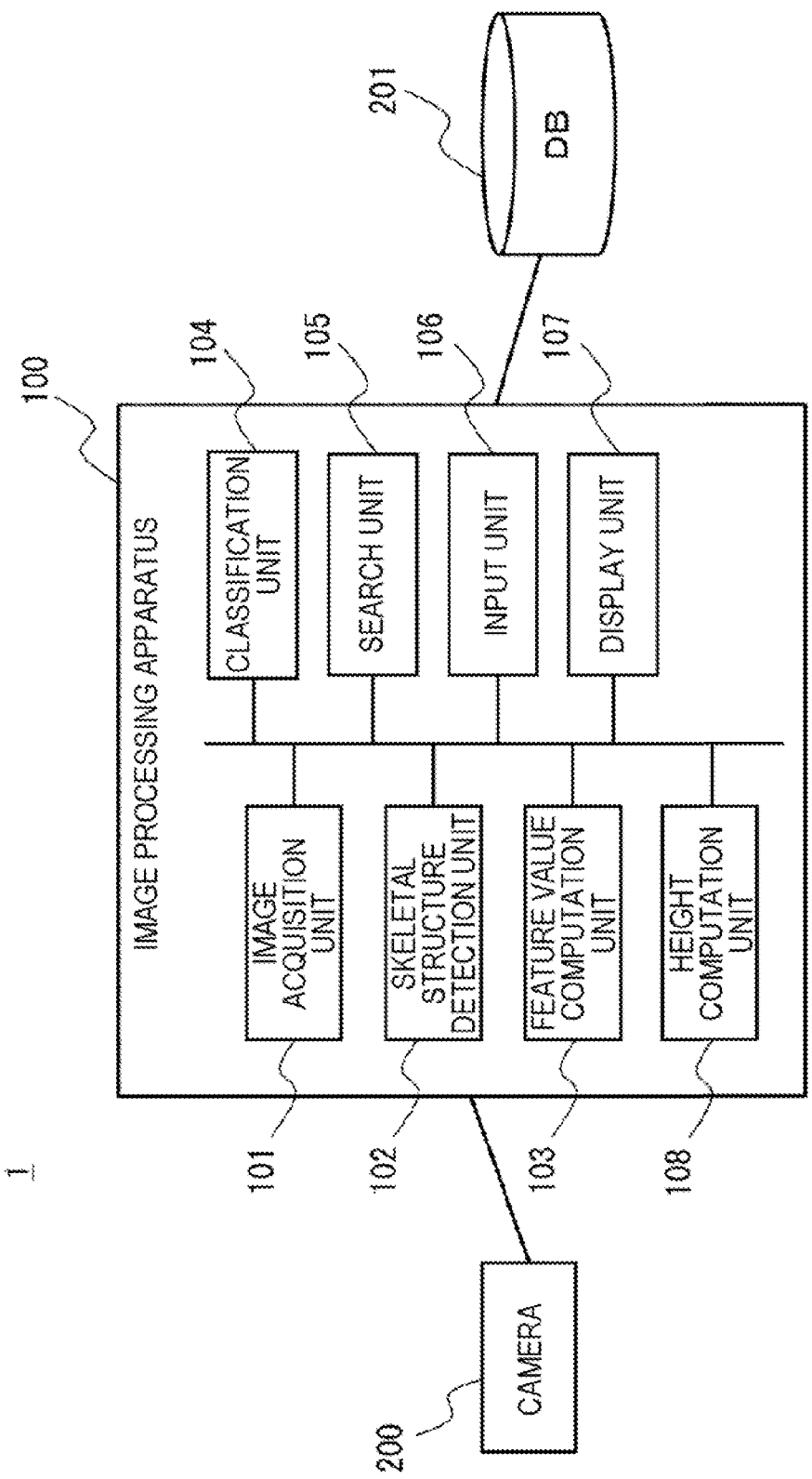
FIG. 18 is a configuration diagram illustrating a configuration of an image processing apparatus according to a second example embodiment.

FIG. 18 illustrates a configuration of an image processing apparatus 100 according to the present example embodiment. As illustrated in FIG. 18, the image processing apparatus 100 further includes a height computing unit 108 in addition to the configuration of the first example embodiment. Note that a feature value computing unit 103 and the height computing unit 108 may be one processing unit.

The height computing unit (height estimation unit) 108 computes (estimates) the height of the person in the two-dimensional image when the person stands upright (referred to as the number of pixels of height), based on a two-dimensional skeletal structure detected by a skeletal structure detection unit 102. The number of pixels of height can also be said to be the height of the person in the two-dimensional image (the length of the whole body of the person in the two-dimensional image space). The height computing unit 108 acquires the number of pixels of height (the number of pixels) from the length (the length in the two-dimensional image space) of each bone of the detected skeletal structure.

In the following examples, specific examples 1 to 3 are used as a method for acquiring the number of pixels of height. The method of any one of the specific examples 1 to 3 may be used, or a plurality of any of selected methods may be used in combination. In the specific example 1, the number of pixels of height is acquired by summing the lengths of the bones from the head part to the foot part among the bones of the skeletal structure. When the skeletal structure detection unit 102 (skeleton estimation technique) does not output the top of the head and the bottom of the foot, correction may be made as necessary by multiplying by a constant. In the specific example 2, the number of pixels of height is computed by using a human body model indicating a relationship between the length of each bone and the length of the whole body (height in the two-dimensional image space). In the specific example 3, the number of pixels of height is computed by fitting the three-dimensional human body model to the two-dimensional skeletal structure.

The feature value computing unit 103 of the present example embodiment is a normalization unit that normalizes a skeletal structure (skeleton information) of a person, based on the computed number of pixels of height of the person. The feature value computing unit 103 stores the normalized feature value (normalized value) of the skeletal structure in a database 201. The feature value computing unit 103 normalizes the height of each keypoint (feature point) included in the skeletal structure on the image by the number of pixels of height. In the present example embodiment, for example, the height direction is a vertical direction (Y-axis direction) in the two-dimensional coordinate (X-Y coordinate) space of the image. In such a case, the height of the keypoint may be acquired from the value (the number of pixels) of the Y-coordinate of the keypoint. Alternatively, the height direction may be a direction of a vertical projection axis (vertical projection direction) acquired by projecting, onto the two-dimensional coordinate space, a direction of a vertical axis perpendicular to the ground (reference plane) in the three-dimensional coordinate space of the real world. In such a case, the height of the keypoint may be acquired from a value (number of pixels) along a vertical projection axis, the vertical projection axis being acquired by projecting an axis perpendicular to the ground in the real world onto the two-dimensional coordinate space, based on camera parameters. Note that, the camera parameter is an image-capturing parameter of an image, and for example, the camera parameter is a pose, a position, a capturing angle, a focal length, or the like of the camera 200. The camera 200 captures an image of an object the length and position thereof being known in advance, and camera parameters may be determined from such image. Distortion may occur at both ends of the captured image, and the vertical direction of the real world and the up-down direction of the image may not match. Regarding such distortion, by using the parameters of the camera that captured the image, it is possible to recognize how much the vertical direction of the real world is inclined in the image. Therefore, by normalizing the value of the keypoint along the vertical projection axis projected in the image by the height, based on the camera parameters, the keypoint may be featurized in consideration of the deviation between the real world and the image. Note that, the left-right direction (lateral direction) is a left-right direction (X-axis direction) in the two-dimensional coordinate (X-Y coordinate) space of the image, or a direction acquired by projecting a direction parallel to the ground in the three-dimensional coordinate space of the real world onto the two-dimensional coordinate space.

Figure 19:
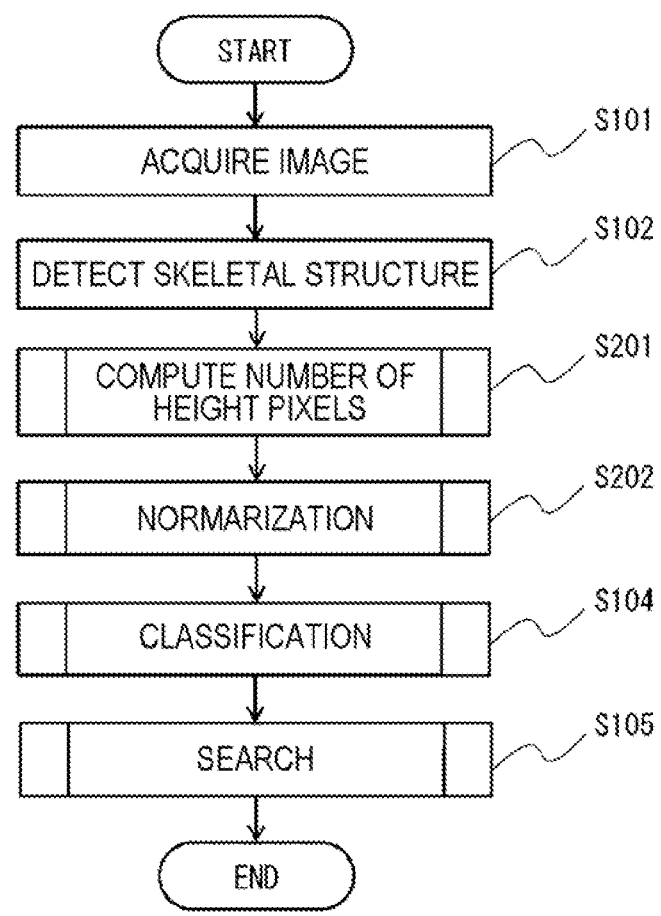
FIG. 19 is a flowchart illustrating an image processing method according to the second example embodiment.
Figure 21:
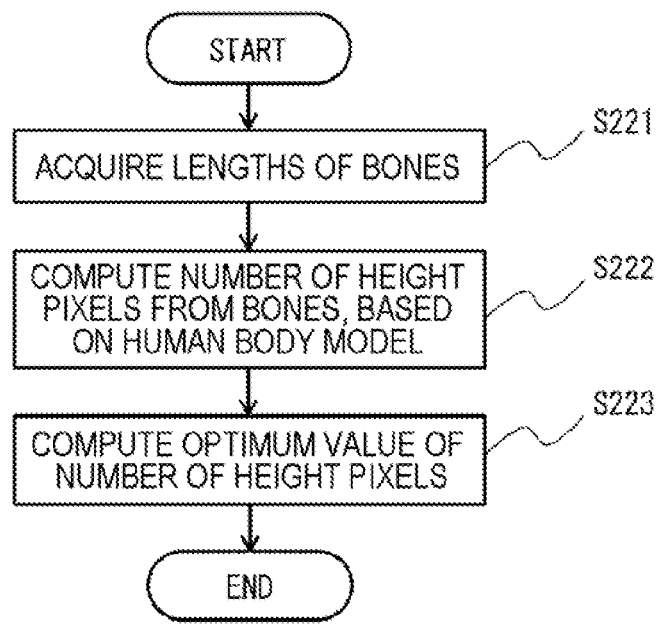
FIG. 21 is a flowchart illustrating a specific example 2 of the method of computing the number of pixels of height according to the second example embodiment.
Figure 22:
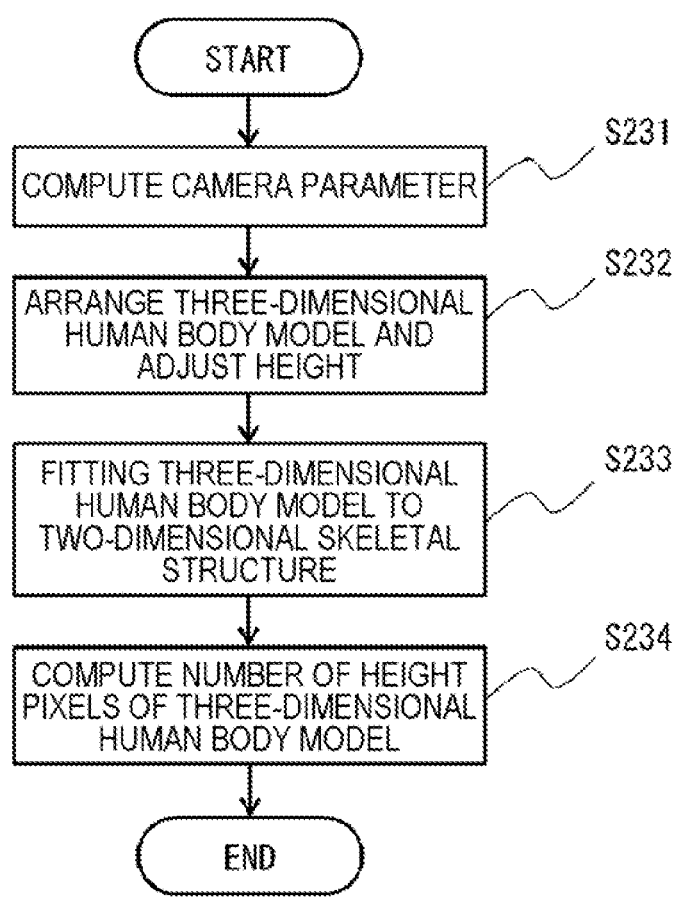
FIG. 22 is a flowchart illustrating the specific example 2 of the method of computing the number of pixels of height according to the third example embodiment.
Figure 23:
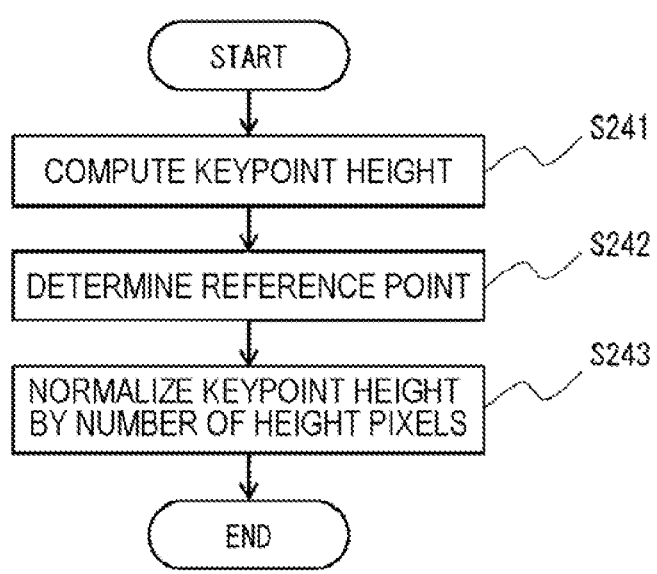
FIG. 23 is a flowchart illustrating a normalization method according to the second example embodiment.

FIGS. 19 to 23 illustrate operations of the image processing apparatus 100 according to the present example embodiment. FIG. 19 illustrates a flow from image acquisition to search processing of the image processing apparatus 100, FIGS. 20 to 22 each illustrate a flow of the specific examples 1 to 3 of the number of pixels of height computing processing (S201) in FIG. 19, and FIG. 23 illustrates a flow of the normalization processing (S202) in FIG. 19.

As illustrated in FIG. 19, in the present example embodiment, as the feature value computing processing (S103) in the first example embodiment, the number of pixels of height computing processing (S201) and the normalization process (S202) are performed. Other features are the same as those in the first example embodiment.

Figure 24:
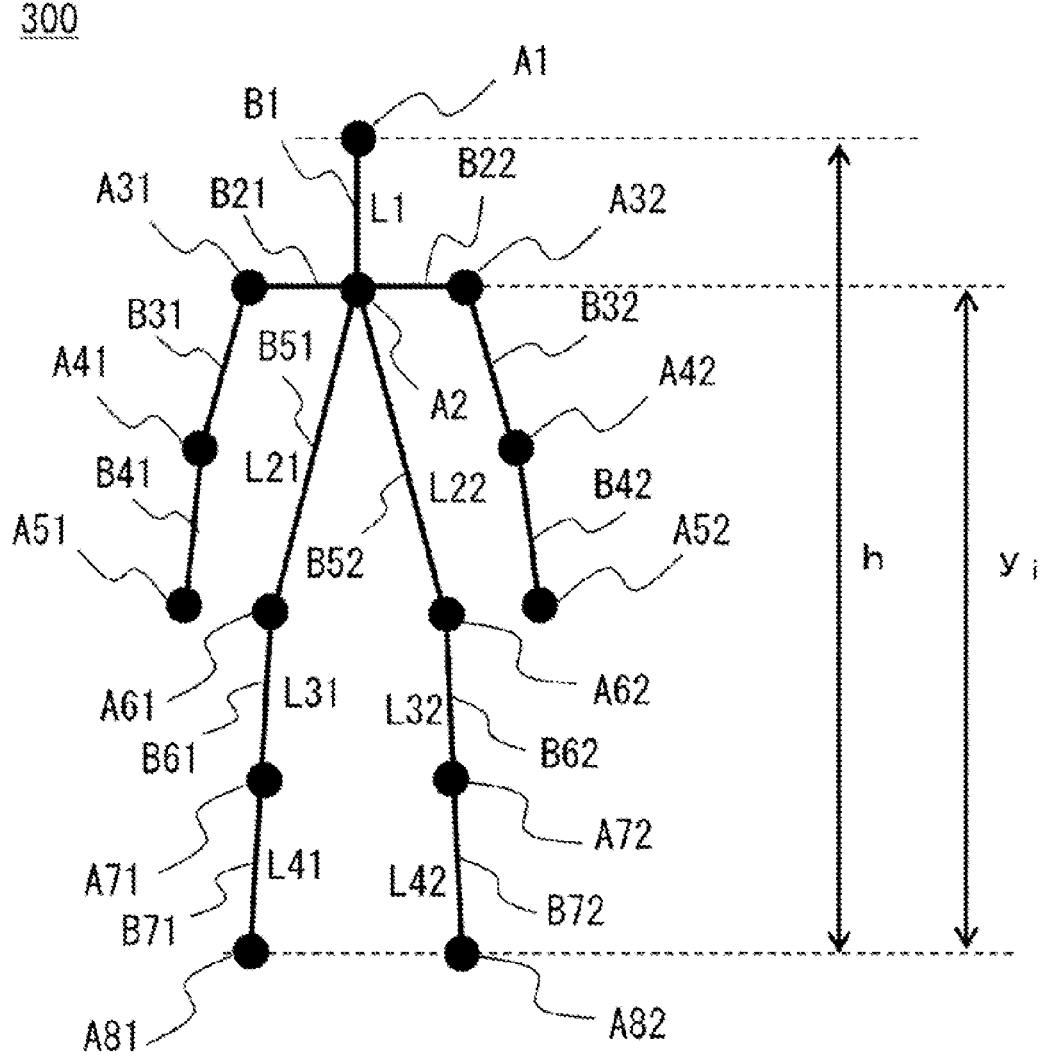
FIG. 24 is a diagram illustrating a human body model according to the second example embodiment.

Following the image acquisition (S101) and the skeletal structure detection (S102), the image processing apparatus 100 performs a number of pixels of height computing processing, based on the detected skeletal structure (S201). In this example, as illustrated in FIG. 24, the height of the skeletal structure of a person standing upright in an image is defined as the number of pixels of height (h), and the height of each keypoint of the skeletal structure in the state of the person in the image is defined as the keypoint height (yi). The specific examples 1 to 3 of the number of pixels of height computing processing will be described below.

Specific Example 1

Figure 20:
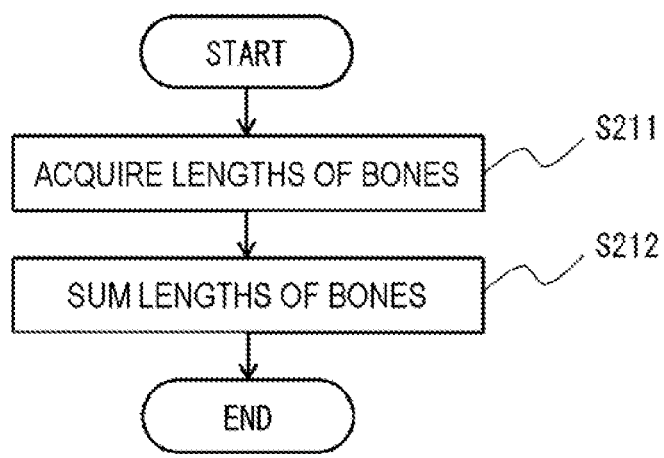
FIG. 20 is a flowchart illustrating a specific example 1 of a method of computing the number of pixels of height according to the second example embodiment.

In the specific example 1, the number of pixels of height is determined by using the lengths of the bones from the head part to the foot part. In the specific example 1, as illustrated in FIG. 20, the height computing unit 108 acquires the length of each bone (S211), and sums the acquired lengths of the bones (S212).

The height computing unit 108 acquires the lengths of the bones on the two-dimensional image from the head part to the foot part of a person, and acquires the number of pixels of height. That is, among the bones in FIG. 24, the respective lengths (the number of pixels) of a bone B1 (a length L1), a bone B51 (a length L21), a bone B61 (a length L31), and a B71 (a length L41), or the bone B1 (the length L1), a bone B52 (a length L22), a bone B62 (a length L32), and a bone B72 (a length L42) are acquired from the image in which the skeletal structure is detected. The length of each bone can be determined from the coordinates of each keypoint in the two-dimensional image. A value acquired by multiplying the sum of the acquired lengths, i.e., L1+L21+L31+L41 or L1+L22+L32+L42, by a correction constant is computed as the number of pixels of height (h). In a case where both values can be computed, for example, the longer value is set as the number of pixels of height. That is, when each bone is captured from the front, the length in the image is the longest, and when the bone is inclined in the depth direction with respect to the camera, the bone is displayed short. Therefore, it is highly likely that a long bone is captured from the front, and considered to be close to a true value. Therefore, it is preferable to select the longer value.

Figure 25:
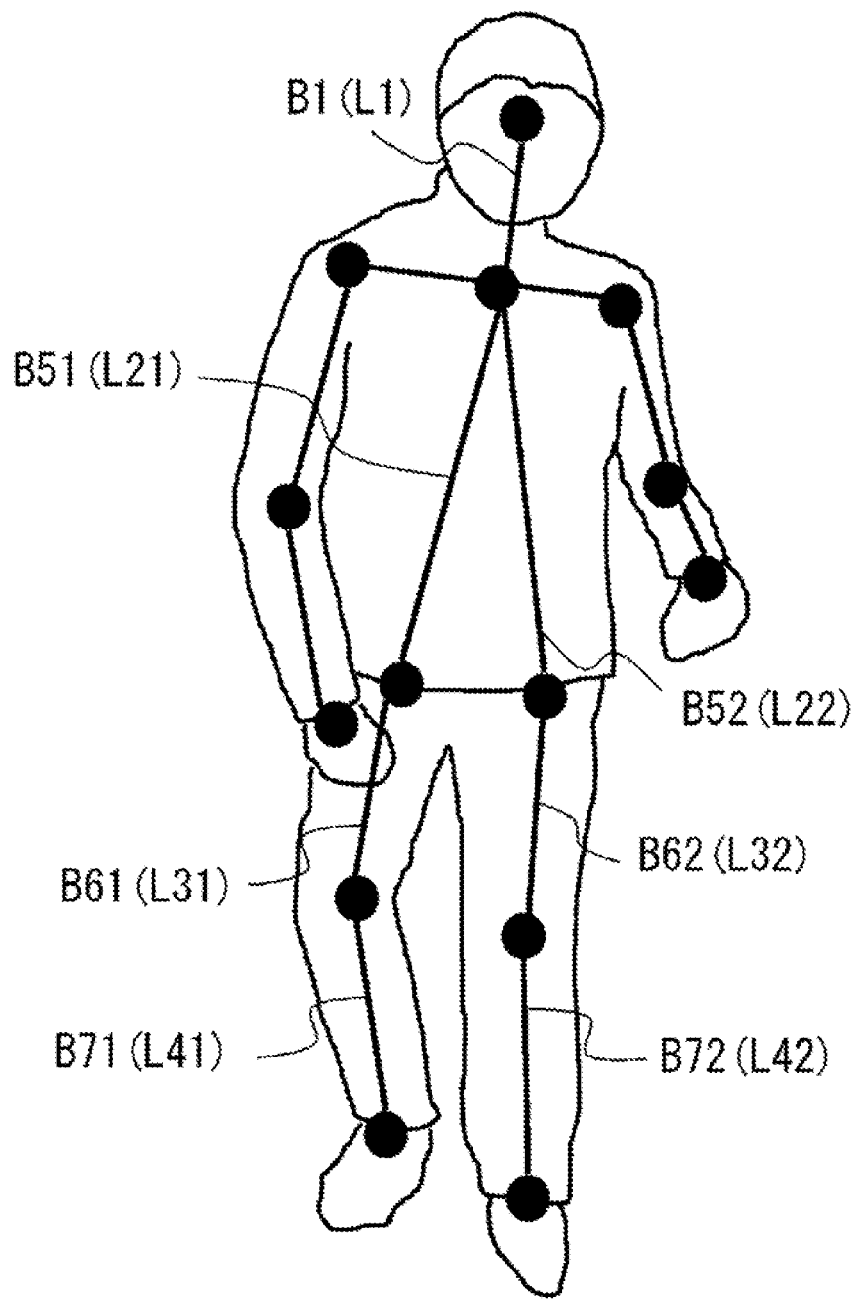
FIG. 25 is a diagram illustrating a detection example of a skeletal structure according to the second example embodiment.

In the example of FIG. 25, a bone B1, bones B51 and B52, bones B61 and B62, and bones B71 and B72 are each detected without overlapping one another. L1+L21+L31+L41 and L1+L22+L32+L42, which are the sum of these bones, are acquired, and a value acquired by multiplying, for example, L1+L22+L32+L42 on the left foot side where the length of the detected bones is long by a correction constant is set as the number of pixels of height.

Figure 26:
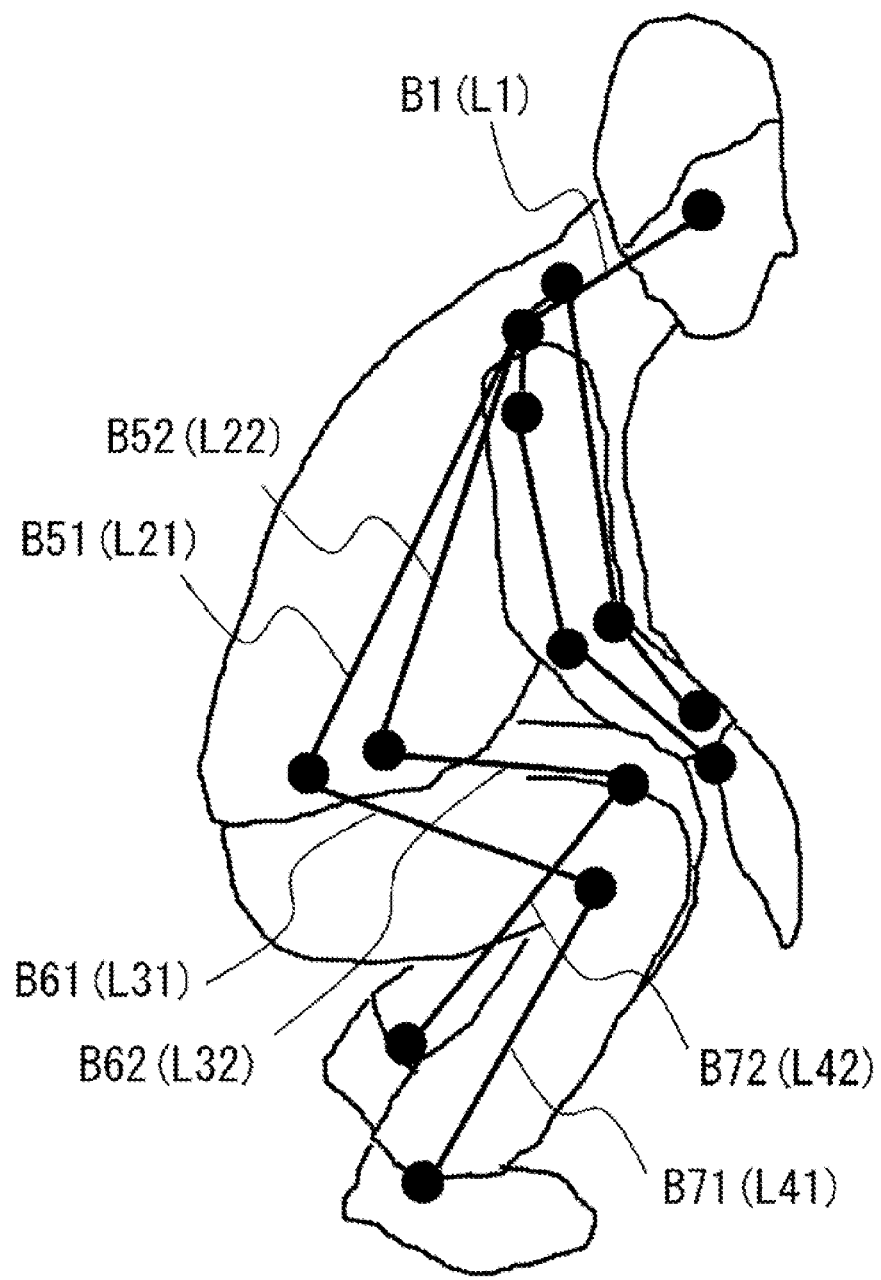
FIG. 26 is a diagram illustrating a detection example of a skeletal structure according to the second example embodiment.

In the example of FIG. 26, a bone B1, bones B51 and B52, bones B61 and B62, and bones B71 and B72 are each detected, and the bones B61 and B71 of the right leg and the bones B62 and B72 of the left leg overlap each other. L1+L21+L31+L41 and L1+L22+L32+L42, which are the sum of these bones, are acquired, and a value acquired by multiplying, for example, L1+L21+L31+L41 on the right foot side where the length of the detected bone is long by a correction constant is set as the number of pixels of height.

Figure 27:
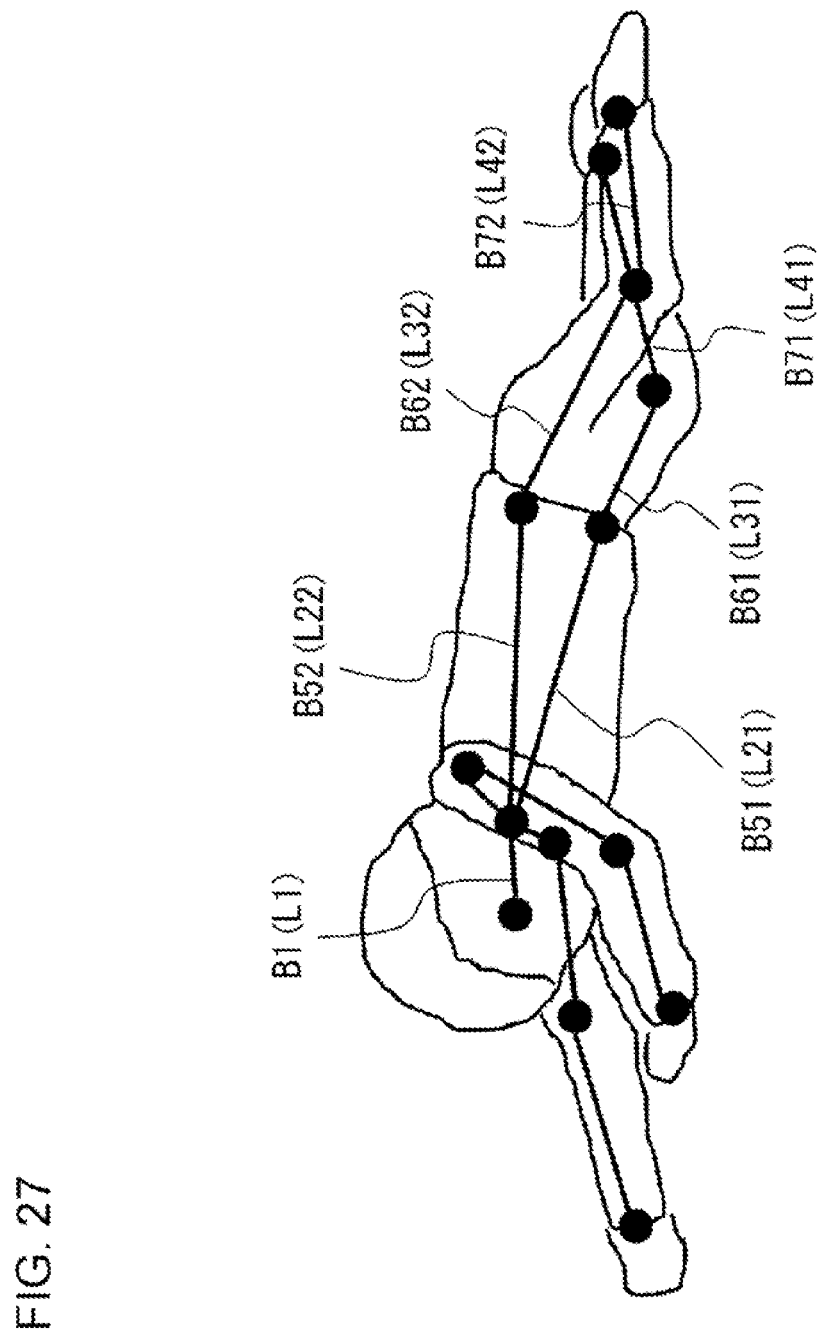
FIG. 27 is a diagram illustrating a detection example of a skeletal structure according to the second example embodiment.

In the example of FIG. 27, a bone B1, bones B51 and B52, bones B61 and B62, and bones B71 and B72 are each detected, and the bones B61 and B71 of the right leg and the bones B62 and B72 of the left leg overlap each other. L1+L21+L31+L41 and L1+L22+L32+L42, which are the sum of these bones, are acquired, and a value acquired by multiplying, for example, L1+L22+L32+L42 on the left foot side where the detected length of the bone is long by a correction constant is set as the number of pixels of height.

In the specific example 1, since the height can be acquired by summing the lengths of the bones from the head to the foot, the number of pixels of height can be acquired by a simple method. Further, since it is only necessary to detect at least the skeleton from the head to the foot by the skeleton estimation technique using machine learning, it is possible to accurately estimate the number of pixels of height even when the whole of a person is not always captured in the image, such as in a state in which the person is squatted.

Specific Example 2

In the specific example 2, the number of pixels of height is acquired by using a two-dimensional skeleton model indicating a relationship between the lengths of the bones included in the two-dimensional skeletal structure and the length of the whole body of the person in the two-dimensional image space.

Figure 28:
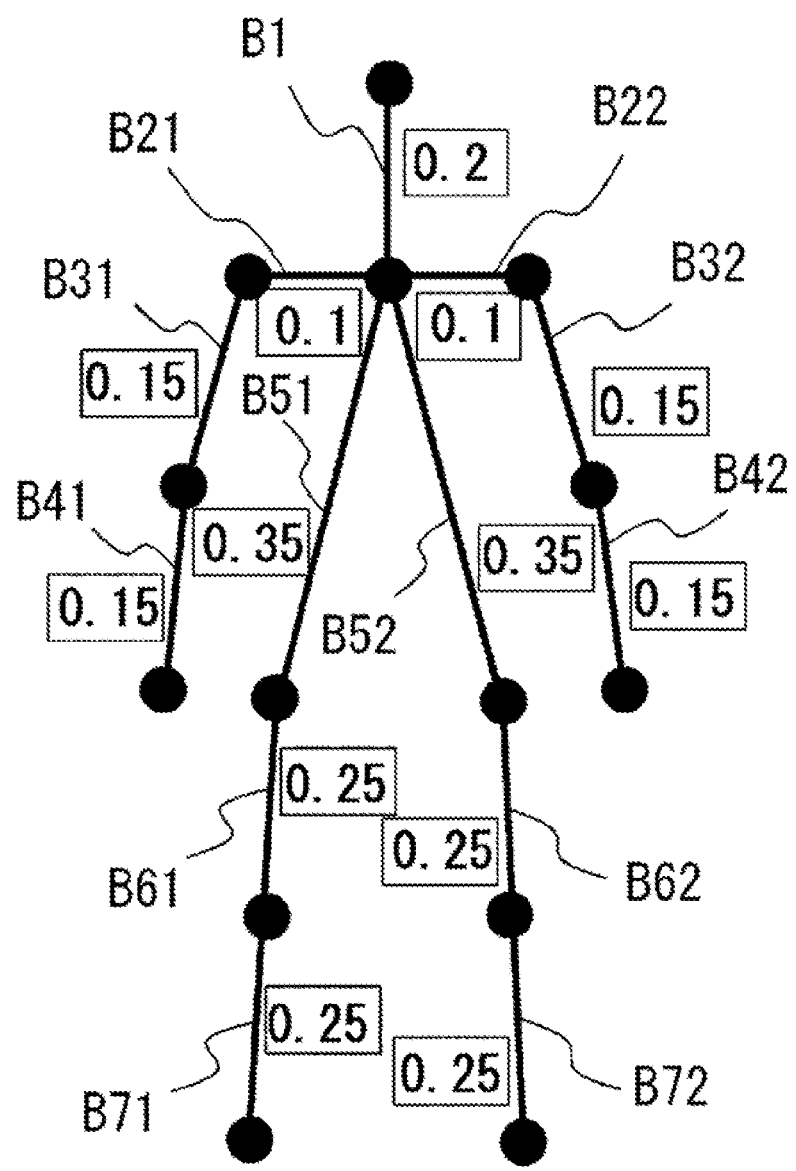
FIG. 28 is a diagram illustrating a human body model according to the second example embodiment.

FIG. 28 is a human body model (two-dimensional skeleton model) 301 indicating a relationship between the length of each bone in the two-dimensional image space and the length of the whole body in the two-dimensional image space, which is being used in the specific example 2. As illustrated in FIG. 28, the relationship between the length of each bone and the length of the whole body (the ratio of the length of each bone to the length of the whole body) of an average person is being associated with each bone of the human body model 301. For example, the length of a bone B1 of the head is 0.2 times (20%) of the length of the whole body, the length of a bone B41 of the right hand is 0.15 times (15%) of the length of the whole body, and the length of a bone B71 of the right foot is 0.25 times (25%) of the length of the whole body. By storing such information of the human body model 301 in the database 201, the average length of the whole body can be acquired from the length of each bone. In addition to the human body model of an average person, a human body model may be prepared for each attribute of a person such as age, sex, and nationality. This makes it possible to determine the length (height) of the whole body appropriately in accordance with the attribute of the person.

Figure 29:
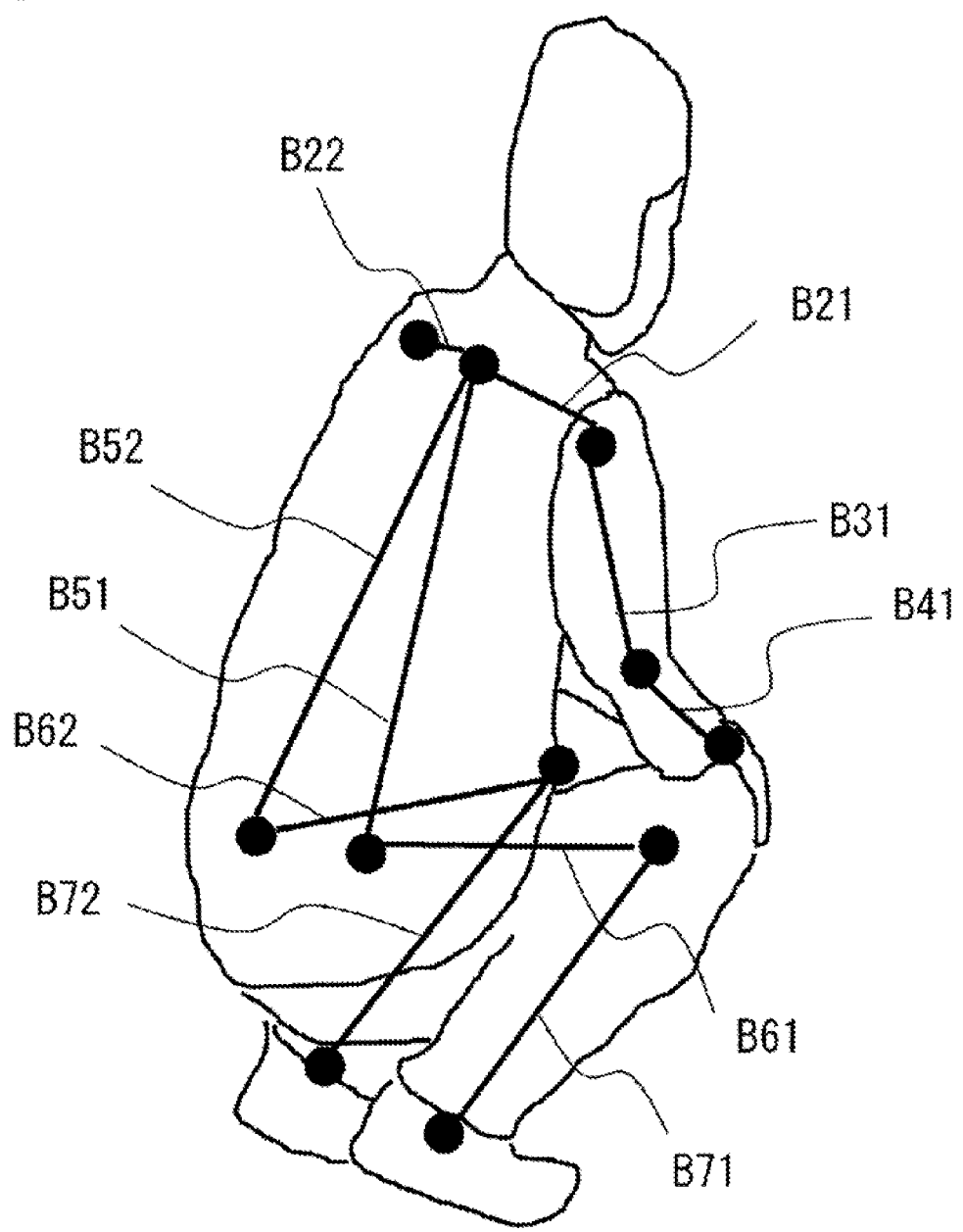
FIG. 29 is a diagram illustrating a detection example of a skeletal structure according to the second example embodiment.

In the specific example 2, as illustrated in FIG. 21, the height computing unit 108 acquires the length of each bone (S221). The height computing unit 108 acquires the lengths of all bones (lengths in the two-dimensional image space) in the detected skeletal structure. FIG. 29 is an example in which an image of a person in a squatted state is captured from diagonally backward right and a skeletal structure is detected. In such an example, since the face or the left side surface of the person is not captured, the bone of the head and the bones of the left arm and the left hand is not detected. Therefore, the respective lengths of the bones B21, B22, B31, B41, B51, B52, B61, B62, B71, and B72 being detected are acquired.

Subsequently, as illustrated in FIG. 21, the height computing unit 108 computes the number of pixels of height from the length of each bone, based on the human body model (S222). The height computing unit 108 refers to the human body model 301 indicating the relationship between each bone and the length of the whole body, as illustrated in FIG. 28, and acquires the number of pixels of height from the length of each bone. For example, since the length of the bone B41 of the right hand is 0.15 times of the length of the whole body, the number of pixels of height based on the bone B41 is acquired from (the length of the bone B41)/0.15. Further, since the length of the bone B71 of the right leg is 0.25 times of the length of the whole body, the number of pixels of height based on the bone B71 is acquired from (the length of the bone B71)/0.25.

The human body model referred to at this time is, for example, a human body model of an average person, but the human body model may be selected according to attributes of the person such as age, sex, and nationality. For example, when a face of a person is captured in a captured image, the attribute of the person is discriminated based on the face, and a human body model associated with the discriminated attribute is referred to. It is possible to recognize the attribute of the person from the feature of the face in the image by referring to information acquired by machine learning a face for each attribute. In addition, in a case where the attribute of the person cannot be discriminated from the image, a human body model of an average person may be used.

Further, the number of pixels of height computed from the lengths of the bones may be corrected by the camera parameter. For example, in a case where the camera is set in a high position and image is captured so as to look down on a person, the lateral length of the shoulder width bone or the like in the two-dimensional skeletal structure is not affected by the depression angle of the camera, but the vertical length of the neck-waist bone or the like decreases as the depression angle of the camera increases. In such a case, the number of pixels of height computed from the lateral length of the shoulder width bone or the like tends to be larger than the actual number. Therefore, when the camera parameters are being utilized, at what angle the person is viewed by the camera is apparent, and thus it is possible to correct the captured image to a two-dimensional skeletal structure as captured from the front by using the information of the depression angle. Thus, the number of pixels of height can be computed more accurately.

Figure 30:
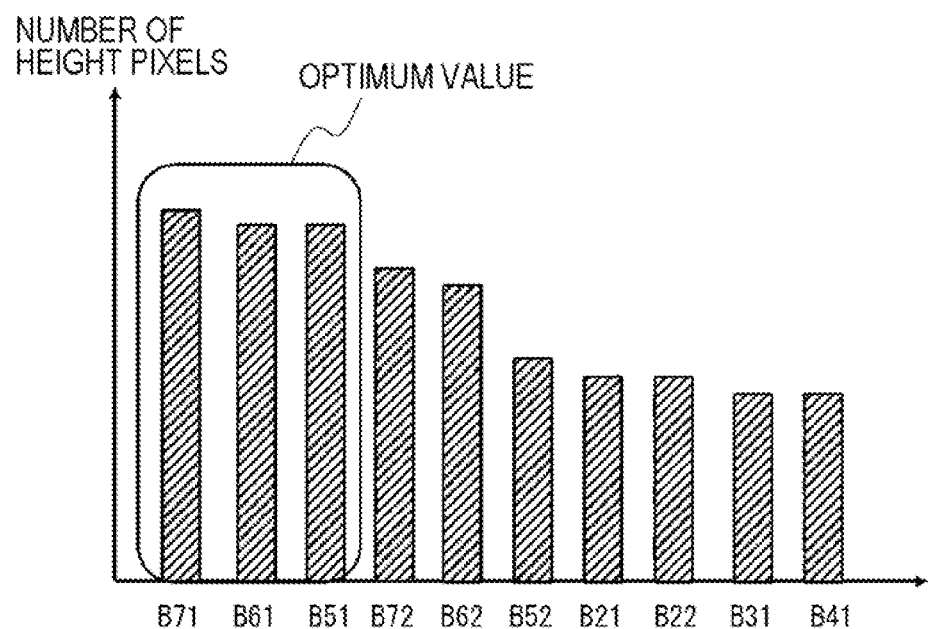
FIG. 30 is a histogram for describing the method of computing the number of pixels of height according to the second example embodiment.

Subsequently, as illustrated in FIG. 21, the height computing unit 108 computes an optimum value of the number of pixels of height (S223). The height computing unit 108 computes an optimum value of the number of pixels of height from the number of pixels of height acquired for each bone. For example, as illustrated in FIG. 30, a histogram of the number of pixels of height acquired for each bone is generated, and the number of pixels of height having a large value is selected from the histogram. That is, the number of pixels of height longer than the others is selected from among the plurality of numbers of pixels of height acquired based on the plurality of bones. For example, the highest 30% is set to be valid, and in FIG. 30, the numbers of pixels of height according to the bones B71, B61, and B51 are selected. The average of the selected numbers of pixels of height may be determined as an optimum value, or the largest number of pixels of height may be set as an optimum value. In order to acquire the height from the length of the bone of the two-dimensional image, in a case where the bone is not captured from the front surface, that is, in a case where an image is captured while the bone is inclined in the depth direction as viewed from the camera, the length of the bone is shorter than in a case where the bone is captured from the front. In such a case, a value having a larger number of pixels of height is more likely to be captured from the front than a value having a smaller number of pixels of height and is a more likely value, and therefore, a larger value is set as an optimum value.

In the specific example 2, since the number of pixels of height is acquired based on the bone of the detected skeletal structure by using the human body model indicating the relationship between the bones on the two-dimensional image space and the length of the whole body, even when the whole skeleton from the head to the foot cannot be acquired, the number of pixels of height may be acquired from part of the bones. In particular, by adopting a larger value among values acquired from a plurality of bones, it is possible to accurately estimate the number of pixels of height.

Specific Example 3

In the specific example 3, a two-dimensional skeletal structure is fitted to a three-dimensional human body model (three-dimensional skeleton model), and the skeleton vector of the whole body is acquired by using the number of pixels of height of the fitted three-dimensional human body model.

In the specific example 3, as illustrated in FIG. 22, the height computing unit 108 first computes a camera parameter, based on an image captured by the camera 200 (S231). The height computing unit 108 extracts an object the length of which is known in advance from a plurality of images captured by the camera 200, and acquires a camera parameter from the size (the number of pixels) of the extracted object. The camera parameters may be acquired in advance, and the acquired camera parameters may be acquired as necessary.

Subsequently, the height computing unit 108 adjusts the arrangement and height of the three-dimensional human body model (S232). The height computing unit 108 prepares a three-dimensional human body model for computing the number of pixels of height with respect to the detected two-dimensional skeletal structure, and arranges the three-dimensional human body model in the same two-dimensional image, based on the camera parameters. Specifically, the [relative positional relationship between the camera and the person in the real world] is determined from the camera parameters and the two-dimensional skeletal structure. For example, when the position of the camera is set to coordinates (0, 0, 0), the coordinates (x, y, z) of the position where the person is standing (or sitting) are determined. Then, the two-dimensional skeletal structure and the three-dimensional human body model are superimposed on each other by assuming an image captured when the three-dimensional human body model is arranged at the same position (x, y, z) as the specified position of the person.

Figure 31:
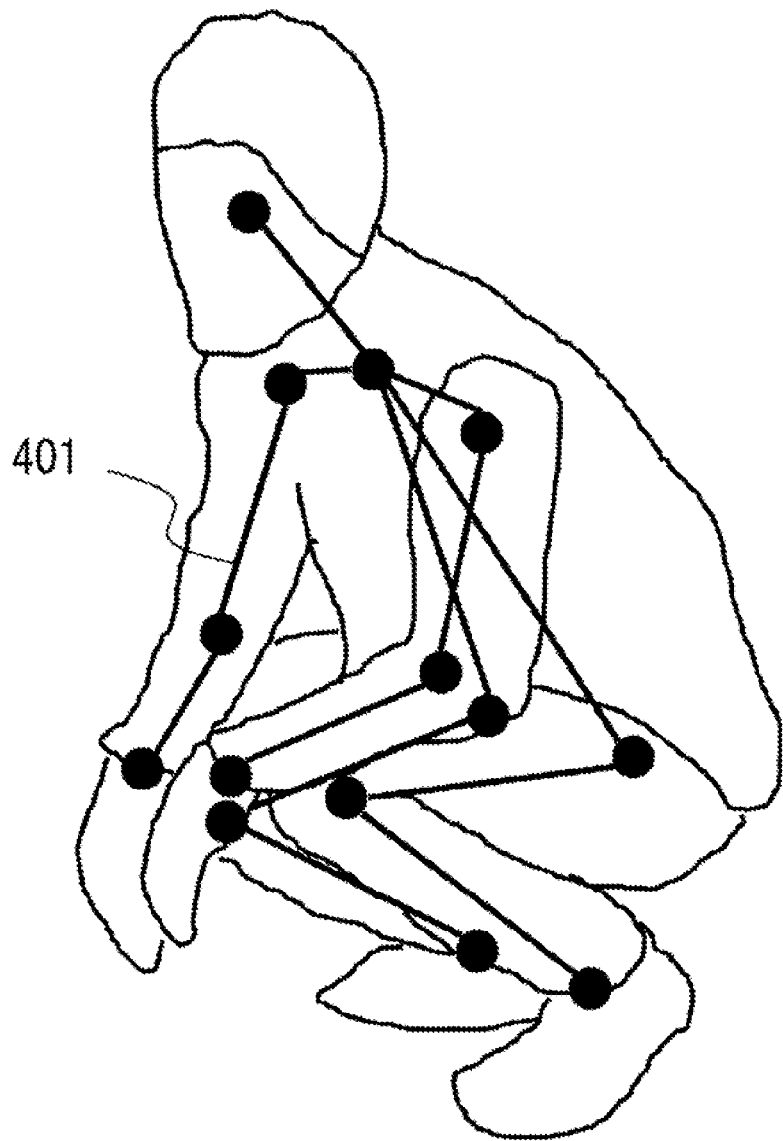
FIG. 31 is a diagram illustrating a detection example of a skeletal structure according to the second example embodiment.
Figure 32:
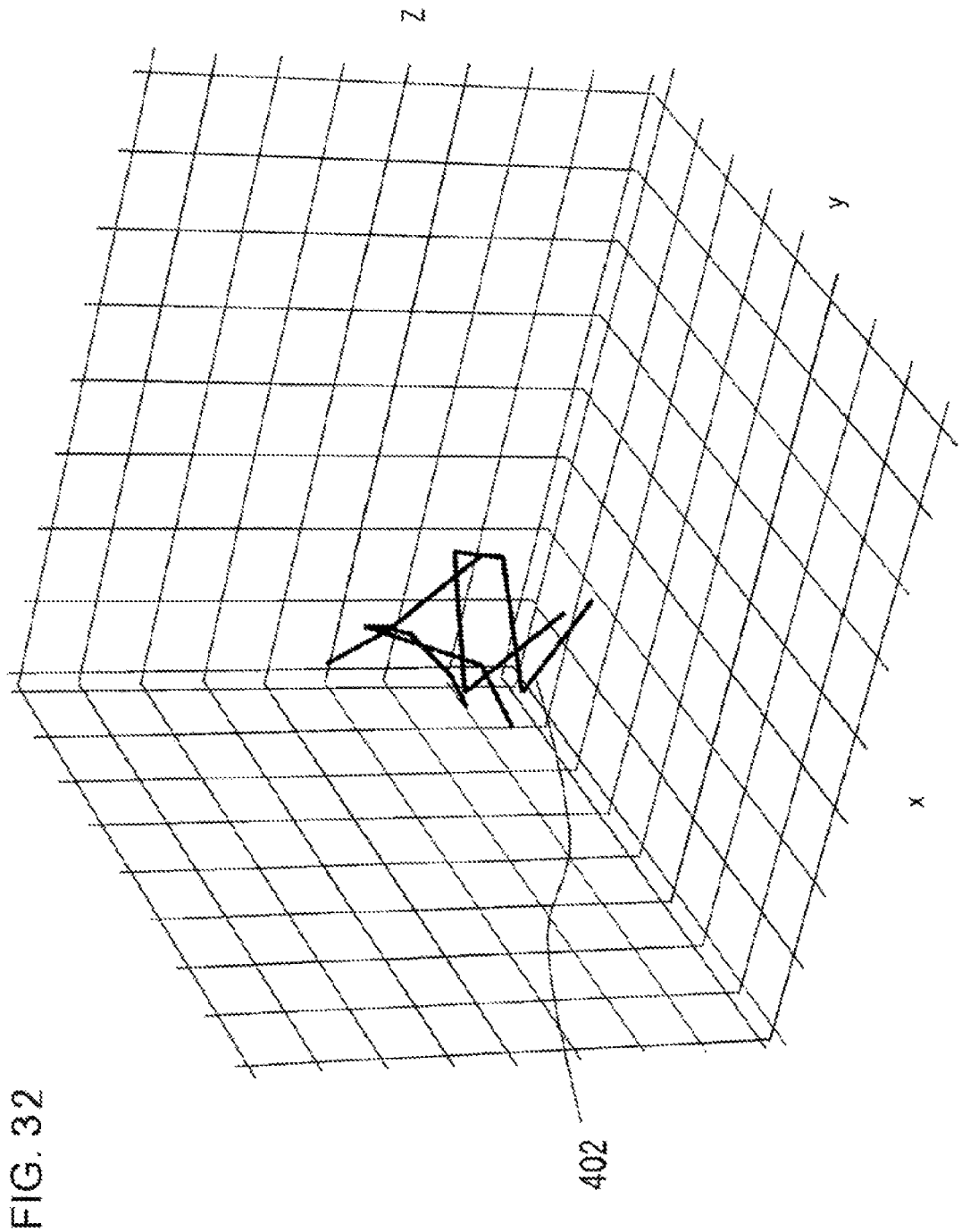
FIG. 32 is a diagram illustrating a three-dimensional human body model according to the second example embodiment.
Figure 33:
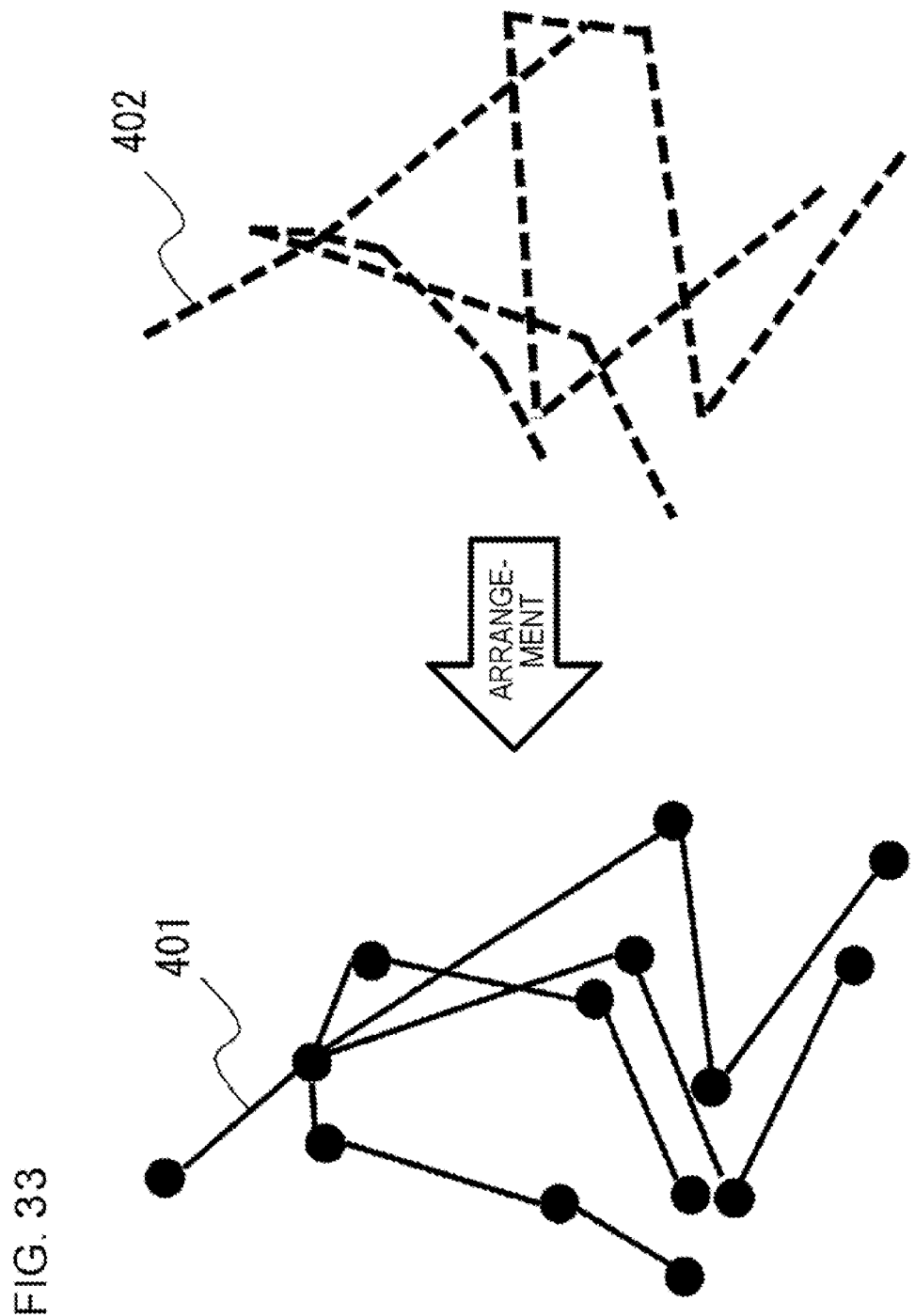
FIG. 33 is a diagram for describing the method of computing the number of pixels of height according to the second example embodiment.

FIG. 31 is an example in which an image of a person who is squatting is captured from diagonally front left and a two-dimensional skeletal structure 401 is detected. The two-dimensional skeletal structure 401 has two-dimensional coordinate information. Note that, although it is preferable that all bones are detected, some bones may not necessarily be detected. A three-dimensional human body model 402 as illustrated in FIG. 32 is prepared for the two-dimensional skeletal structure 401. The three-dimensional human body model (three-dimensional skeleton model) 402 is a model of a skeleton having three-dimensional coordinate information and having the same shape as the two-dimensional skeletal structure 401. Then, as illustrated in FIG. 33, the prepared three-dimensional human body model 402 is arranged and superimposed on the detected two-dimensional skeletal structure 401. In addition to the superimposing, the height of the three-dimensional human body model 402 is adjusted so as to conform to the two-dimensional skeletal structure 401.

Note that, as illustrated in FIG. 33, the three-dimensional human body model 402 prepared at this time may be a model in a state close to the pose of the two-dimensional skeletal structure 401 or may be a model in an upright state. For example, the three-dimensional human body model 402 of the estimated pose may be generated by using a technique of estimating the pose in the three-dimensional space from the two-dimensional image by using machine learning. By learning information of the joint of the two-dimensional image and the joint of the three-dimensional space, the three-dimensional pose can be estimated from the two-dimensional image.

Figure 34:
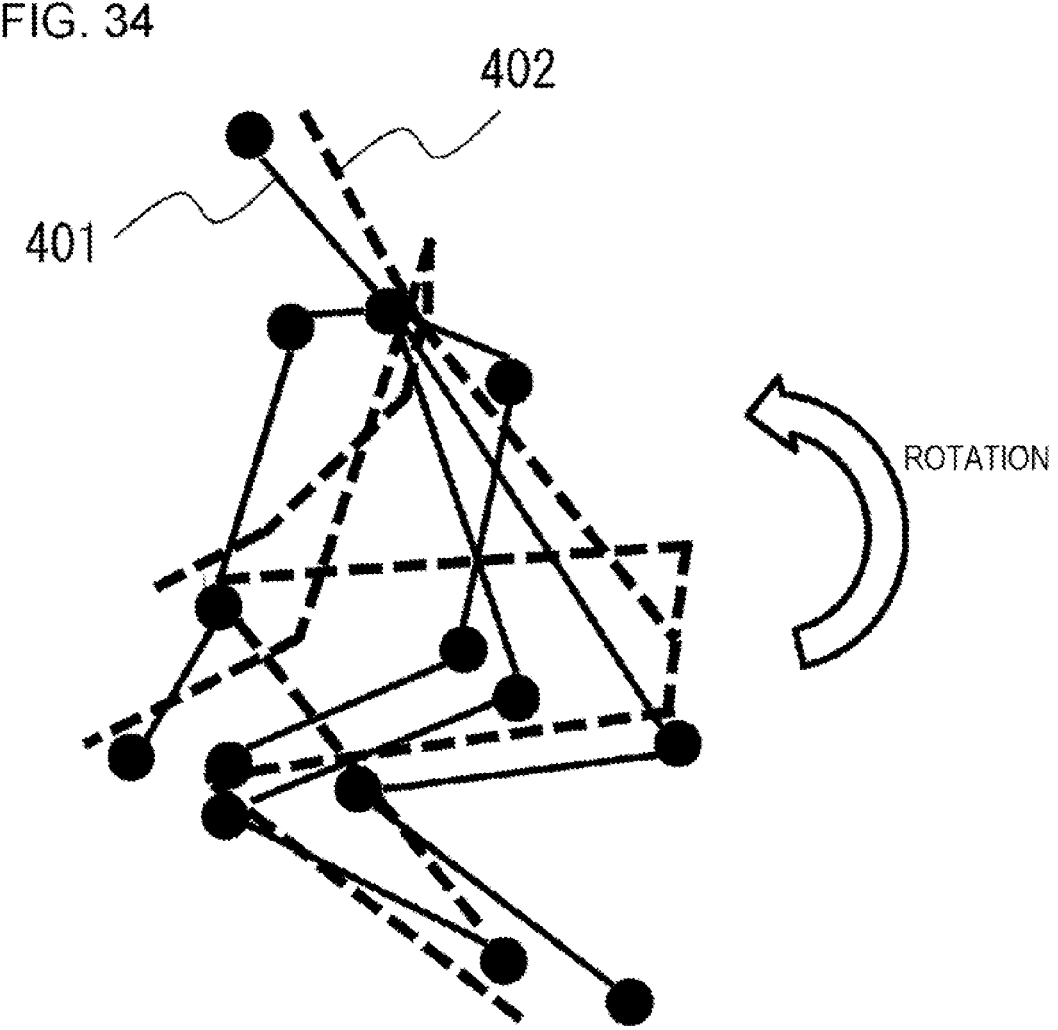
FIG. 34 is a diagram for describing the method of computing the number of pixels of height according to the second example embodiment.

Subsequently, as illustrated in FIG. 22, the height computing unit 108 fits the three-dimensional human body model to the two-dimensional skeletal structure (S233). As illustrated in FIG. 34, the height computing unit 108 deforms the three-dimensional human body model 402 such that the poses of the three-dimensional human body model 402 and the two-dimensional skeletal structure 401 match with each other in a state in which the three-dimensional human body model 402 is superimposed on the two-dimensional skeletal structure 401. That is, the height, the orientation of the body, and the angles of the joints of the three-dimensional human body model 402 are adjusted and optimized so as to eliminate the difference from the two-dimensional skeletal structure 401. For example, the joint of the three-dimensional human body model 402 is rotated within the movable range of a human, and the whole three-dimensional human body model 402 is rotated or the whole size of three-dimensional human body model 402 is adjusted. The fitting of the three-dimensional human body model and the two-dimensional skeletal structure is performed in a two-dimensional space (two-dimensional coordinates). That is, the three-dimensional human body model is mapped to the two-dimensional space, and the three-dimensional human body model is optimized to the two-dimensional skeletal structure in consideration of how the deformed three-dimensional human body model changes in the two-dimensional space (image).

Figure 35:
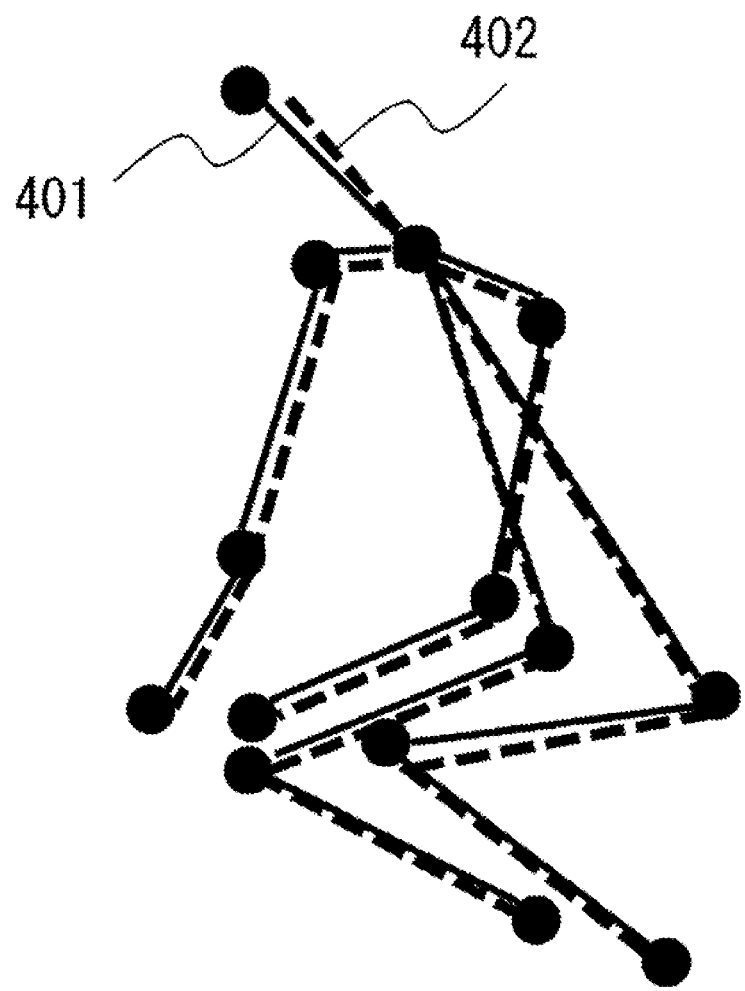
FIG. 35 is a diagram for describing the method of computing the number of pixels of height according to the second example embodiment.

Subsequently, as illustrated in FIG. 22, the height computing unit 108 computes the number of pixels of height of the fitted three-dimensional human body model (S234). As illustrated in FIG. 35, the height computing unit 108 acquires the number of pixels of height of the three-dimensional human body model 402 in the state when there is no difference between the three-dimensional human body model 402 and the two-dimensional skeletal structure 401 and the poses match. As an upright state of the optimized three-dimensional human body model 402, the length of the whole body in the two-dimensional space is acquired based on the camera parameters. For example, the number of pixels of height is computed based on the length (the number of pixels) of the bones from the head to the foot when the three-dimensional human body model 402 is in an upright state. As in the specific example 1, the lengths of the bones from the head part to the foot part of the three-dimensional human body model 402 may be summed.

In the specific example 3, by fitting the three-dimensional human body model to the two-dimensional skeletal structure, based on the camera parameters, and acquiring the number of pixels of height, based on the three-dimensional human body model, it is possible to accurately estimate the number of pixels of height even in a case where all bones are not captured from the front, that is, in a case where errors are large since all bones are captured obliquely.

<Normalization Processing>

As illustrated in FIG. 19, the image processing apparatus 100 performs normalization processing (S202) following the number of pixels of height computing processing. In the normalization processing, as illustrated in FIG. 23, the feature value computing unit 103 computes the keypoint height (S241). The feature value computing unit 103 computes the keypoint heights (the number of pixels) of all the keypoints included in the detected skeletal structure. The keypoint height is the length (number of pixels) in the height direction from the lowermost end of the skeletal structure (for example, the keypoint of either foot) to the keypoint. Herein, as an example, the keypoint height is acquired from the Y-coordinate of the keypoint in the image. As described above, the keypoint height may be acquired from the length in the direction along the vertical projection axis based on the camera parameters. For example, in the example of FIG. 24, the height (yi) of the keypoint A2 of the neck is a value acquired by subtracting the Y-coordinate of the keypoint A81 of the right foot or the keypoint A82 of the left foot from the Y-coordinate of the keypoint A2.

Subsequently, the feature value computing unit 103 determines a reference point for normalization (S242). The reference point is a point to be the reference for representing the relative height of the keypoint. The reference point may be set in advance or may be selectable by the user. The reference point is preferably the center of the skeletal structure or a point higher than such center (in the upper part of the image in the up-down direction), for example, the coordinates of the keypoint of the neck are used as the reference point. Note that, coordinates of a keypoint other than the neck, such as the head and other parts, may be used as the reference point. The reference point is not limited to a keypoint, and may be any coordinate (for example, the center coordinates of the skeletal structure or the like).

Subsequently, the feature value computing unit 103 normalizes the keypoint height (yi) by the number of pixels of height (S243). The feature value computing unit 103 normalizes each keypoint by using the keypoint height, the reference point, and the number of pixels of height of each keypoint. Specifically, the feature value computing unit 103 normalizes the relative height of the keypoint with respect to the reference point by the number of pixels of height. Herein, as an example of focusing only on the height direction, only the Y-coordinate is extracted, and normalization is performed by using the keypoint of the neck as the reference point. Specifically, the feature value (normalized value) is acquired by using the following formula (1) with the Y-coordinate of the reference point (the keypoint of the neck) as (yc). When a vertical projection axis based on camera parameters is being used, (yi) and (yc) are converted into values in a direction along the vertical projection axis.

[Mathematical Formula 1]

$$f_i = (y_i - y_c)/h \quad (1)$$

For example, when the number of keypoints is eighteen, eighteen sets of coordinates (x0, y0), (x1, y1), ... (x17, y17) of each keypoint are converted into eighteen-dimensional feature values as described below by using the above-described formula (1).

[Mathematical Formula 2]

$$f_0 = (y_0 - y_c)/h$$
$$f_1 = (y_1 - y_c)/h \quad (2)$$
$$...$$
$$f_{17} = (y_{17} - y_c)/h$$

Figure 36:
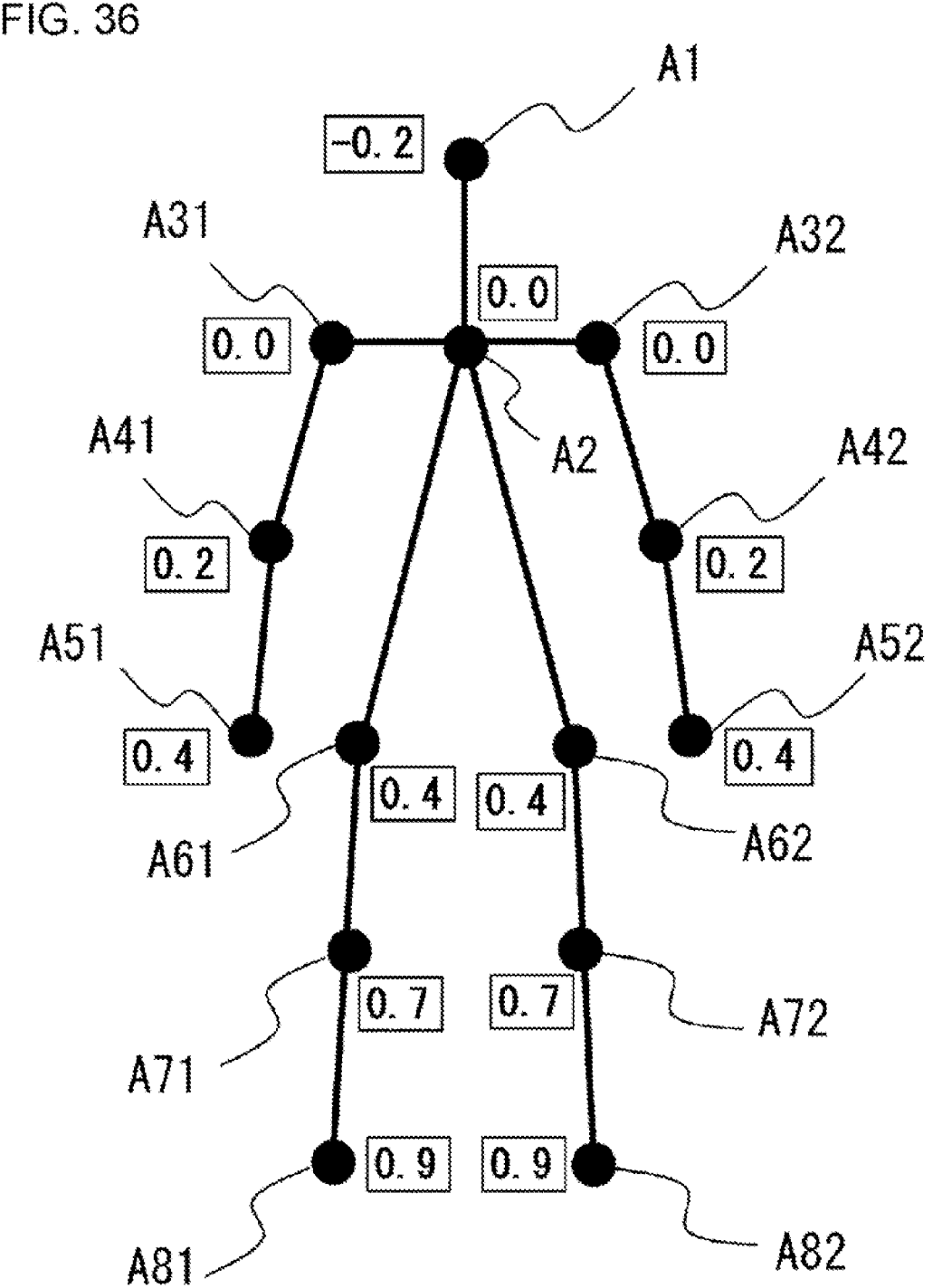
FIG. 36 is a diagram for describing the normalization method according to the second example embodiment.
Figure 37:
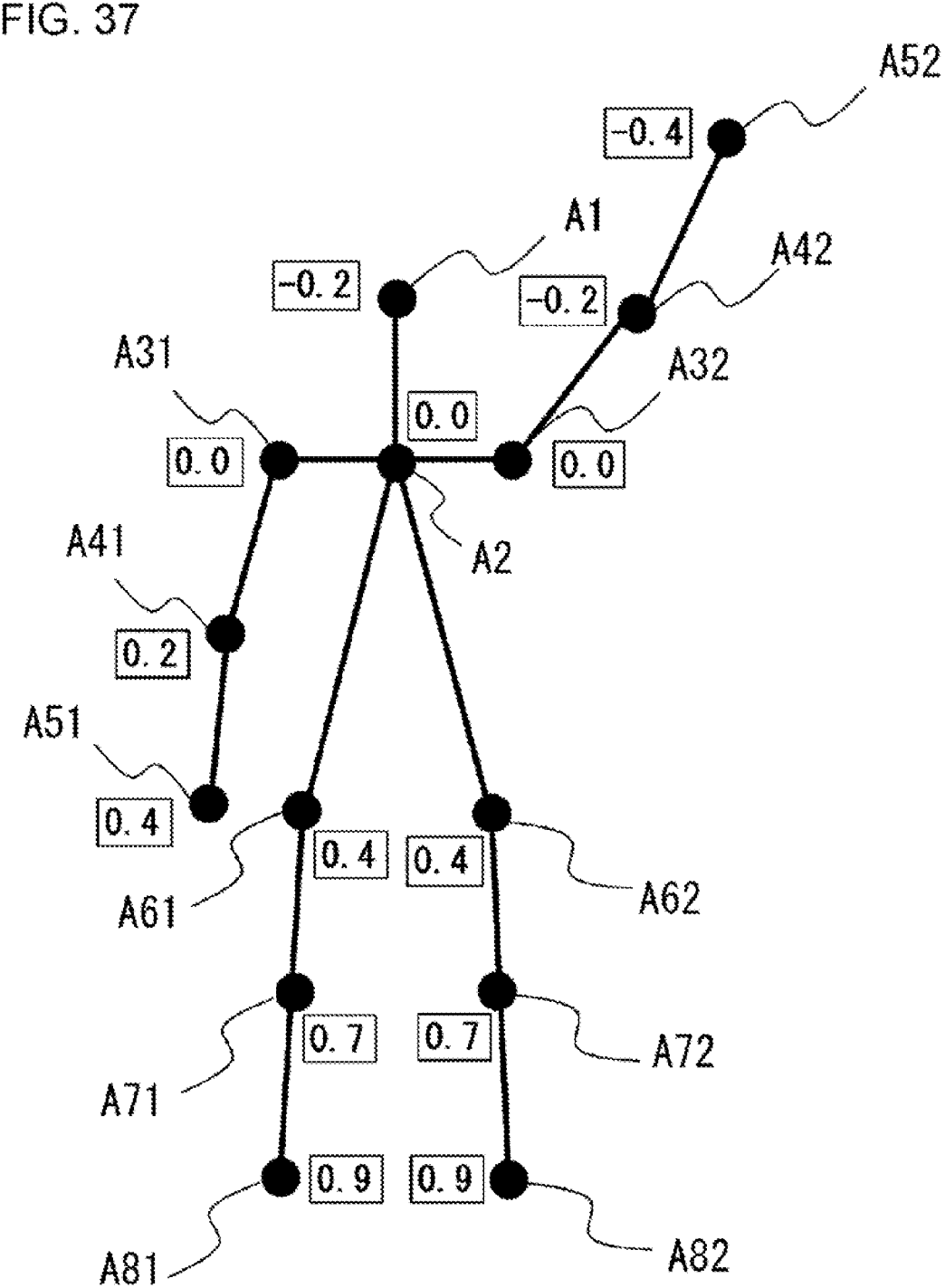
FIG. 37 is a diagram for describing the normalization method according to the second example embodiment.
Figure 38:
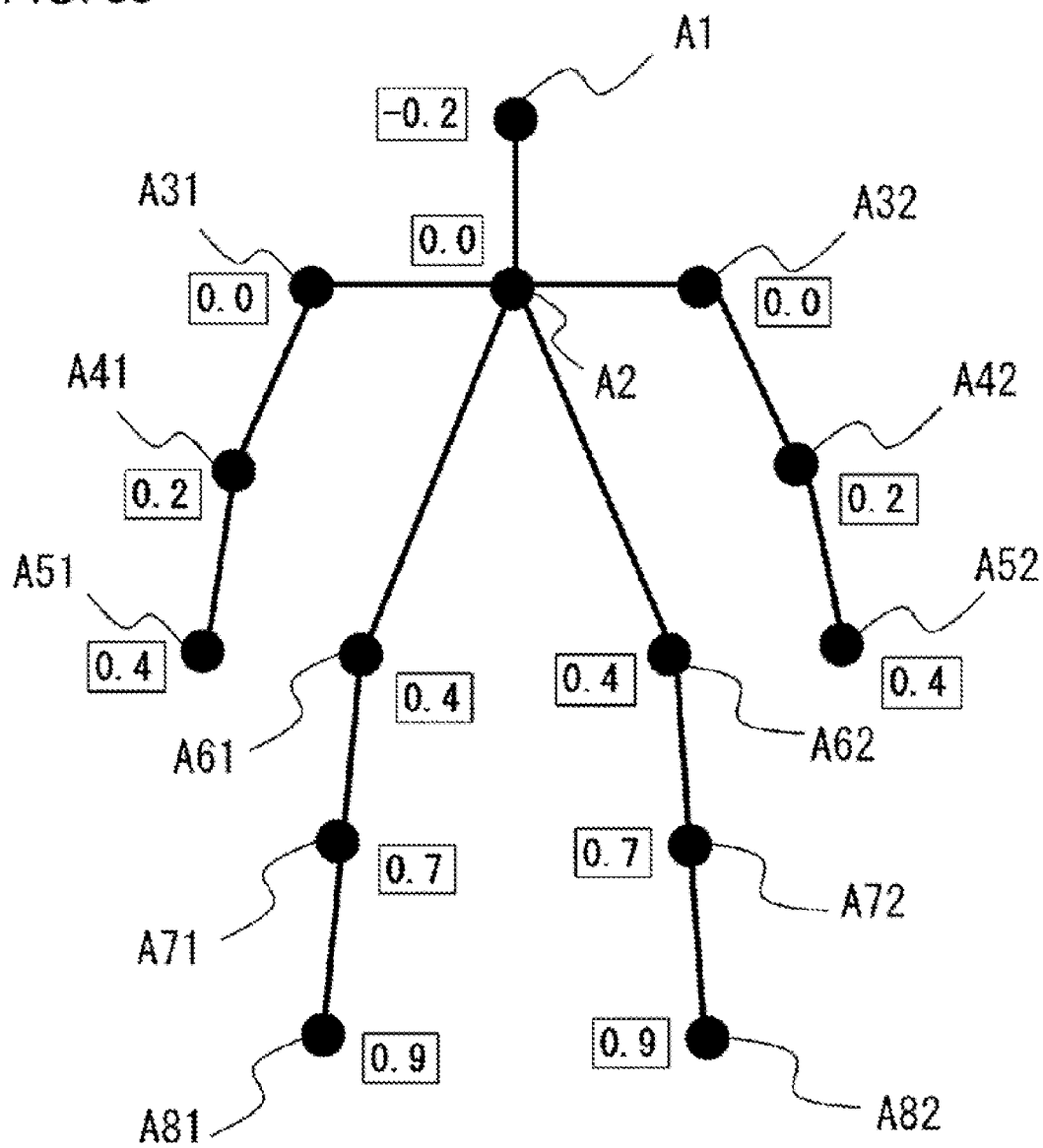
FIG. 38 is a diagram for describing the normalization method according to the second example embodiment.

FIG. 36 illustrates an example of the feature value of each keypoint acquired by the feature value computing unit 103. In this example, since the keypoint A2 of the neck is set as the reference point, the feature value of the keypoint A2 is 0.0, and the feature values of the keypoint A31 of the right shoulder and the keypoint A32 of the left shoulder that are the same height as the neck is also 0.0. The feature value of the keypoint A1 of the head being higher than the neck is −0.2. The feature values of the keypoint A51 of the right hand and the keypoint A52 of the left hand being lower than the neck are 0.4, and the feature values of the keypoint A81 of the right foot and the keypoint A82 of the left foot are 0.9. When the person raises the left hand from this state, the left hand becomes higher than the reference point as illustrated in FIG. 37, and thus the feature value of the keypoint A52 of the left hand becomes −0.4. On the other hand, since the normalization is performed using only the coordinates of the Y-axis, as illustrated in FIG. 38, the feature value does not change even if the width of the skeletal structure changes as compared with FIG. 36. That is, the feature value (normalized value) of the present example embodiment indicates the feature in the height direction (Y-direction) of the skeletal structure (keypoint), and is not affected by the change in the lateral direction (X-direction) of the skeletal structure.

As described above, in the present example embodiment, the skeletal structure of the person is detected from the two-dimensional image, and each keypoint of the skeletal structure is normalized by using the number of pixels of height (height in an upright state in the two-dimensional image space) acquired from the detected skeletal structure. By using the normalized feature values, it is possible to improve the robustness in the case where a classification, a search, or the like is performed. That is, since the feature value of the present example embodiment is not affected by the change in the lateral direction of the person as described above, robustness to the change in the orientation of the person or the body shape of the person is high.

Further, in the present example embodiment, since detection of the skeletal structure of the person may be implemented by using a skeleton estimation technique such as OpenPose, it is not necessary to prepare learning data for learning the pose and the like of the person. Further, by normalizing the keypoints of the skeletal structure and storing the normalized keypoints in the database, it becomes possible to classify and search the pose of the person, etc., thus enabling classification and search even for an unknown pose. In addition, since a clear and easy-to-understand feature value may be acquired by normalizing the keypoints of the skeletal structure, unlike a black-box type algorithm such as machine learning, the user's satisfaction with the processing result is high.

Third Example Embodiment

Hereinafter, a third example embodiment will be described with reference to the drawings. In the present example embodiment, a specific example of processing of searching for a moving image including a desired scene will be described.

Figure 40:
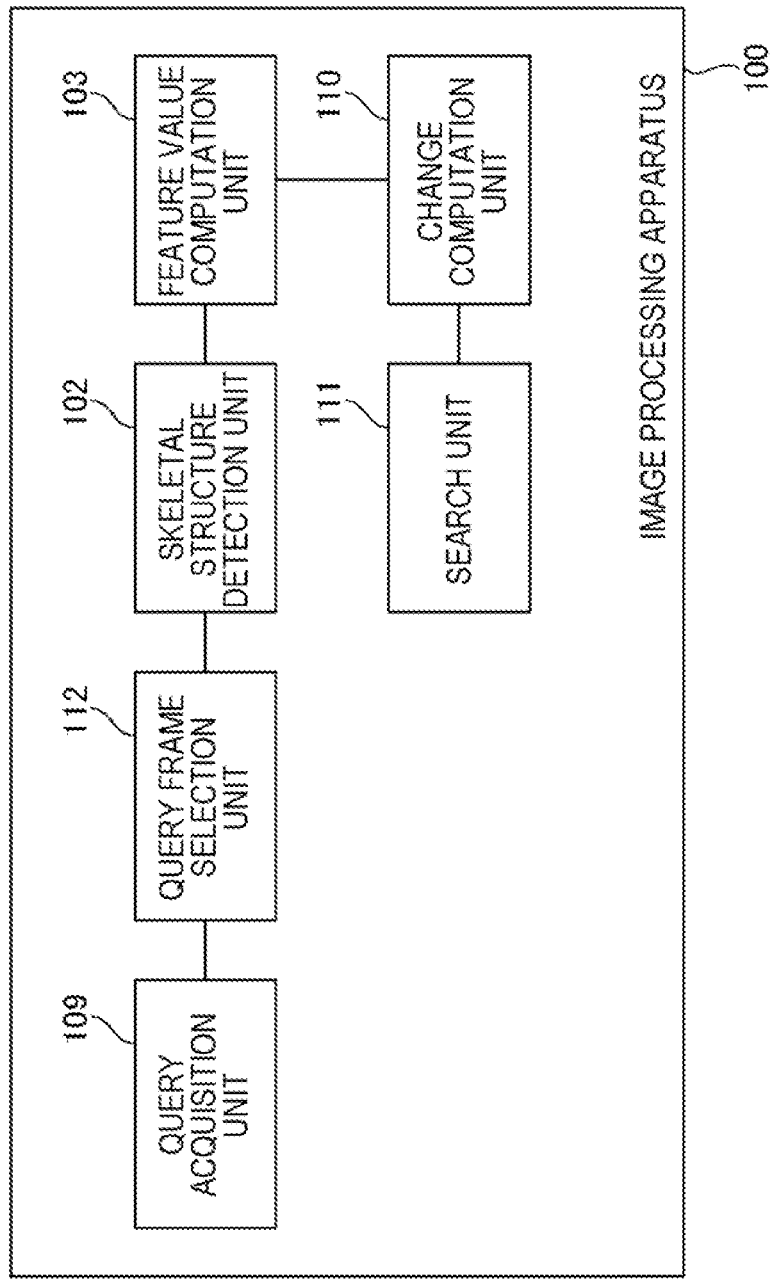
FIG. 40 is a configuration diagram illustrating a configuration of an image processing apparatus according to a third example embodiment.

FIG. 40 illustrates one example of a functional block diagram of an image processing apparatus 100 according to the present example embodiment. As illustrated, the image processing apparatus 100 includes a query acquisition unit 109, a query frame selection unit 112, a skeletal structure detection unit 102, a feature value computing unit 103, a change computing unit 110, and a search unit 111. Note that the image processing apparatus 100 may further include other functional units described in the first and second example embodiments.

The query acquisition unit 109 acquires a query moving image composed of a plurality of time-series first frame images. For example, the query acquisition unit 109 acquires a query moving image (moving image file) input/specified/selected by a user operation.

Figure 41:
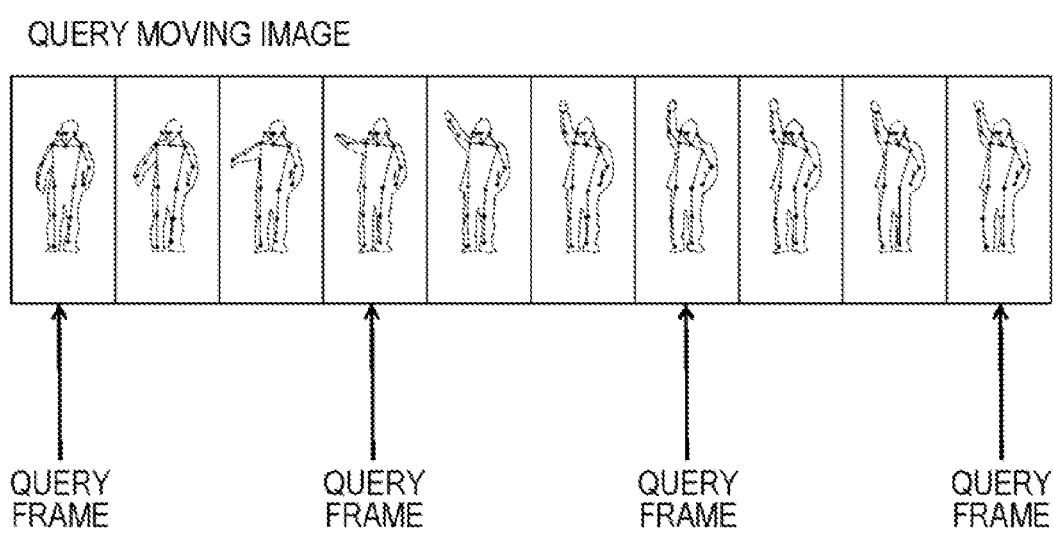
FIG. 41 is a diagram for describing query frame selection processing according to the third example embodiment.
Figure 42:
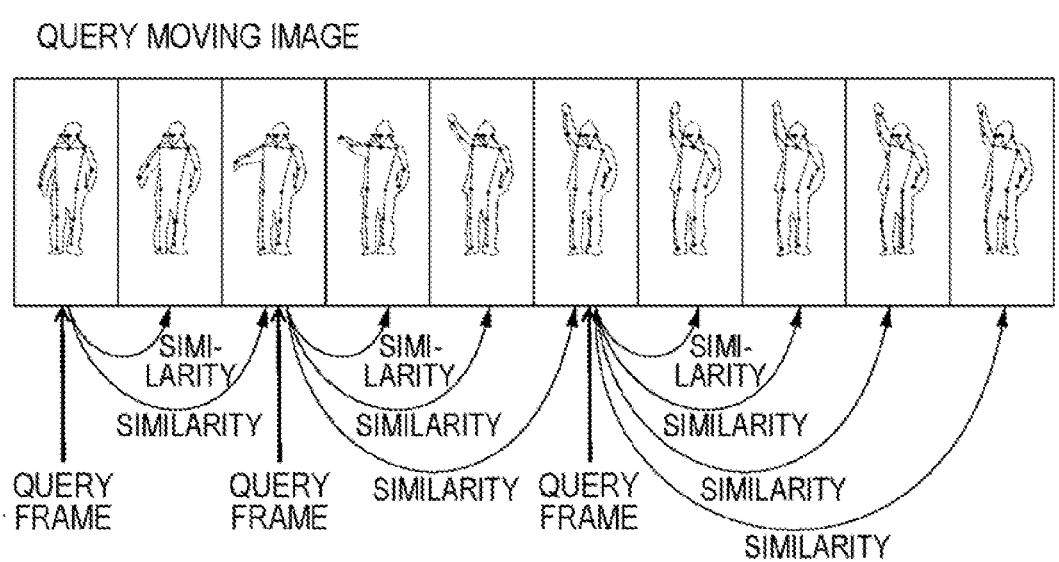
FIG. 42 is a diagram for describing the query frame selection processing according to the third example embodiment.

The query frame selection unit 112 selects at least a part of the plurality of first frame images as a query frame. As illustrated in FIGS. 41 and 42, the query frame selection unit 112 may intermittently select a query frame from a plurality of time-series first frame images included in the query moving image. The number of the first frame images between the query frames may be constant or may be varied. The query frame selection unit 112 may execute any one of the following selection processing 1 to 3, for example.

—Selection Processing 1—

In the selection processing 1, the query frame selection unit 112 selects a query frame, based on user input. That is, the user performs an input that specifies at least a part of the plurality of first frame images as a query frame. Then, the query frame selection unit 112 selects the first frame image specified by the user as the query frame.

—Selection Processing 2—

In the selection processing 2, the query frame selection unit 112 selects a query frame according to a predetermined rule.

Specifically, as illustrated in FIG. 41, the query frame selection unit 112 selects a plurality of query frames from the plurality of first frame images at predetermined regular intervals. That is, the query frame selection unit 112 selects a query frame every M frames. M is, for example, 2 or more and 10 or less, but is not limited thereto. M may be determined in advance or may be selected by the user.

—Selection Processing 3—

In the selection processing 3, the query frame selection unit 112 selects a query frame according to a predetermined rule.

Specifically, as illustrated in FIG. 42, after selecting one query frame, the query frame selection unit 112 computes the degree of similarity between the one query frame and each of first frame images that are after the one query frame in time series. The degree of similarity is the same concept as in the first and second example embodiments. Then, the query frame selection unit 112 selects, as a new query frame, the first frame image which has a degree of similarity equal to or smaller than the reference value and which is the earliest in time series.

Next, the query frame selection unit 112 computes the degree of similarity between the newly selected query frame and each of the first frame images which are after such query frame in time series. Then, the query frame selection unit 112 selects, as a new query frame, the first frame image which has a degree of similarity equal to or smaller than the reference value and which is the earliest in time series. The query frame selection unit 112 repeats such processing to select a query frame. According to this processing, the poses of the persons included in the adjacent query frames differ from each other to some extent. Therefore, it is possible to select a plurality of query frames indicating a characteristic pose of the person while suppressing an increase in the query frames. The reference value may be determined in advance, may be selected by the user, or may be set by other means.

Returning to FIG. 40, the skeletal structure detection unit 102 detects a keypoint of a person (an object) included in each of the plurality of first frame images. The skeletal structure detection unit 102 may set only the query frame as a target of the detection processing, or may set all the first frame images as a target of the detection processing. Since the configuration of the skeletal structure detection unit 102 is similar to that of the first and second example embodiments, detailed description thereof will be omitted.

The feature value computing unit 103 computes the feature value of the detected keypoint, that is, the feature value of the detected two-dimensional skeletal structure, for each first frame image. The feature value computing unit 103 may set only the query frame as the target of the computing processing, or may set all the first frame images as the target of the computing processing. Since the configuration of the feature value computing unit 103 is similar to that of the first and second example embodiments, detailed description thereof will be omitted.

The change computing unit 110 computes the direction of the change in the feature value along the time axis of the plurality of time-series first frame images. The change computing unit 110 computes, for example, the direction of change in the feature value between adjacent query frames. The feature value is the feature value computed by the feature value computing unit 103. The feature value is a height, an area, or the like of the skeleton region, and is expressed by a numerical value. The direction of the change of the feature value is divided into three, for example, [direction in which the numerical value increases], [no change in the numerical value], and [direction in which the numerical value decreases]. [No change in numerical value] may be a case where the absolute value of the change amount of the feature value is 0, or a case where the absolute value of the change amount of the feature value is equal to or less than a threshold value.

Figure 43:
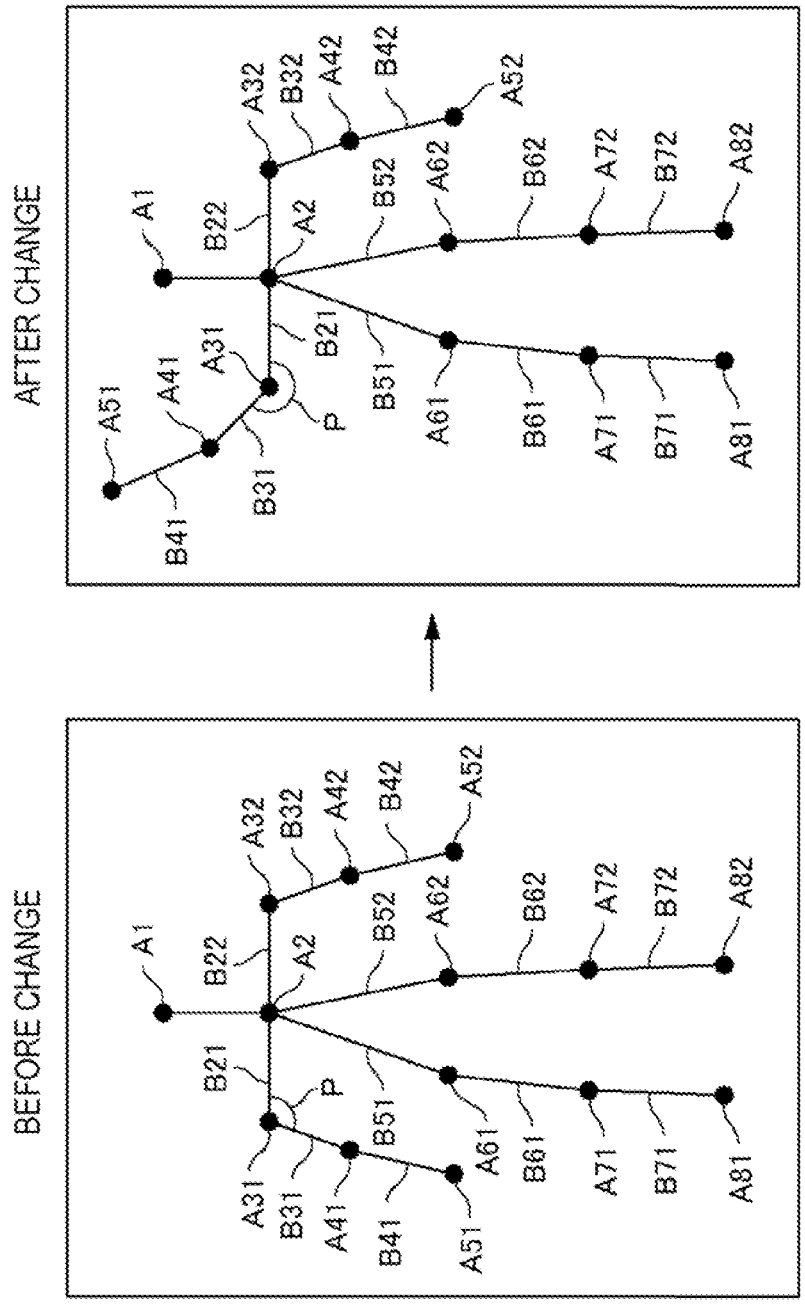
FIG. 43 is a diagram for describing processing of computing a direction of change of a feature value according to the third example embodiment.

One example will be described using FIG. 43. Comparing the images before and after the change being illustrated in the figure, the images differ in that the right arm, which was down before the change, is raised after the change. For example, the angle P formed by the keypoints A2, A31, and A41 is computed as the feature value. In such a case, the change computing unit 110 determines the direction in which the numerical value increases as the direction of the change of the feature value along the time axis.

When three or more query frames are to be processed, the change computing unit 110 may compute time-series data indicating a time-series change in the direction of the change in the feature value. The time-series data is, for example, [direction in which the numerical value increases]→[direction in which the numerical value increases]→[direction in which the numerical value increases]→[no change in the numerical value]→[no change in the numerical value]→[direction in which the numerical value increases], and the like. When [the direction in which the numerical value increases] is expressed as [1], [no change in the numerical value] is expressed as [0], and [the direction in which the numerical value decreases] is expressed as [−1], for example, the time-series data can be expressed as a numerical sequence as [111001], for example.

When only two query frames are processed, the change computing unit 110 may compute the direction of the change in the feature value occurring between the two images.

Returning to FIG. 40, the search unit 111 searches for a moving image by using the direction of the change in the feature value computed by the change computing unit 110 as a key. Specifically, the search unit 111 searches for a DB moving image matching a key from among moving images (hereinafter, referred to as DB moving images) stored in a database 201. The search unit 111 may execute, for example, one of the following moving image search processing 1 and 2.

—Moving Image Search Processing 1—

When time-series data in the direction of the change in the feature value is used as the key, the search unit 111 may search for a DB moving image in which the degree of similarity of the time-series data is equal to or greater than a reference value. The method of computing the degree of similarity of the time-series data is not particularly limited, and any technique can be adopted.

Note that, the above-described time-series data may be generated in advance in a manner similar to that described above in association with each of the DB moving images stored in the database 201, and stored in the database. In addition, the search unit 111 may process each of the DB moving images stored in the database 201 by the method to that described above every time the search processing is performed, and generate the time-series data for each DB moving image.

—Moving Image Search Processing 2—

When the direction of a change in the feature value occurring between the two query frames is used as a key, the search unit 111 may search for a DB moving image indicating such direction of the change in the feature value.

Note that, index data in the direction of the change in the feature value to be indicated in each DB moving image may be generated in advance in association with each of the DB moving image stored in the database 201, and stored in the database. In addition, the search unit 111 may process each of the DB moving images stored in the database 201 by a method similar to that described above every time the search processing is performed, and generate, for each DB moving image, index data in the direction of the change in the feature value to be indicated in each DB moving image.

Figure 44:
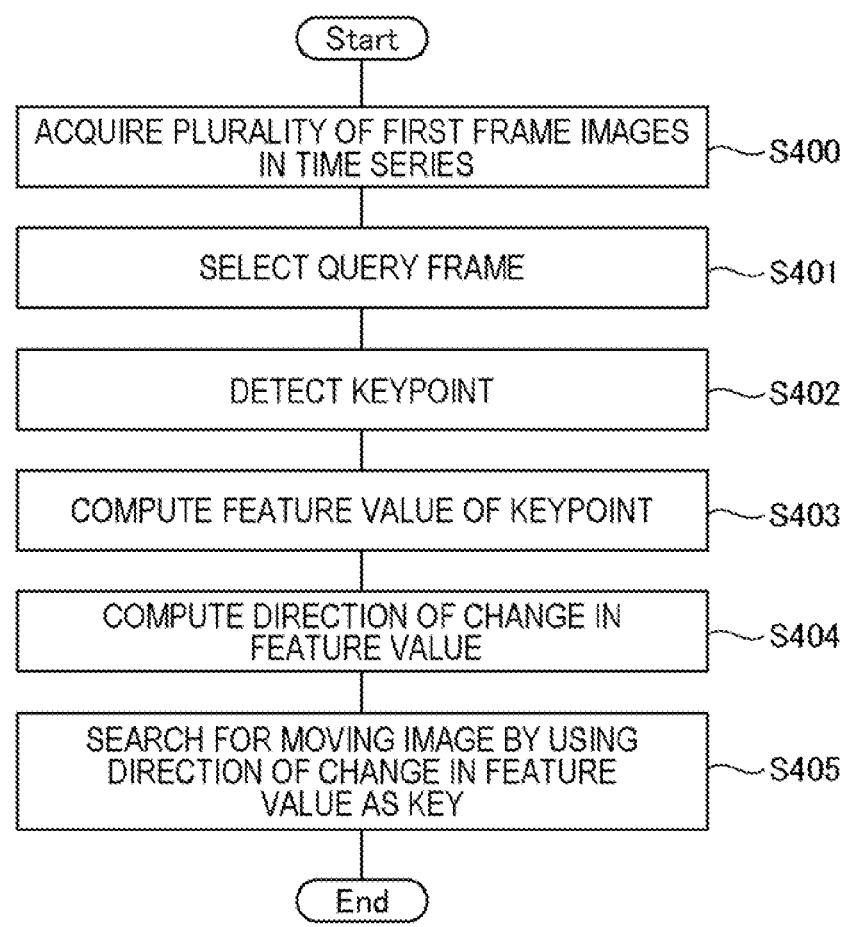
FIG. 44 is a flowchart illustrating one example of a flow of processing performed by the image processing apparatus according to the third example embodiment.

Next, one example of a flow of processing of the image processing apparatus 100 will be described with reference to FIG. 44. Note that, the aim herein is to describe the flow of the processing. Since the details of each processing have been described above, the description thereof will be omitted.

The image processing apparatus 100, upon acquiring a query moving image composed of a plurality of time-series first frame images (S400), selects at least a part of the plurality of first frame images as a query frame (S401).

Next, the image processing apparatus 100 detects a keypoint of an object being included in each of the plurality of first frame images (S402). Note that, only the query frame selected in S401 may be the target of such processing, or all the first frame images may be the target of such processing.

Then, the image processing apparatus 100 computes the feature value of the detected keypoint for each of the plurality of first frame images (S403). Note that, only the query frame selected in S401 may be the target of such processing, or all the first frame images may be the target of such processing.

Then, the image processing apparatus 100 computes the direction of the change in the feature value along the time axis of the plurality of time-series first frame images (S404). The image processing apparatus 100 computes the direction of change in the feature value between adjacent query frames. The direction of change is divided into three, for example, [direction in which the numerical value increases], [no change in the numerical value], and [direction in which the numerical value decreases].

When three or more query frames are to be processed, the image processing apparatus 100 may compute time-series data indicating a time-series change in the direction of the change in the feature value. When only two query frames are to be processed, the image processing apparatus 100 may compute the direction of the change in the feature value occurring between such two images.

Next, the image processing apparatus 100 searches for a DB moving image by using the direction of the change in the feature value computed in S404 as a key (S405). Specifically, the image processing apparatus 100 searches for a DB moving image matching the key, from among the DB moving images being stored in the database 201. Then, the image processing apparatus 100 outputs a search result. The output of the search result may be implemented by employing any technique.

Herein, modification examples of the present example embodiment will be described. The image processing apparatus 100 according to the present example embodiment may be configured to employ one or more of the following modification examples 1 to 7.

Modification Example 1

Figure 45:
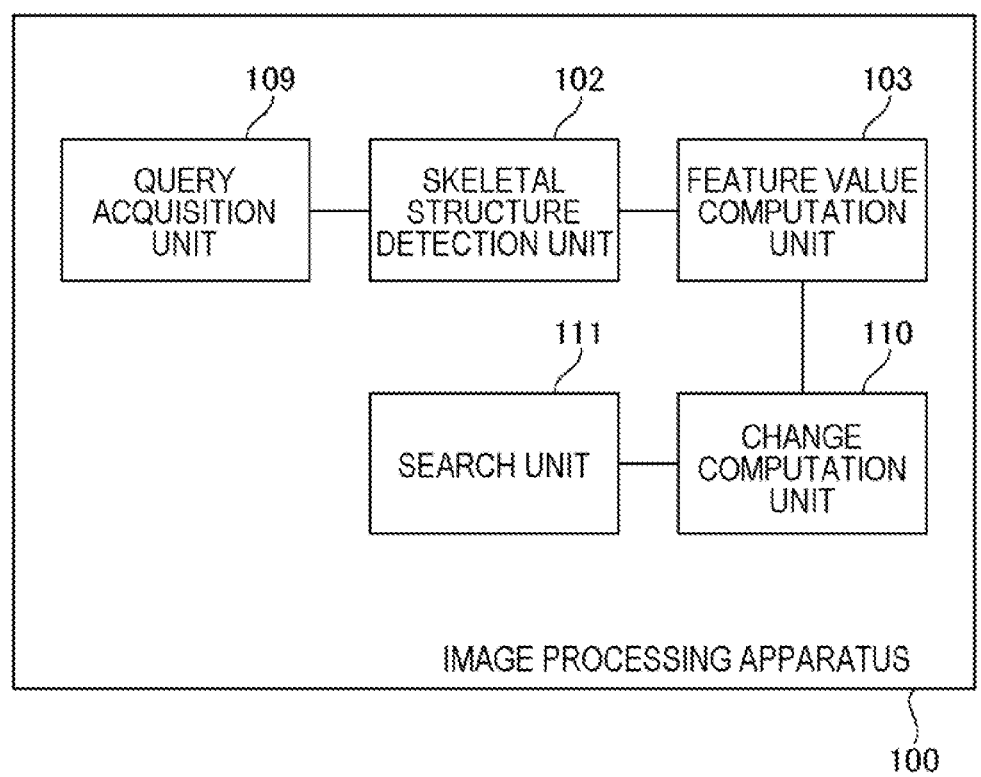
FIG. 45 is a configuration diagram illustrating a configuration of the image processing apparatus according to the third example embodiment.

As illustrated in the functional block diagram of FIG. 45, the image processing apparatus 100 may not necessarily include the query frame selection unit 112. In such a case, the change computing unit 110 may compute the direction of the change in the feature value between adjacent first frame images. When three or more first frame images are to be processed, the change computing unit 110 may compute time-series data indicating a time-series change in the direction of the change in the feature value. When only two first frame images are to be processed, the change computing unit 110 may compute the direction of the change in the feature value occurring between such two images.

Figure 46:
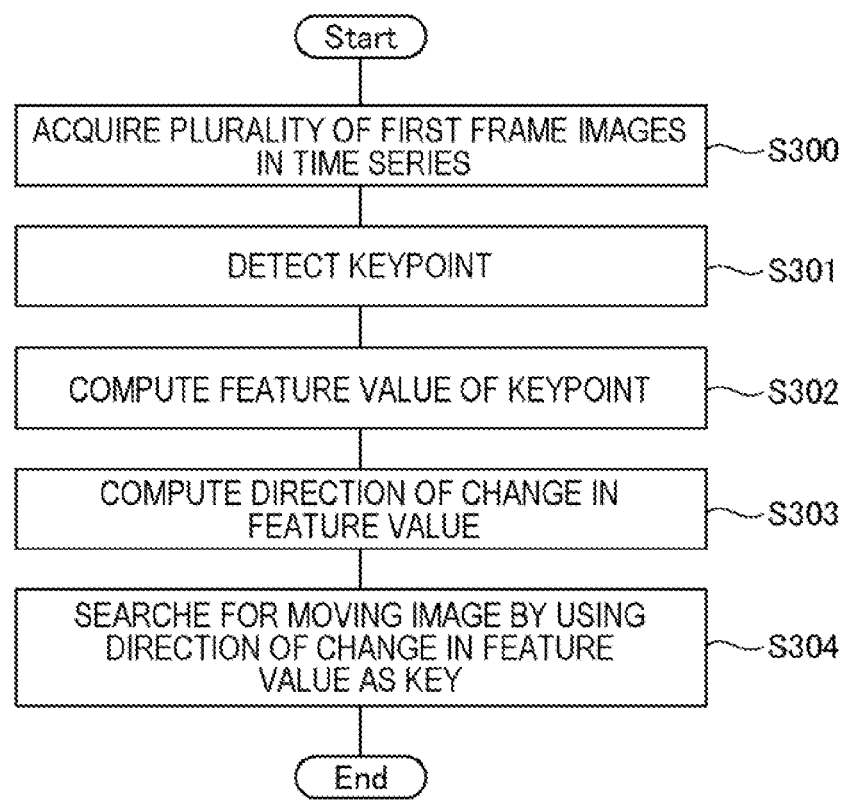
FIG. 46 is a flowchart illustrating one example of a flow of processing performed by the image processing apparatus according to the third example embodiment.

Next, one example of a flow of processing performed by the image processing apparatus 100 according to the modification example will be described with reference to FIG. 46. Note that, the aim herein is to describe the flow of the processing. Since the details of each processing have been described above, the description thereof will be omitted.

The image processing apparatus 100 acquires a query moving image composed of a plurality of time-series first frame images (S300). Next, the image processing apparatus 100 detects a keypoint of an object being included in each of the plurality of first frame images (S301). Then, the image processing apparatus 100 computes the feature value of the detected keypoint for each of the plurality of first frame images (S302).

Then, the image processing apparatus 100 computes the direction of the change in the feature value along the time axis of the plurality of time-series first frame images (S303). Specifically, the image processing apparatus 100 computes the direction of change in the feature value between adjacent first frame images.

Then, the image processing apparatus 100 searches for a DB moving image by using the direction of the change in the feature value computed in S303 as a key (S304). Specifically, the image processing apparatus 100 searches for a DB moving image matching a key from among the DB moving images stored in the database 201. Then, the image processing apparatus 100 outputs a search result. The output of the search result may be implemented by employing any technique.

Modification Example 2

In the above-described example embodiment, the image processing apparatus 100 detects a keypoint of a person's body, and searches for a DB moving image by using the direction of the change thereof as a key. In the modification example 2, the image processing apparatus 100 may detect a keypoint of an object other than a person and search for a DB moving image by using the direction of the change thereof as a key. The object is not particularly limited, and examples thereof include animals, plants, natural products, artifacts, and the like.

Modification Example 3

The change computing unit 110 may compute the magnitude of the change in the feature value in addition to the direction of the change in the feature value. The change computing unit 110 may compute the magnitude of the change in the feature value between adjacent query frames or between adjacent first frame images. The magnitude of the change in the feature value can be expressed by, for example, an absolute value of a difference between numerical values indicating the feature value. In addition, the magnitude of the change in the feature value may be a value acquired by normalizing such absolute value.

When three or more images (query frames or first frame images) are to be processed, the change computing unit 110 may compute time-series data that further indicates a time-series change in the magnitude of the change in addition to the direction of the change in the feature value.

When only two images (query frames or first frame images) are to be processed, the change computing unit 110 may compute the direction and magnitude of the change in the feature value occurring between such two images.

The search unit 111 searches for a DB moving image by using the direction of change and the magnitude of change computed by the change computing unit 110 as keys.

When the time-series data of the direction and the magnitude of the change of the feature value is used as the key, the search unit 111 may search for a DB moving image in which the degree of similarity of the time-series data is equal to or greater than a reference value. The method of computing the degree of similarity of the time-series data is not particularly limited, and any technique may be adopted.

When the direction and the magnitude of the change in the feature value occurring between the two images (the query frames or the first frame images) are used as keys, the search unit 111 may search for a DB moving image indicating the direction and the magnitude of the change in the feature value.

Modification Example 4

The change computing unit 110 may compute the speed of the change in the feature value in addition to the direction of the change in the feature value. This modification example is effective when query frames are selected from the first frame image at discrete intervals as illustrated in FIG. 42, and the direction of change in the feature value is computed between adjacent query frames. In such a case, by referring to the speed of the change in the feature value between adjacent query frames, it is possible to search for a DB moving image being more similar.

The change computing unit 110 may compute the speed of change in the feature value between adjacent query frames. The speed may be computed by dividing the magnitude of the change in the feature value by a value (the number of frames, a value converted into time based on a frame rate, or the like) indicating the magnitude of time between adjacent query frames. The magnitude of the change in the feature value may be expressed by, for example, an absolute value of a difference between numerical values indicating the feature value. In addition, the magnitude of the change in the feature value may be a value acquired by normalizing such absolute value.

When three or more query frames are to be processed, the change computing unit 110 may compute time-series data indicating the speed of the change in addition to the direction of the change in the feature value.

When only two query frames are to be processed, the change computing unit 110 may compute the direction and speed of the change in the feature value occurring between such two images.

The search unit 111 searches for a DB moving by image using the direction of the change and the speed of the change computed by the change computing unit 110 as keys.

When the time-series data of the direction and the speed of the change of the feature value is used as the key, the search unit 111 may search for a DB moving image in which the similarity of the time-series data is equal to or greater than the reference value. The method of computing the degree of similarity of the time-series data is not particularly limited, and any technique may be adopted.

When the direction and the speed of the change in the feature value occurring between the two query frames are used as keys, the search unit 111 may search for a DB moving image indicating the direction and the speed of the change in the feature value.

Modification Example 5

Up to this point, the search unit 111 searches for a DB moving image that matches the key, but may search for a DB moving image that does not match the key. That is, the search unit 111 may search for a DB moving image the degree of similarity to the time-series data, which is a key, is less than the reference value. Further, the search unit 111 may search for a DB moving image that does not include a direction (which may include a magnitude, a speed, and the like) of a change in the feature value being a key.

Further, the search unit 111 may search for a DB moving image that matches a search condition in which a plurality of keys are connected by any logical operator.

Modification Example 6

The search unit 111 may search for a DB moving image by using a representative image selected from the first frame images of the query moving image as a key in addition to the result (the direction, the magnitude, the speed, and the like of the change in the feature value) computed by the change computing unit 110. The representative image may be one or a plurality of images. For example, the query frame may be the representative image, a frame selected from among the query frames by any means may be the representative image, or the representative image may be selected from among the first frame images by other means.

The search unit 111 may search for, from among the DB moving images stored in the database 201, a DB moving image in which the total degree of similarity acquired by integrating the similarity degree with the query moving image computed based on the representative image and the similarity degree with the query moving image computed based on the result (the direction, the magnitude, the speed, and the like of the change in the feature value) computed by the change computing unit 110 is equal to or greater than a reference value.

Herein, a method of computing the degree of similarity, based on the representative image, will be described. The search unit 111 may compute the degree of similarity between each of the DB moving images and the query moving image, based on the following criteria.

The degree of similarity of a DB moving image including a frame image having a degree of similarity with the representative image equal to or larger than a reference value is increased.

When there are a plurality of representative images, the degree of similarity of a DB moving image including a frame image similar to more of the representative images (the degree of similarity is equal to or greater than the reference value) is increased.

When there are a plurality of representative images, the degree of similarity of a DB moving image is increased as the time-series order of the plurality of representative images and the time-series order of the frame images similar to each of the plurality of representative images become similar.

The degree of similarity between the representative image and the frame image is computed based on the pose of the person included in each image. The more similar the pose, the higher the degree of similarity between the representative image and the frame image. The search unit 111 may compute the degree of similarity of the feature value of the skeletal structure described in the above-described example embodiment as the similarity between the representative image and the frame image, or may compute the degree of similarity of the pose of the person by using other well-known techniques.

Next, a method of computing the degree of similarity, based on the result (the direction, the magnitude, the speed, and the like of the change of the feature value) computed by the change computing unit 110 will be described. When the time-series data in the direction of the change in the feature value (wherein the data may further indicate the magnitude and the speed of the change in the feature value) is used, the degree of similarity of the time-series data may be computed as the degree of similarity between each of the DB moving images and the query moving image.

When the direction of the change in the feature value occurring between the two query frames, the magnitude of the change, and the speed of the change are being used, a DB moving image, which has the same direction of the change as that of the query moving image and has the magnitude of the change and the speed of the change that are similar to those indicated by the query moving image, has a higher degree of similarity.

There are various methods for integrating the degree of similarity based on the representative image and the degree of similarity based on the result (the direction, the magnitude, the speed, and the like of the change of the feature value) computed by the change computing unit 110. For example, each degree of similarity may be normalized and added up. In such a case, each degree of similarity may be weighted. That is, a value acquired by adding a value acquired by multiplying a degree of similarity based on a representative image or a standard value thereof by a predetermined weight coefficient and a value acquired by multiplying a degree of similarity based on the result (the direction, the magnitude, the speed, or the like of the change in the feature value) computed by the change computing unit 110 or a standard value thereof by a predetermined weight coefficient may be computed as an integration result.

As described above, according to the image processing apparatus 100 of the present example embodiment, the same advantageous effect as those of the first and second example embodiments may be achieved. Further, according to the image processing apparatus 100 of the present example embodiment, it is possible to search for a moving image by using the direction of the change in the pose of the object being included in the image, the magnitude of the change, the speed of the change, and the like as keys. According to the image processing apparatus 100 of the present example embodiment, it is possible to accurately search for a moving image including a desired scene.

Modification Example 7

Similarly to the first and second example embodiments, the image processing apparatus 100 may constitute an image processing system 1 together with a camera 200 and the database 201.

Fourth Example Embodiment

Hereinafter, a fourth example embodiment will be described with reference to the drawings. In the present example embodiment, a plurality of queries indicating the same pose and the same action are integrated, and a search is performed by using the integrated query, thereby an image indicating the same pose and action as the pose and action indicated by the query can be accurately searched for.

Figure 47:
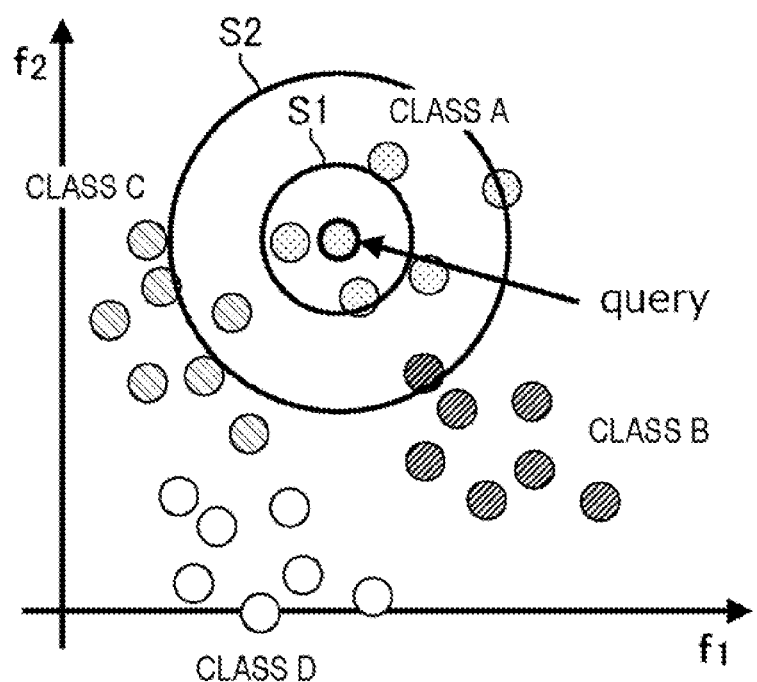
FIG. 47 is a diagram for describing a concept of processing performed by an image processing apparatus according to fourth and fifth example embodiments.

First, the reason why the search accuracy is improved by performing the search by using the query after the integration will be described. As described above, even in the same pose (e.g., sitting in a chair) or the same action (e.g., throwing an object), there is a difference due to a physical difference, an individual difference, or the like. Therefore, it is difficult to accurately search for an image indicating the same pose or action as the pose or action indicated by the query (still image or moving image). A detailed description will be given with reference to FIG. 47. In FIG. 47, for simplicity of explanation, points corresponding to each of the plurality of images are plotted in two axes of the first feature value $f_1$ and the second feature value $f_2$. As illustrated in the figure, images belonging to the same classification (images illustrating the same pose and the same action) are gathered together, but have a certain extent. This spreading is caused by differences due to physical differences, individual differences, or the like.

Herein, a case will be considered in which an image of a point indicated as a [query] in the drawing is used as a query image, and an image of another point is used as an image to be searched for. The query image belongs to class A. Therefore, it is preferable to implement a search in which images belonging to the class A are included in the search result without omission and images belonging to classes other than the class A are not included in the search result. Incidentally, in the search processing, an image in which the degree of similarity of the feature value with the query image is equal to or greater than a threshold value is searched for. If the threshold value is set too high as in S1 in the drawing, an inconvenience that an image belonging to a class other than the class A is included in the search result can be suppressed, but the inconvenience that the image belonging to the class A is leaked from the search result may occur. On the other hand, if the threshold value is set too low as in S2 in the drawing, the inconvenience that the image belonging to the class A leaks from the search result can be suppressed, but the inconvenience that an image belonging to a class other than the class A is included in the search result may occur.

Figure 48:
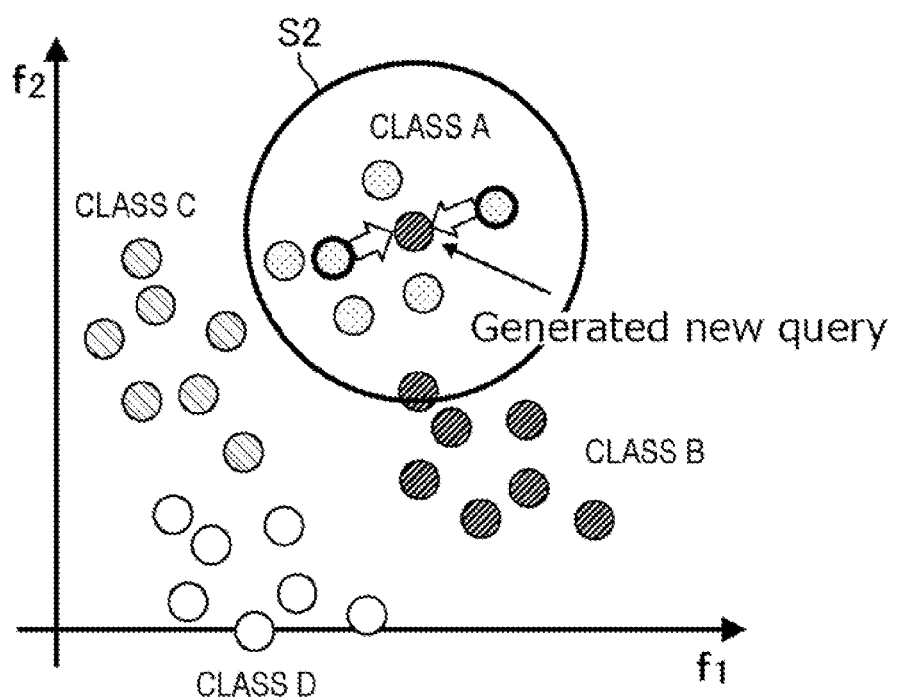
FIG. 48 is a diagram for describing a concept of processing performed by the image processing apparatus according to the fourth and fifth example embodiments.

The above-described inconveniences may occur when the plot position of the query image is not located near the center of the area occupied by the points of the images belonging to the same class. On the other hand, as illustrated in FIG. 48, when a new query is generated by integrating (averaging or the like) a plurality of queries belonging to the same class, the probability that the plot position of the query is located near the center of the area occupied by the points of the images belonging to the same class is high. When a search is performed by using such a query, an image indicating the same pose and action as the action indicated by the query is included in the search result without omission, and a search in which an image indicating a pose and an action different from the action indicated by the query is not included in the search result is easily achieved.

Figure 49:
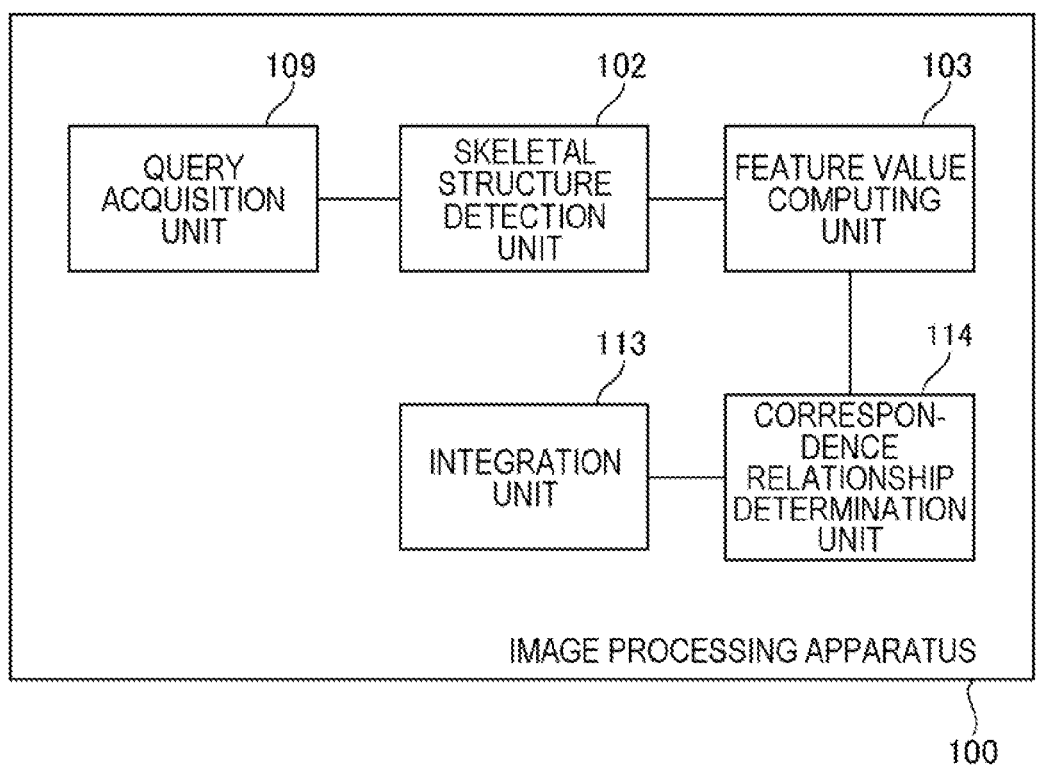
FIG. 49 is a configuration diagram illustrating one example of a configuration of the image processing apparatus according to the fourth example embodiment.
Figure 50:
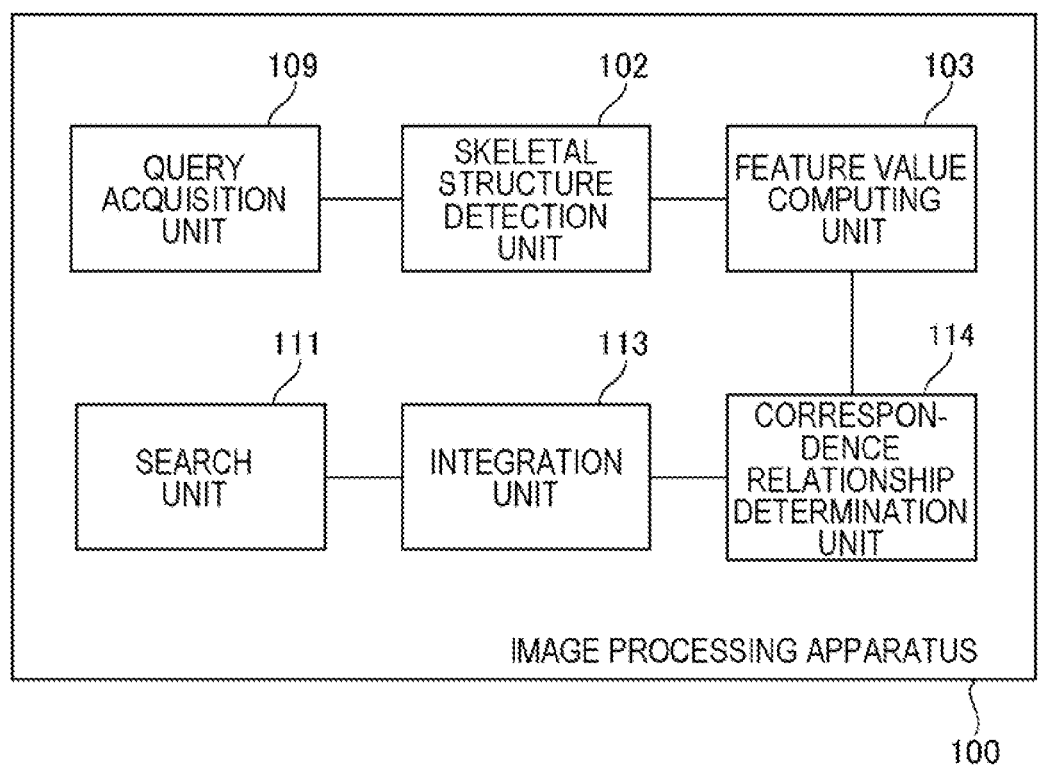
FIG. 50 is a configuration diagram illustrating one example of a configuration of the image processing apparatus according to the fourth example embodiment.

Next, a functional configuration of an image processing apparatus 100 according to the present example embodiment will be described. FIG. 49 illustrates one example of a functional block diagram of the image processing apparatus 100 according to the present example embodiment. As illustrated, the image processing apparatus 100 includes a query acquisition unit 109, a skeletal structure detection unit 102, a feature value computing unit 103, a correspondence relationship determination unit 114, and an integration unit 113. As illustrated in FIG. 50, the image processing apparatus 100 may further include a search unit 111. The image processing apparatus 100 may further include other functional units described in first to third example embodiments.

Figure 51:
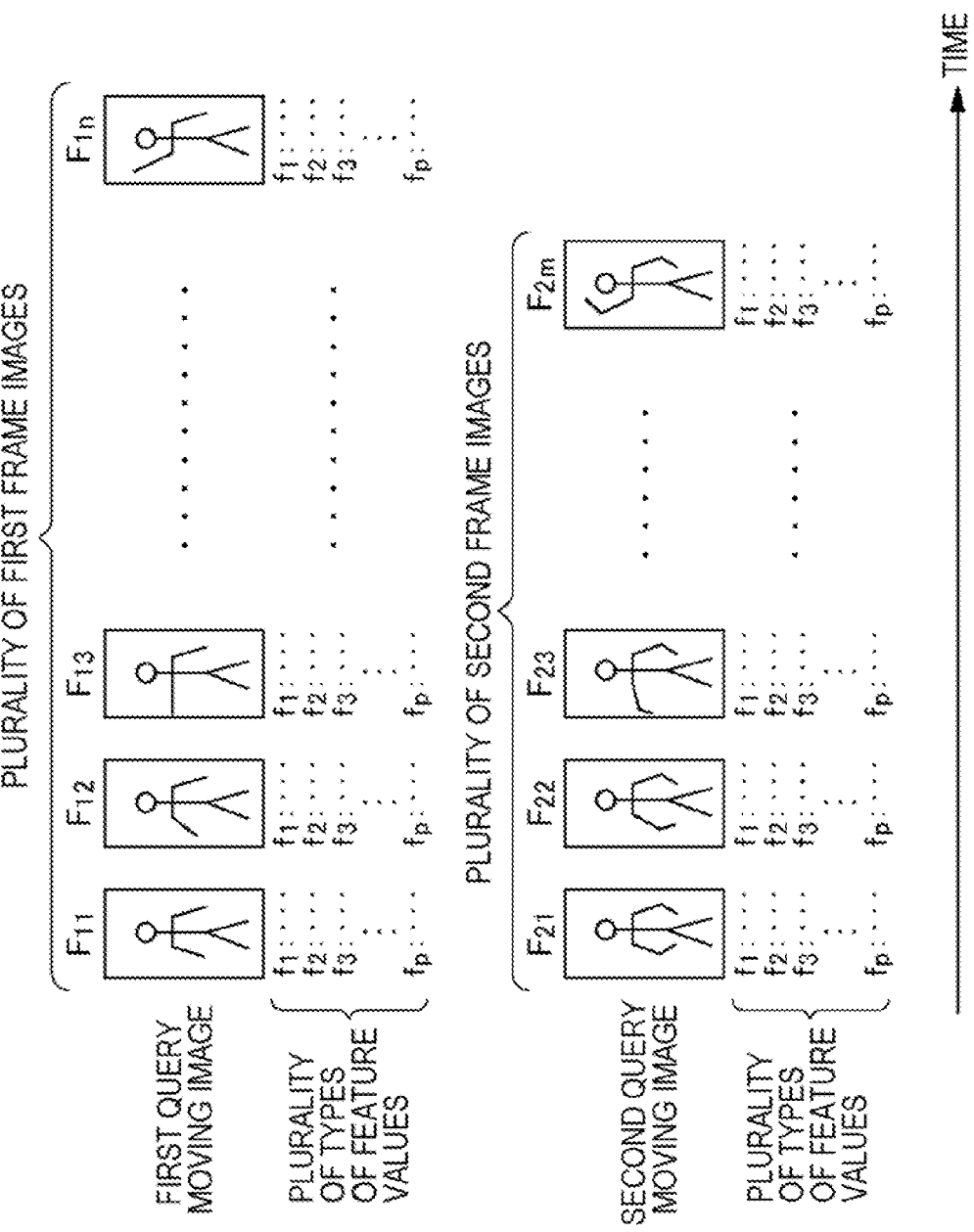
FIG. 51 is a diagram illustrating details of processing performed by the image processing apparatus according to the fourth example embodiment.

The query acquisition unit 109 acquires the first query moving image and at least one second query moving image. For example, the query acquisition unit 109 acquires the first query moving image and the second query moving image input/specified/selected by the user operation. As illustrated in FIG. 51, the first query moving image includes a plurality of time-series first frame images. The second query moving image includes a plurality of time-series second frame images.

The first query moving image and the second query moving image indicate the same pose or the same action. The first query moving image and the second query moving image may have the same or different time lengths. That is, the numbers of pixels of the plurality of first frame images and the plurality of second frame images may be the same as or different from each other. The first query moving image and the second query moving image may include the same person or different persons. Depending on the feature value being used, it is desirable to align the angle of view of the first query moving image and the angle of view of the second query moving image to some extent.

The skeletal structure detection unit 102 detects a keypoint of a person (object) included in each of the plurality of first frame images. In addition, the skeletal structure detection unit 102 detects a keypoint of a person (object) included in each of the plurality of second frame images. Since the configuration of the skeletal structure detection unit 102 is similar to that of the first to third example embodiments, detailed description thereof will be omitted.

The feature value computing unit 103 computes the feature value of the detected keypoint, that is, the feature value of the detected two-dimensional skeletal structure, for each first frame image. Further, the feature value computing unit 103 computes the feature value of the detected keypoint, that is, the feature value of the detected two-dimensional skeletal structure, for each second frame image. Since the configuration of the feature value computing unit 103 is similar to that of the first to third example embodiments, detailed description thereof will be omitted.

Figure 52:
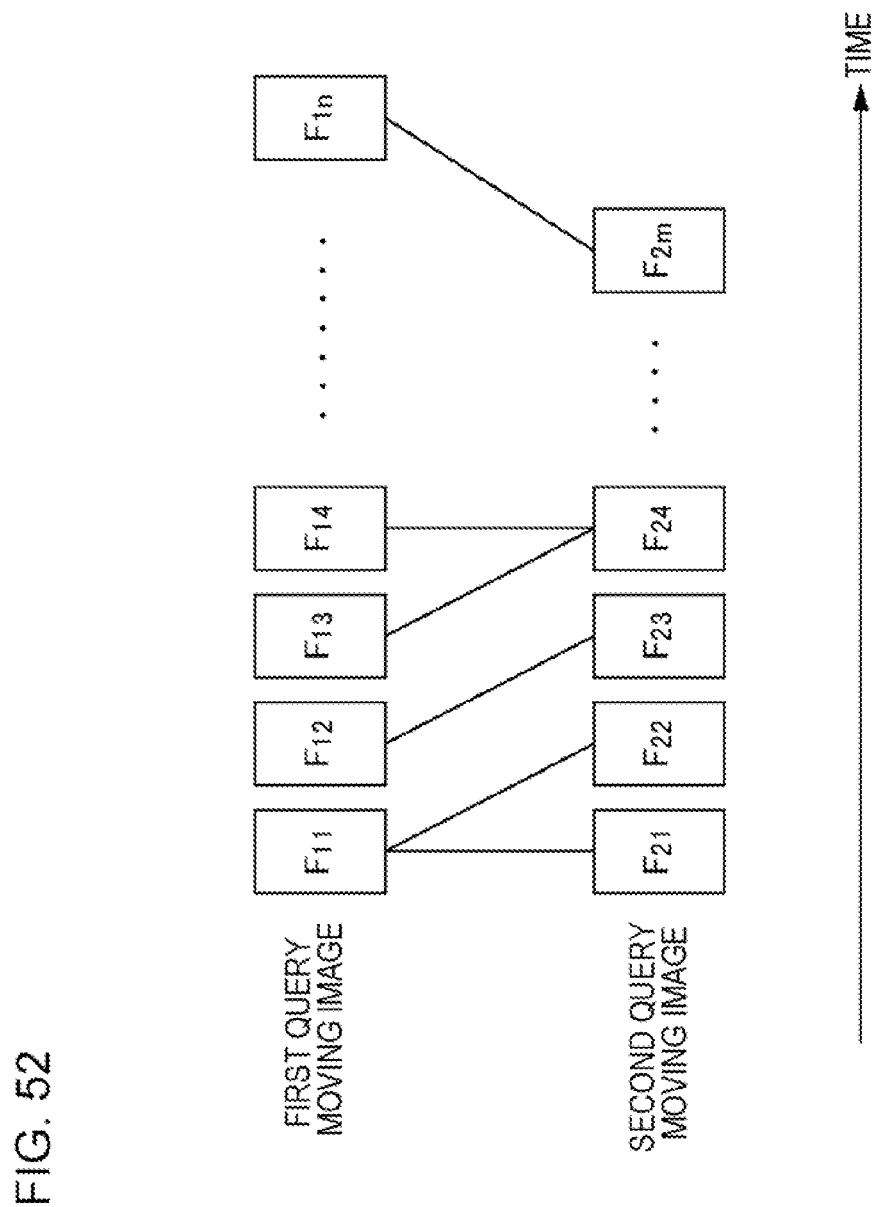
FIG. 52 is a diagram illustrating details of processing performed by the image processing apparatus according to the fourth example embodiment.

The correspondence relationship determination unit 114 determines a second frame image associated with each of the plurality of first frame images. As illustrated in FIG. 51, the first query moving image and the second query moving image may have different time lengths (that is, the number of first frame images and the number of second frame images may be different). Further, even when the first query moving image and the second query moving image indicate the same action, the timing at which the action is started and the timing at which the action is ended may be different from each other. As illustrated in FIG. 52, the correspondence relationship determination unit 114 associates frame images in which a person who performs a predetermined action in the first query moving image and a person who performs a predetermined action in the second query moving image have the same pose. That is, the correspondence relationship determination unit 114 determines the second frame image in which the person takes the same pose as the pose of a person indicated by each of the plurality of first frame images, and associates the second frame images with each other. In FIG. 52, the first frame image and the second frame image associated with each other are connected by a line. As illustrated in the figure, one first frame image may be associated with a plurality of second frame images. Further, one second frame image may be associated with a plurality of first frame images.

For example, the determination of the correspondence relationship may be implemented by using a technique such as dynamic time warping (DTW). At this time, as a distance score necessary for determining the correspondence relationship, a distance (Manhattan distance or Euclidean distance) between feature values or the like may be used.

Figure 53:
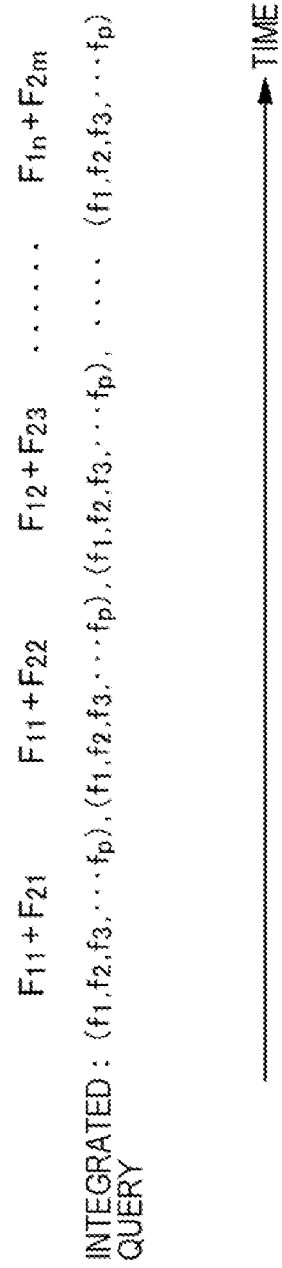
FIG. 53 is a diagram illustrating details of processing performed by the image processing apparatus according to the fourth example embodiment.

The integration unit 113 performs processing of integrating feature values computed from each of the first frame image and the second frame image associated with each other. The integration unit 113 performs such processing on a plurality of combinations of the first frame image and the second frame image associated with each other, thereby generating an integrated query in which the integrated feature values are arranged in time series. FIG. 53 schematically illustrates one example of an integrated query. The illustrated integrated query is generated based on the first query moving image and the second query moving image illustrated in FIG. 51 and the correspondence relationship illustrated in FIG. 52.

In FIG. 53, feature values $f_1$ to $f_p$ associated with $[F_{11}+F_{21}]$ are acquired by integrating feature values $f_1$ to $f_p$ computed from a first frame image $F_{11}$ and feature values $f_1$ to $f_p$ computed from a second frame image $F_{21}$. Similarly, feature values $f_1$ to $f_p$ associated with $[F_{11}+F_{22}]$ are acquired by integrating feature values $f_1$ to $f_p$ computed from the first frame image $F_{11}$ and feature values $f_1$ to $f_p$ computed from the second frame image $F_{22}$. FIG. 53 illustrates an integrated query in which feature values $f_1$ to $f_p$ are arranged in time series, which is generated by performing integration processing on a plurality of combinations of the first frame image and the second frame image associated with each other. The integration unit 113 may compute, as the integrated feature values, an arithmetic average value or a weighted average value of the feature values computed from each of the first frame image and the second frame image. The feature value $f_1$ among the integrated feature values $f_1$ to $f_p$ associated with $[F_{11}+F_{21}]$ is an arithmetic average value or a weighted average value of the feature value $f_1$ computed from the first frame image $F_{11}$ and the feature value $f_1$ computed from the second frame image $F_{21}$.

In a case where an integrated query is generated based on the first query moving image and the plurality of second query moving images, similarly, a correspondence relationship is determined with each other, and an arithmetic average value or a weighted average value of feature values computed from each of the plurality of frame images associated with each other is computed, whereby an integrated query in which the integrated feature values are arranged in time series may be created.

As illustrated in FIG. 53, the search unit 111 searches for a moving image by using an integrated query in which the integrated feature values $f_1$ to $f_p$ are arranged in time series. The method of searching for a moving image is not particularly limited, and any method may be adopted. The search unit 111 may adopt the methods described in the first to third example embodiments, or may adopt other methods.

Figure 54:
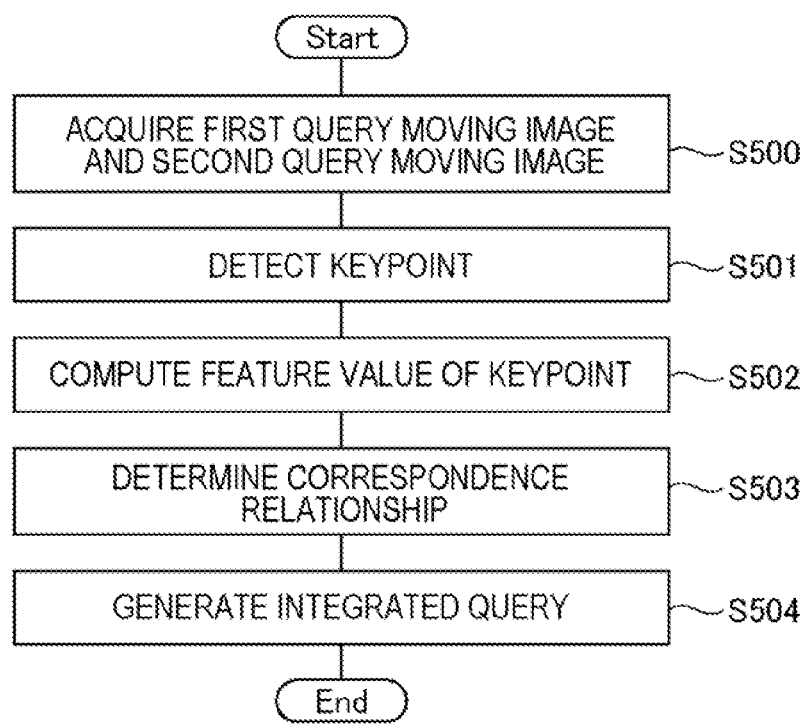
FIG. 54 is a flowchart illustrating one example of a flow of processing performed by the image processing apparatus according to the fourth example embodiment.

Next, one example of the flow of processing of the image processing apparatus 100 according to the present example embodiment will be described with reference to the flowchart of FIG. 54. Note that, the aim herein is to describe the flow of the processing. Since the details of each processing have been described above, the description thereof will be omitted.

The image processing apparatus 100 acquires a first query moving image having a plurality of time-series first frame images and at least one second query moving image having a plurality of time-series second frame images (S500).

Next, the image processing apparatus 100 detects a keypoint of an object being included in each of the first frame image and the second frame image (S501). Then, the image processing apparatus 100 computes the feature value of the detected keypoint (S502).

Then, the image processing apparatus 100 determines a correspondence relationship between the plurality of first frame images and the plurality of second frame images (S503). Then, the image processing apparatus 100 performs processing of integrating the feature values computed from each of the first frame image and the second frame image associated with each other with respect to a plurality of combinations of the first frame image and the second frame image associated with each other, thereby generating an integrated query in which the integrated feature values are arranged in time series (S504).

Figure 55:
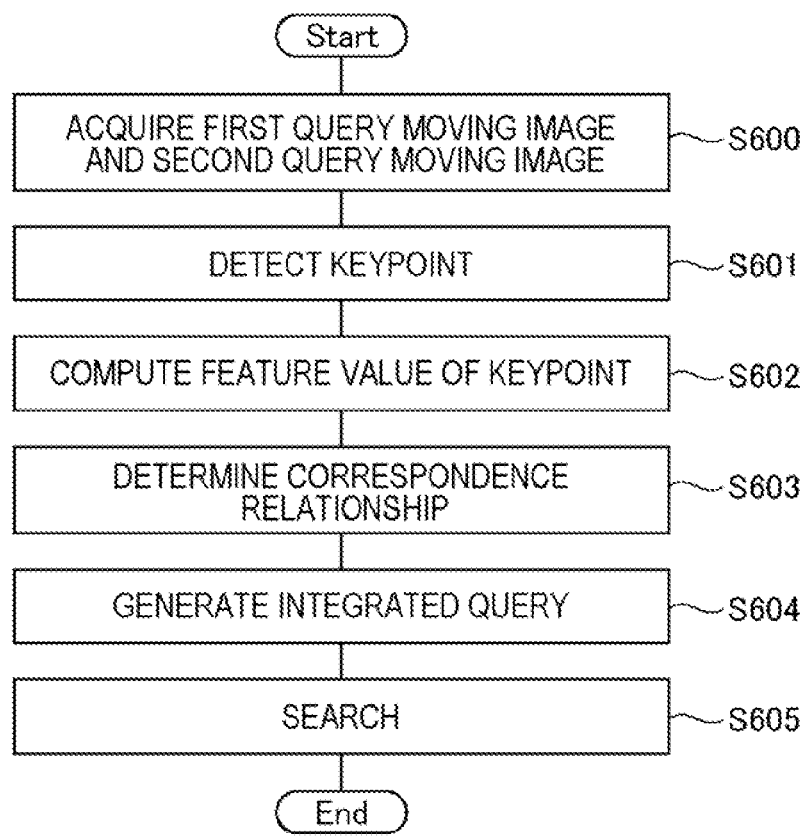
FIG. 55 is a flowchart illustrating one example of a flow of processing performed by the image processing apparatus according to the fourth example embodiment.

Next, one example of the flow of processing of the image processing apparatus 100 according to the present example embodiment will be described with reference to the flowchart of FIG. 55. Note that, the aim herein is to describe the flow of the processing. Since the details of each processing have been described above, the description thereof will be omitted.

The processing illustrated in steps S600 to S604 is the same as the processing in steps S500 to S504 described with reference to FIG. 54. In the example illustrated in FIG. 55, after S604, the image processing apparatus 100 searches for a moving image by using the integrated query created in S604 as a key (S605).

As described above, according to the image processing apparatus 100 of the present example embodiment by which a plurality of queries indicating the same pose and the same action are integrated, a query after integration is generated, and a search is performed by using the integrated query, the search accuracy of the processing of searching for an image indicating the same pose and action as the pose and action indicated by the query is improved.

Herein, a modification example of the present example embodiment will be described. The image processing apparatus 100 according to the present example embodiment may be configured to employ one or more of the following modification examples 8 and 9.

Modification Example 8

The search unit 111 may search for a moving image by using a weighting value set for each of a plurality of types of feature values. In the example illustrated in FIG. 53, weighting values are set for each of the feature values $f_1$ to $f_p$, and a moving image is searched for by using the weighting values.

Herein, one example of a method of setting a weighting value will be described. The setting of the weighting value is performed by, for example, the integration unit 113. The integration unit 113 may set a weighting value for each feature value, based on the degree of similarity of each of the plurality of types of feature values computed from each of the first frame image and the second frame image associated with each other. A feature value having a low degree of similarity is a feature value related to a body part that performs a characteristic movement in the action, and is considered that the degree of similarity is low due to a physical difference, an individual difference, or the like. Therefore, the integration unit 113 may increase the weighting value for feature values having a lower degree of similarity. On the other hand, the feature value having a high degree of similarity may be regarded as a common part that can have the same content of the action in all persons regardless of physical differences, individual differences, or the like. Therefore, the integration unit 113 may increase the weighting value for feature values having a higher degree of similarity. Which concept is adopted may be determined based on the content of the action, the required performance of the search, and the like.

Next, one example of search processing using a weighting value will be described. The search unit 111 computes the degree of similarity between the query image and the image to be searched for, for each of the plurality of types of feature values, integrates (for example, adds together) the plurality of degrees of similarity computed for each of the plurality of types of feature values, and computes the integrated degree of similarity. In such integration, weighting values may be utilized. For example, the integrated degree of similarity may be computed by adding up values acquired by multiplying each of the plurality of degrees of similarity computed for each of the plurality of types of feature values by a coefficient corresponding to the weighting value of each feature value. The search unit 111 may search for an image having an integrated degree of similarity equal to or greater than a threshold as an image similar to a query image.

Modification Example 9

The search unit 111 may search for a moving image by using a part of the integrated query as a key. A part used as a key is a part generated based on a first frame image and a second frame image included in a time period in which a change in the feature value equal to or larger than a threshold value (a large change in the pose of a person in the moving image) occurs in common in both the first query moving image and the second query moving image. The time period in which the change in the feature value equal to or larger than the threshold value occurs is a time period in which the change in the feature value from a predetermined reference pose is equal to or larger than the threshold value. For example, if an upright pose is defined as a reference pose, a time period in which a change from the upright pose is above a threshold value, for example, a time period in which a hand is raised or the person has squatted, is determined as a time period in which a change in the feature value equal to or larger than the threshold value is occurring. The reference pose may be defined by a user. In addition, the average pose or the most frequent pose of the poses indicated by the plurality of images may be computed as the reference pose. The plurality of images may be images stored in a database, may be images extracted from a query moving image, or may be images specified by a user.

Modification Example 10

In the above-described example embodiment, the image processing apparatus 100 detects a keypoint of a person's body, and searches for a moving image indicating the same action and pose as the action and pose of the person. In the modification example 10, the image processing apparatus 100 may detect a keypoint of an object other than a person and search for a moving image indicating the same action and pose as the action and pose of the object. The object is not particularly limited, and examples thereof include animals, plants, natural products, artifacts, and the like.

Fifth Example Embodiment

In the fourth example embodiment, the image processing apparatus 100 generates a combined query, based on a plurality of query moving images, and searches for a moving image by using the generated combined query. In the present example embodiment, an image processing apparatus 100 generates a combined query, based on a plurality of query still images, and searches for a still image by using the generated combined query. Then, the image processing apparatus 100 performs a search similar to the search using the weighting values set for each of the plurality of types of feature values described as the modification example 8 in the fourth example embodiment.

Figure 56:
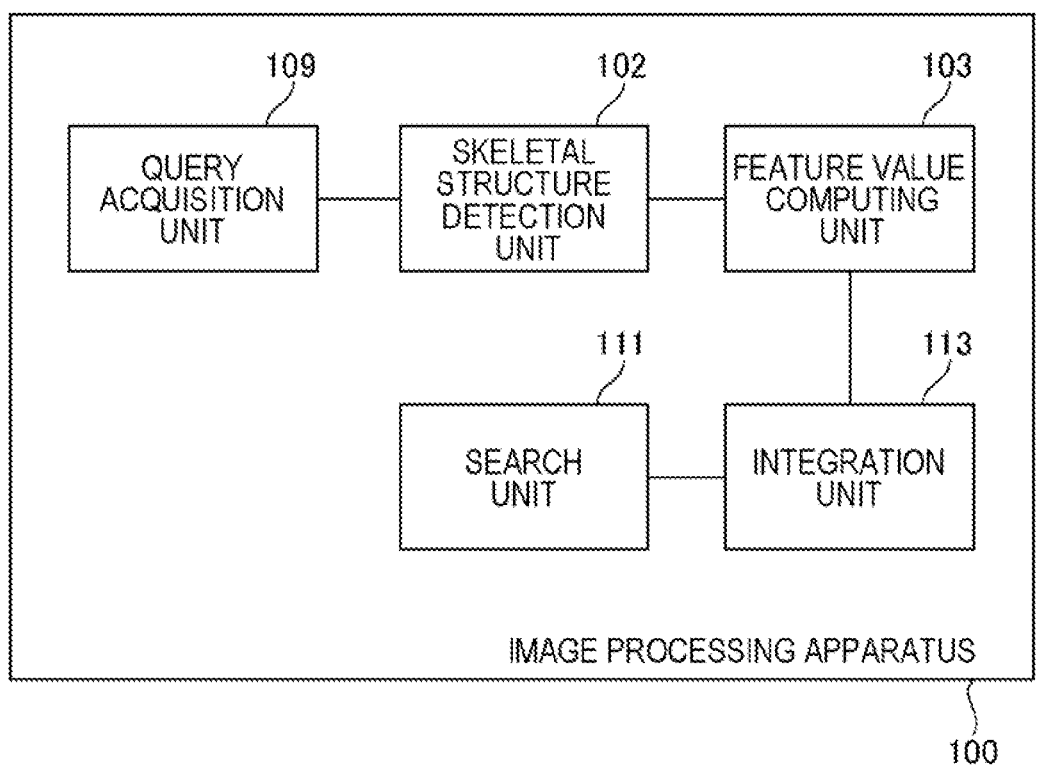
FIG. 56 is a configuration diagram illustrating one example of a configuration of the image processing apparatus according to the fifth example embodiment.

FIG. 56 illustrates one example of a functional block diagram of the image processing apparatus 100 according to the present example embodiment. As illustrated, the image processing apparatus 100 includes a query acquisition unit 109, a skeletal structure detection unit 102, a feature value computing unit 103, an integration unit 113, and a search unit 111. Note that the image processing apparatus 100 may further include other functional units described in the first to fourth example embodiments.

The query acquisition unit 109 acquires a first query still image and at least one second query still image. For example, the query acquisition unit 109 acquires the first query still image and the second query still image input/ specified/selected by a user operation.

Figure 57:
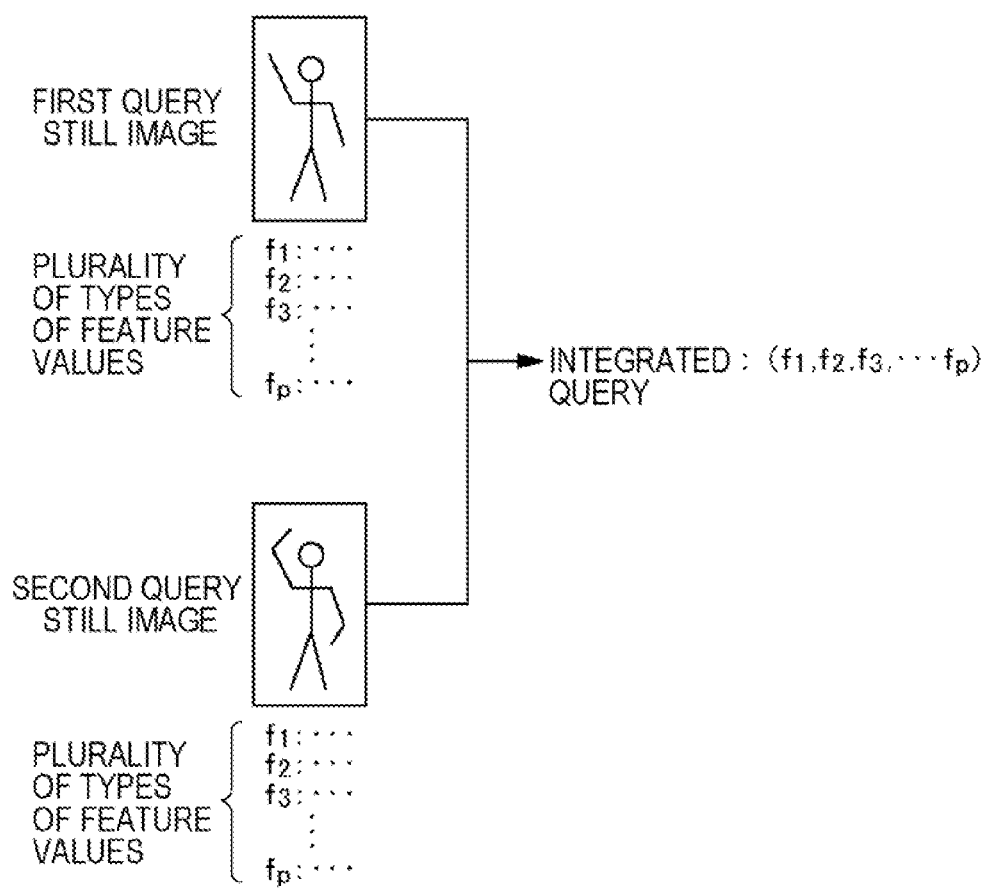
FIG. 57 is a diagram illustrating details of processing performed by the image processing apparatus according to the fifth example embodiment.

As illustrated in FIG. 57, the first query still image and the second query still image have the same pose. The first query still image and the second query still image may include the same person or different persons. Depending on the feature value being used, it is desirable to align the angle of view of the first query still image and the angle of view of the second query still image to some extent.

The skeletal structure detection unit 102 detects a keypoint of a person (object) included in each of the first query still image and the second query still image. Since the configuration of the skeletal structure detection unit 102 is the same as that of the first to fourth example embodiment, detailed description thereof will be omitted.

The feature value computing unit 103 computes the feature value of the keypoint detected from each of the first query still image and the second query still image, that is, the feature value of the detected two-dimensional skeletal structure. Since the configuration of the feature value computing unit 103 is similar to that of the first to fourth example embodiments, detailed description thereof will be omitted.

The integration unit 113 integrates the feature values computed from each of the first query still image and the second query still image, and generates an integrated query. FIG. 57 illustrates an integrated query having a plurality of types of feature values $f_1$ to $f_p$ computed from the first query still image, a plurality of types of feature values $f_1$ to $f_p$ computed from the second query still image, and a plurality of types of feature values $f_1$ to $f_p$ generated by integrating such feature values. The integration unit 113 may compute, as the integrated feature values, an arithmetic average value or a weighted average value of the feature values computed from each of the first query still image and the second query still image. The feature value $f_1$ among the feature values $f_1$ to $f_p$ included in the illustrated integrated query is an arithmetic mean value or a weighted mean value of the feature value $f_1$ computed from the first query still image and the feature value $f_1$ computed from the second query still image.

Similarly, in a case where the integrated query is generated based on the first query still image and the plurality of second query still images, the integrated query may be generated by computing an arithmetic average value or a weighted average value of the feature values computed from each of the plurality of query still images.

The search unit 111 searches for a still image by using the integrated query as a key. The search unit 111 searches for a still image by using a weighting value set for each of a plurality of types of feature values. In the example illustrated in FIG. 57, weighting values are set for each of the feature values $f_1$ to $f_p$ included in the integrated query, and a still image is searched for by using the weighting values. An example of a method of setting a weighting value and search processing using the weighting value is similar to that described in the fourth example embodiment.

Figure 58:
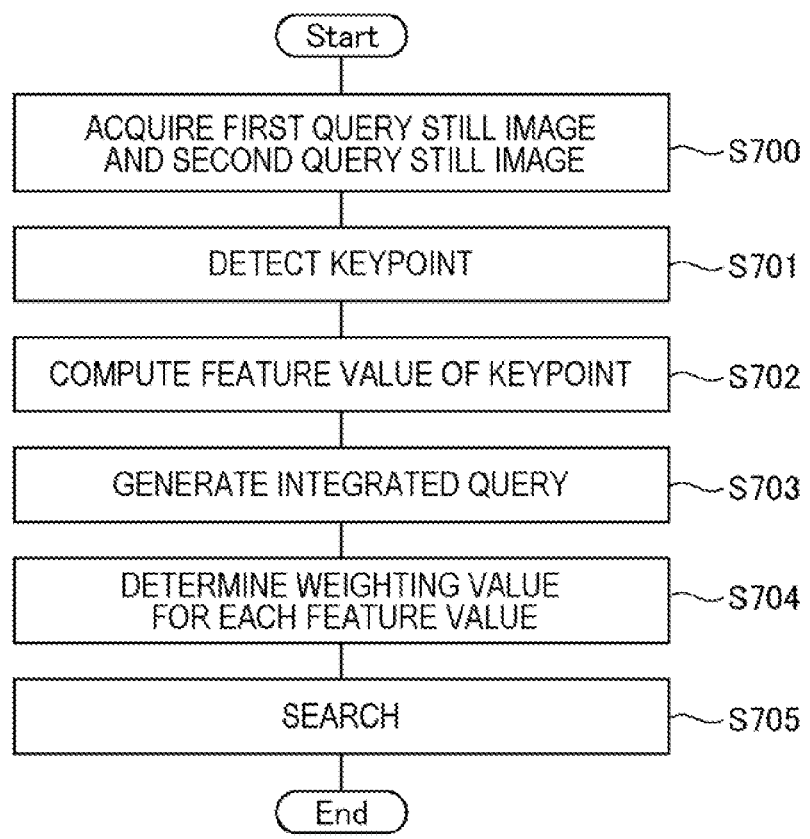
FIG. 58 is a flowchart illustrating one example of a flow of processing performed by the image processing apparatus according to the fifth example embodiment.

Next, one example of the flow of processing of the image processing apparatus 100 according to the present example embodiment will be described with reference to the flowchart of FIG. 58. Note that, the aim herein is to describe the flow of the processing. Since the details of each processing have been described above, the description thereof will be omitted.

The image processing apparatus 100 acquires the first query still image and at least one second query still image (S700).

Next, the image processing apparatus 100 detects keypoints of objects included in each of the first query still image and the second query still image (S701). Then, the image processing apparatus 100 computes the feature value of the detected keypoints (S702).

Then, the image processing apparatus 100 integrates the feature values computed from each of the first query still image and the second query still image, and creates an integrated query (S703). Further, the image processing apparatus 100 sets a weighting value for each of a plurality of types of feature values. Then, the image processing apparatus 100 searches for a still image by using the integrated query generated in S703 as a key, and further using the weighting values for each of the plurality of types of feature values created in S703 (S705).

As described above, according to the image processing apparatus 100 of the present example embodiment that integrates a plurality of queries indicating the same pose and performs a search by using the integrated query, the search accuracy of the processing of searching for an image indicating the same pose as the pose indicated by the query is improved. Further, by performing a search by using weighting values for a plurality of types of feature values, further improvement in search accuracy is expected.

Although the example embodiments of the present invention have been described above with reference to the drawings, these are examples of the present invention, and various configurations other than the above may be adopted.

Further, in the plurality of flowcharts used in the above description, a plurality of steps (processing) are described in order, but the execution order of the steps being executed in each example embodiment is not limited to the order described above. In each of the example embodiments, the order of the steps being illustrated may be changed within a range that does not interfere with the contents. Further, the example embodiments described above may be combined within a range in which the contents do not conflict with one another.

A part or the whole of the above-described example embodiments may also be described as the following supplementary notes, but are not limited thereto.

1. An image processing apparatus including:
   a query acquisition unit that acquires a first query moving image having a plurality of time-series first frame images and at least one second query moving image having a plurality of time-series second frame images;

a feature value computing unit that computes a feature value of a keypoint detected from an object being included in each of the first frame images and the second frame images;

a correspondence relationship determination unit that determines the second frame image associated with each of a plurality of the first frame images; and an integration unit that performs processing of integrating the feature values computed from each of the first frame image and the second frame image associated with each other on a plurality of combinations of the first frame image and the second frame image associated with each other, and thereby generates an integrated query in which the integrated feature values are arranged in time series.

2. The image processing apparatus according to supplementary note 1, wherein the integration unit computes, as the integrated feature value, an arithmetic average value or a weighted average value of the feature values computed from each of the first frame image and the second frame image.

3. The image processing apparatus according to supplementary note 1 or 2, further including a search unit that searches for a moving image by using the integrated query as a key.

4. The image processing apparatus according to supplementary note 3, wherein the search unit searches for the moving image by using a weighting value being set for each of a plurality of types of the feature values.

5. The image processing apparatus according to supplementary note 4, wherein the weighting value for each of the feature values is set based on a degree of similarity of each of a plurality of types of the feature values computed from each of the first frame image and the second frame image associated with each other.

6. The image processing apparatus according to any one of supplementary notes 3 to 5, wherein the search unit searches for a moving image by using a part of the integrated query as a key, the part being generated based on the first frame image and the second frame image included in a time period in which a change in the feature value equal to or larger than a threshold value occurs commonly in both the first query moving image and the second query moving image.

7. An image method causing a computer to execute:

a query acquisition step of acquiring a first query moving image having a plurality of time-series first frame images and at least one second query moving image having a plurality of time-series second frame images;

a feature value computing step of computing a feature value of a keypoint detected from an object being included in each of the first frame images and the second frame images;

a correspondence relationship determination step of determining the second frame image associated with each of a plurality of the first frame images; and an integration step of performing processing of integrating the feature values computed from each of the first frame image and the second frame image associated with each other on a plurality of combinations of the first frame image and the second frame image associated with each other, and thereby generating an integrated query in which the integrated feature values are arranged in time series.

8. A program causing a computer to function as:

a query acquisition unit that acquires a first query moving image having a plurality of time-series first frame images and at least one second query moving image having a plurality of time-series second frame images;

a feature value computing unit that computes a feature value of a keypoint detected from an object being included in each of the first frame images and the second frame images;

a correspondence relationship determination unit that determines the second frame image associated with each of a plurality of the first frame images; and an integration unit that performs processing of integrating the feature values computed from each of the first frame image and the second frame image associated with each other on a plurality of combinations of the first frame image and the second frame image associated with each other, and thereby generates an integrated query in which the integrated feature values are arranged in time series.

9. An image processing apparatus including:

a query acquisition unit that acquires a first query still image and at least one second query still image;

a feature value computing unit that computes a feature value of a keypoint detected from an object being included in the first query still image and the second query still image;

an integration unit that integrates the feature values computed from each of the first query still image and the second query still image, and thereby generates an integrated query; and a search unit that searches for a still image by using the integrated query as a key, wherein the search unit searches for a still image by using a weighting value for each of the feature values being set, based on a degree of similarity between each of a plurality of types of the feature values computed from the first query still image and each of a plurality of types of the feature values computed from the second query still image.

10. An image processing method causing a computer to execute:

a query acquisition step of acquiring a first query still image and at least one second query still image;

a feature value computing step of computing a feature value of a keypoint detected from an object being included in the first query still image and the second query still image;

an integration step of integrating the feature values computed from each of the first query still image and the second query still image, and thereby generating an integrated query; and a search step of searching for a still image by using the integrated query as a key, wherein the search step includes searching for a still image by using a weighting value for each of the feature values being set, based on a degree of similarity between each of a plurality of types of the feature values computed from the first query still image and each of a plurality of types of the feature values computed from the second query still image.

11. A program causing a computer to function as:

a query acquisition unit that acquires a first query still image and at least one second query still image;

a feature value computing unit that computes a feature value of a keypoint detected from an object being included in the first query still image and the second query still image;

an integration unit that integrates the feature values computed from each of the first query still image and the second query still image, and thereby generates an integrated query; and a search unit that searches for a still image by using the integrated query as a key, wherein the search unit searches for a still image by using a weighting value for each of the feature values being set, based on a degree of similarity between each of a plurality of types of the feature values computed from the first query still image and each of a plurality of types of the feature values computed from the second query still image.

REFERENCE SIGNS LIST

1 Image processing system
10 Image processing apparatus
11 Skeleton detection unit
12 Feature value computing unit
13 Recognition unit
100 Image processing apparatus
101 Image acquisition unit
102 Skeletal structure detection unit
103 Feature value computing unit
104 Classification unit
105 Search unit
106 Input unit
107 Display unit
108 Height computing unit
109 Query acquisition unit
110 Change computing unit
111 Search unit
112 Query frame selection unit
113 Integration unit
114 Correspondence relationship determination unit
200 Camera
201 Database
300, 301 Human body model
401 Two-dimensional skeletal structure

What is claimed is:

1. An image processing apparatus comprising:
at least one memory configured to store one or more instructions; and
at least one processor configured to execute the one or more instructions to:
acquire a first query moving image having a plurality of time-series first frame images and at least one second query moving image having a plurality of time-series second frame images;
compute a feature value of a keypoint detected from an object being included in each of the first frame images and the second frame images;
determine the second frame image associated with each of a plurality of the first frame images; and
perform, for a plurality of combinations of the first frame image and the second frame image associated with each other, processing of integrating the feature values computed from each of the first frame image and the second frame image, and thereby generate an integrated query in which the integrated feature values are arranged in time series.

2. The image processing apparatus according to claim 1, wherein the processor is further configured to execute the one or more instructions to compute, as the integrated feature value, an arithmetic average value or a weighted average value of the feature values computed from each of the first frame image and the second frame image.

3. The image processing apparatus according to claim 1, wherein the processor is further configured to execute the one or more instructions to search for a moving image by using the integrated query as a key.

4. The image processing apparatus according to claim 3, wherein the processor is further configured to execute the one or more instructions to search for the moving image by using a weighting value being set for each of a plurality of types of the feature values.

5. The image processing apparatus according to claim 4, wherein the weighting value for each of the feature values is set, based on a degree of similarity of each of a plurality of types of the feature values computed from each of the first frame image and the second frame image associated with each other.

6. The image processing apparatus according to claim 3, wherein
the processor is further configured to execute the one or more instructions to search for a moving image by using a part of the integrated query as a key, the part being generated based on the first frame image and the second frame image included in a time period in which a change in the feature value equal to or larger than a threshold value occurs commonly in both the first query moving image and the second query moving image.

7. An image processing method causing a computer to execute:
acquiring a first query moving image having a plurality of time-series first frame images and at least one second query moving image having a plurality of time-series second frame images;
computing a feature value of a keypoint detected from an object being included in each of the first frame images and the second frame images;
determining the second frame image associated with each of a plurality of the first frame images; and
performing, for a plurality of combinations of the first frame image and the second frame image associated with each other, processing of integrating the feature values computed from each of the first frame image and the second frame image, and thereby generating an integrated query in which the integrated feature values are arranged in time series.

* * * * *